(12) United States Patent
Mercado

(10) Patent No.: US 9,817,213 B2
(45) Date of Patent: Nov. 14, 2017

(54) CAMERA LENS SYSTEM WITH FIVE LENS COMPONENTS

(71) Applicant: Apple Inc., Cupertino, CA (US)

(72) Inventor: Romeo I. Mercado, Fremont, CA (US)

(73) Assignee: APPLE INC., Cupertino, CA (US)

( * ) Notice: Subject to any disclaimer, the term of this patent is extended or adjusted under 35 U.S.C. 154(b) by 62 days.

(21) Appl. No.: 14/830,650

(22) Filed: Aug. 19, 2015

(65) Prior Publication Data

US 2016/0313537 A1 Oct. 27, 2016

Related U.S. Application Data

(60) Provisional application No. 62/151,939, filed on Apr. 23, 2015.

(51) Int. Cl.
*G02B 9/60* (2006.01)
*G02B 13/00* (2006.01)
(Continued)

(52) U.S. Cl.
CPC ........... *G02B 13/0045* (2013.01); *G02B 9/60* (2013.01); *G02B 13/0085* (2013.01); *G02B 27/0025* (2013.01); *G02F 1/157* (2013.01)

(58) Field of Classification Search
USPC ........ 359/242–245, 275–279, 315, 321, 322, 359/290–292, 295, 298, 811, 815, 819,
(Continued)

(56) References Cited

U.S. PATENT DOCUMENTS 4,550,987 A 11/1985 Tachihara
8,599,495 B1 12/2013 Tsai et al.
(Continued)

FOREIGN PATENT DOCUMENTS

CN 101750706 A 6/2010
CN 106199926 A 12/2016
(Continued)

OTHER PUBLICATIONS

T. Deutschmann, et al., "Integrated electrochromic iris device for low power and space-limited applications", Journal of Optics, 2014, 5 pages.
(Continued)

*Primary Examiner* — Brandi Thomas
(74) *Attorney, Agent, or Firm* — Blakely Sokoloff Taylor & Zafman LLP

(57) ABSTRACT

An optical imaging lens assembly that may have five lens components. The first, third, and fourth lens components may have positive refractive power. The second and fifth lens components may have negative refractive power. The third lens component may have convex object-side and convex image-side refractive surfaces. The fourth lens component may have convex object-side and concave image-side refractive surfaces. The first lens component may include a wafer lens having a lens element molded on one or both surfaces of a planar substrate or two wafer lenses having a lens element molded on one surface of each of two planar substrates. The wafer lens may include an electrically controlled electrochromic surface having variable light transmittance in response to an applied electrical voltage. The refracting surfaces may be aspheric.

25 Claims, 31 Drawing Sheets

(51) Int. Cl.
*G02B 27/00* (2006.01)
*G02F 1/157* (2006.01)

(58) Field of Classification Search
USPC .................................................. 359/821–824
See application file for complete search history.

(56) References Cited

U.S. PATENT DOCUMENTS

| | | | |
|---|---|---|---|
| 8,599,498 B2 | 12/2013 | Tsai et al. | |
| 8,662,765 B2 | 3/2014 | Reshidko et al. | |
| 8,743,482 B1 | 6/2014 | Tsai et al. | |
| 9,341,819 B2 | 5/2016 | Chen et al. | |
| 9,366,842 B2 | 6/2016 | Chen et al. | |
| 9,435,983 B2 | 9/2016 | Liao et al. | |
| 2003/0227664 A1 | 12/2003 | Anoop et al. | |
| 2011/0002053 A1* | 1/2011 | Ovrutsky | B29D 11/00278 359/738 |
| 2011/0255856 A1 | 10/2011 | Reshidko et al. | |
| 2011/0261429 A1* | 10/2011 | Sbar | B32B 17/10045 359/265 |
| 2012/0188654 A1 | 7/2012 | Huang | |
| 2013/0016261 A1* | 1/2013 | Tanaka | G02B 7/08 348/294 |
| 2013/0050846 A1* | 2/2013 | Huang | G02B 13/0045 359/713 |
| 2013/0215489 A1 | 8/2013 | Forrest et al. | |
| 2013/0301147 A1* | 11/2013 | Yamada | G02B 13/0045 359/764 |
| 2013/0329306 A1 | 12/2013 | Tsai et al. | |
| 2014/0153117 A1 | 6/2014 | Hagiwara | |
| 2014/0192422 A1 | 7/2014 | Tang et al. | |
| 2015/0103414 A1 | 4/2015 | Baik | |
| 2015/0153546 A1 | 6/2015 | Tang et al. | |
| 2015/0160435 A1 | 6/2015 | Chen et al. | |

FOREIGN PATENT DOCUMENTS

| | | |
|---|---|---|
| EP | 2708929 A2 | 3/2014 |
| EP | 2860564 A1 | 4/2015 |
| JP | 2007322604 A | 12/2007 |
| JP | 2014-123034 * | 12/2012 |
| JP | 5651881 B1 | 1/2015 |
| TW | 201239446 A | 10/2012 |
| TW | 201317619 A | 5/2013 |
| TW | 201413284 A | 4/2014 |
| TW | 201421062 A | 6/2014 |
| TW | 201433813 A | 9/2014 |
| TW | 201435383 A | 9/2014 |
| TW | 201441660 A | 11/2014 |
| TW | 104297904 A | 1/2015 |
| TW | 201502570 A | 1/2015 |
| TW | 201504673 A | 2/2015 |
| TW | 201508318 A | 3/2015 |
| TW | 201514534 A | 4/2015 |
| TW | M498897 | 4/2015 |
| WO | 2009038265 A1 | 3/2009 |

OTHER PUBLICATIONS

PCT/US2016/022150, Notification of Transmittal of the International Search Report and the Written Opinion of the International Searching Authority, or the Declaration, dated Aug. 9, 2016.
PCT/US2016/014626, Notification of Transmittal of the International Search Report and the Written Opinion of the International Searching Authority, or the Declaration, dated Aug. 11, 2016.
PCT/US2016/024365, Notification of Transmittal of the International Search Report and the Written Opinion of the International Searching Authority, or the Declaration, dated Aug. 16, 2016.
PCT/US2016/014626, Invitation to Pay Additional Fees, dated Apr. 25, 2016.
PCT/US2016/024365, Invitation to Pay Additional Fees, dated Jun. 17, 2016.
PCT/US2016/022150 filed Mar. 11, 2016, Invitation to Pay Additional Fees, dated Jun. 15, 2016.
PCT Invitation to Pay Additional Fees and, Where Applicable, Protest Fee, for PCT/US2016/014626, mailed Apr. 25, 2016.
U.S. Appl. No. 14/830,646, Office Action dated Sep. 2, 2016.
Office Action dated Dec. 22, 2016 for Taiwan Application No. 105109903 (with English Translation).
ROC (Taiwan) Pat. Appln. No. 105103860, Office Action dated Mar. 8, 2017.
ROC (Taiwan) Pat Appln. No. 105111549, Office Action dated Mar. 1, 2017.
Office Action for ROC (Taiwan) Patent Application No. 105111549 dated Jun. 22, 2017 w/English translation.

* cited by examiner

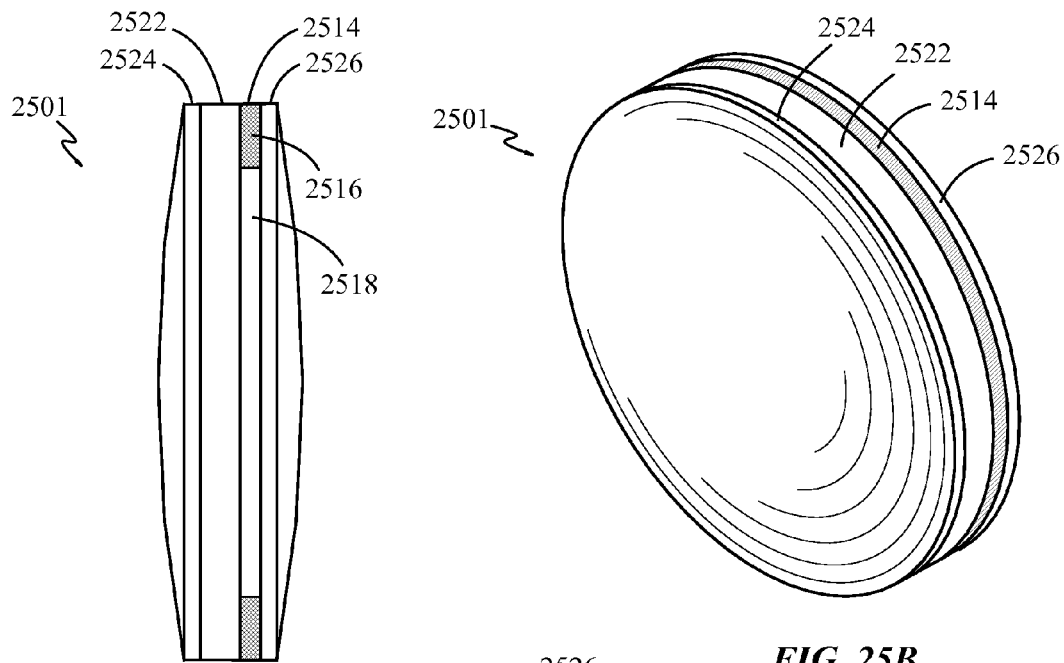
*FIG. 25A*
*FIG. 25B*
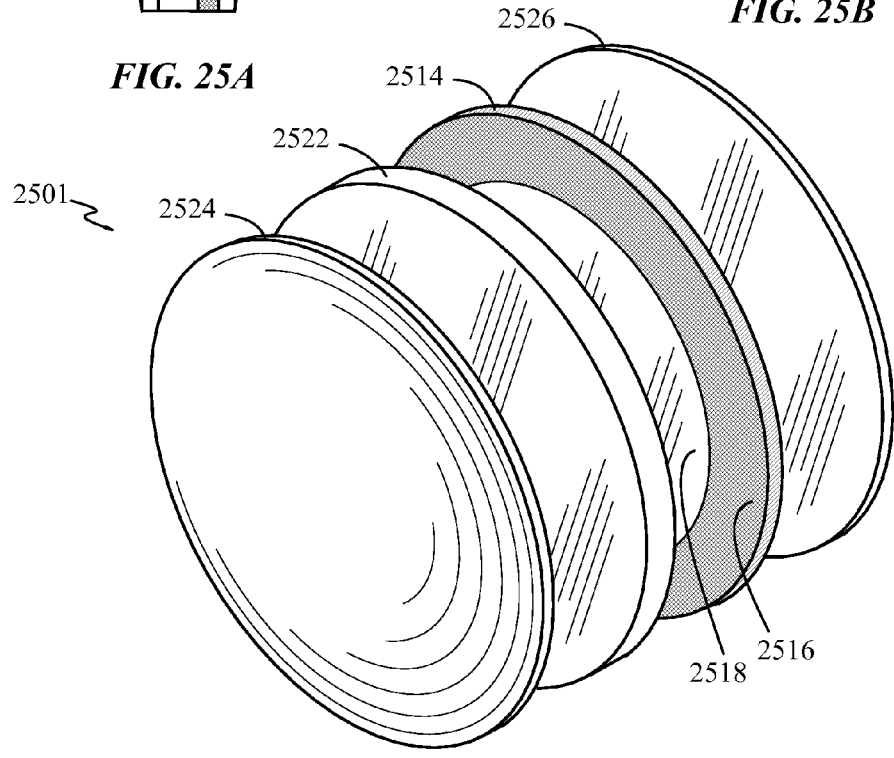
*FIG. 25C*

CAMERA LENS SYSTEM WITH FIVE LENS COMPONENTS

CROSS REFERENCE TO RELATED APPLICATIONS

This application claims the benefit pursuant to 35 U.S.C. 119(e) of U.S. Provisional Application No. 62/151,939, filed Apr. 23, 2015, which application is specifically incorporated herein, in its entirety, by reference.

BACKGROUND

Field

Embodiments of the invention relate to the field of lenses including a nonspherical surface; and more specifically, to lenses having five lens components.

Background

The advent of small mobile multipurpose devices such as smartphones, tablet or pad devices and laptop computers has resulted in a need for high resolution small form factor cameras for integration in the devices. However, due to limitations of conventional camera technology, conventional small cameras used in such devices tend to capture images at lower resolutions and/or with lower image quality than can be achieved with larger high quality cameras. Achieving higher resolution with small package size cameras generally requires use of photosensor with small pixel size and a high quality compact imaging lens system. Advances in technology have achieved reduction of the pixel size in photosensor. However, as photosensor become more compact and powerful, demand for compact imaging lens system with improved imaging quality performance has increased.

SUMMARY

Embodiments of the present disclosure may provide camera lens system designs with a large field of view (FOV) and a large aperture (low F-number) that can capture high resolution images at low background light levels for integration into electronic devices. Embodiments of the present disclosure also may provide a camera lens system design that can incorporate devices to vary the lens system focal ratio and allow adjustment of the depth of field (DOF) or exposure level of the image sensor array.

In some embodiments, an optical imaging lens assembly may be provided with five lens components. The first, third, and fourth lens components may have positive refractive power. The second and fifth lens component may have negative refractive power. The third lens component may have convex object-side and convex image-side refractive surfaces. The fourth lens component may have convex object-side and concave image-side refractive surfaces. The first lens component may include a wafer lens having a lens element molded on one or both surfaces of a planar substrate or two wafer lenses having a lens element molded on one surface of each of two planar substrates. The wafer lens may include an electrically controlled electrochromic surface having variable light transmittance in response to an applied electrical voltage. The refracting surfaces may be aspheric.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements:

FIG. 25A shows a side elevation of a wafer lens component.

FIG. 25B shows a pictorial view of the wafer lens component shown in FIG. 25A.

FIG. 25C shows an exploded pictorial view of the wafer lens component shown in FIG. 25A.

DETAILED DESCRIPTION

Figure 1:
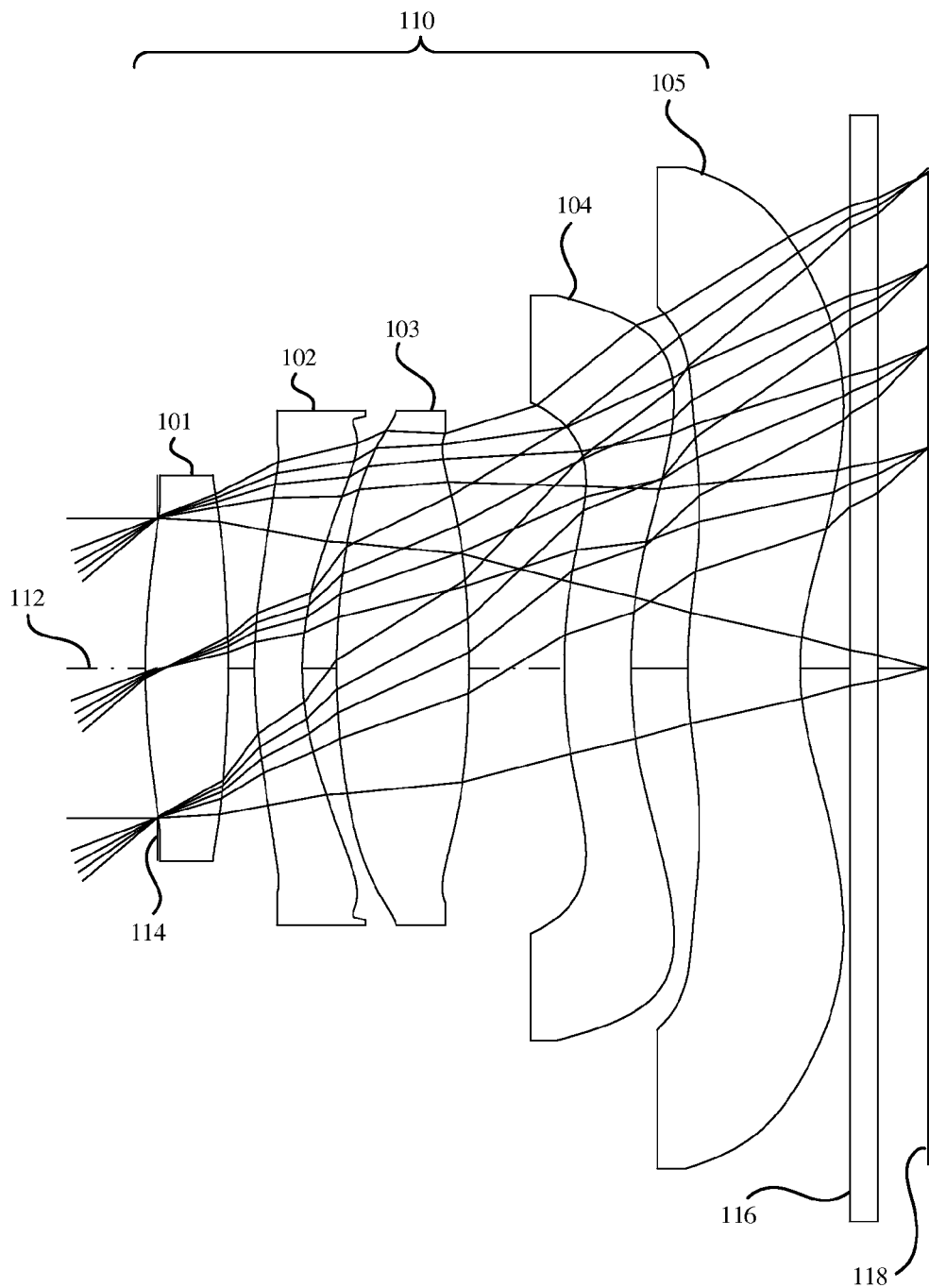
FIG. 1 is a cross-sectional illustration of an example embodiment of a lens system that includes five refractive lens elements.

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The term "optical axis" or simply "axis" as applied to a lens designates the axis of rotational symmetry of the lens.

The term "element" as applied to a lens designates any single transparent mass of refractive material having two opposed refracting surfaces, which surfaces are disposed transversely of the optical axis of the lens and spaced therealong.

The term "component" as applied to a lens designates either (1) a single transparent mass of refractive material having two opposed refracting surfaces, i.e. an element, or (2) a grouped plurality of such masses arranged in series along the optical axis of the lens with their adjacent refracting surfaces either in full overall contact or in spaced parallel relation with the spacing being of such small magnitude that it does not enter into the lens computations.

Radii of refractive surfaces are expressed as positive numbers when the center of the circle is on the image side of the refractive surface. They are expressed as negative numbers when the center of the circle is on the object side of the refractive surface. An object-side refractive surface having a positive radius is convex; one having a negative radius is concave. An image-side refractive surface having a positive radius is concave; one having a negative radius is convex. The term "convex" as applied to a lens surface indicates that the lens surface is convex where the surface intersects the optical axis. The term "concave" as applied to a lens surface indicates that the lens surface is concave where the surface intersects the optical axis.

The term "refractive power" as applied to a lens designates the degree to which a lens converges or diverges light near the optical axis. "Positive refractive power" is refractive power that bends the ray toward the optical axis, i.e. converges light. "Negative refractive power" is refractive power that bends the ray away from the optical axis, i.e. diverges light.

The term "aperture stop" or simply "stop" as applied to a lens designates an opening that determines the size of the bundle of rays that pass through the lens system.

The term "focal length" as used herein means effective focal length and not front focal length nor rear focal length.

Embodiments of small form factor camera including a photosensor and a compact lens system with a large field of view (FOV) and a large aperture (low F-number) are described. Various embodiments of a compact lens system including five lens components with refractive power, including lens systems having wafer lens components, are described. These embodiments of compact lens systems may be used in the camera and provide a larger image with a lower F-number (larger aperture) than has been realized in conventional compact cameras. The camera may be implemented in a small package size while still capturing sharp, high resolution images, making embodiments of the camera suitable for use in small and/or mobile multipurpose devices such as cell phones, smartphones, pad or tablet computing devices, laptop, netbook, notebook, subnotebook, ultrabook computers, surveillance devices, and so on. However, aspects of the camera (e.g., the lens system and photosensor) may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications.

Embodiments of the compact lens systems are described for potential application to cameras having a ⅓ inch (6.15 mm diagonal) sensor. Example embodiments of lens systems may have about a 4.1 mm EFL (effective focal length), F/2.2 aperture size, and 74 degree diagonal field of view (DFOV) (6.2-mm image circle diameter). Several example embodiments of compact low F-number lens systems are described, including embodiments with a wafer lens component that may include an electrochromic aperture mechanism and four additional refracting lens components and example embodiments with five refracting lens components.

Figure 4:
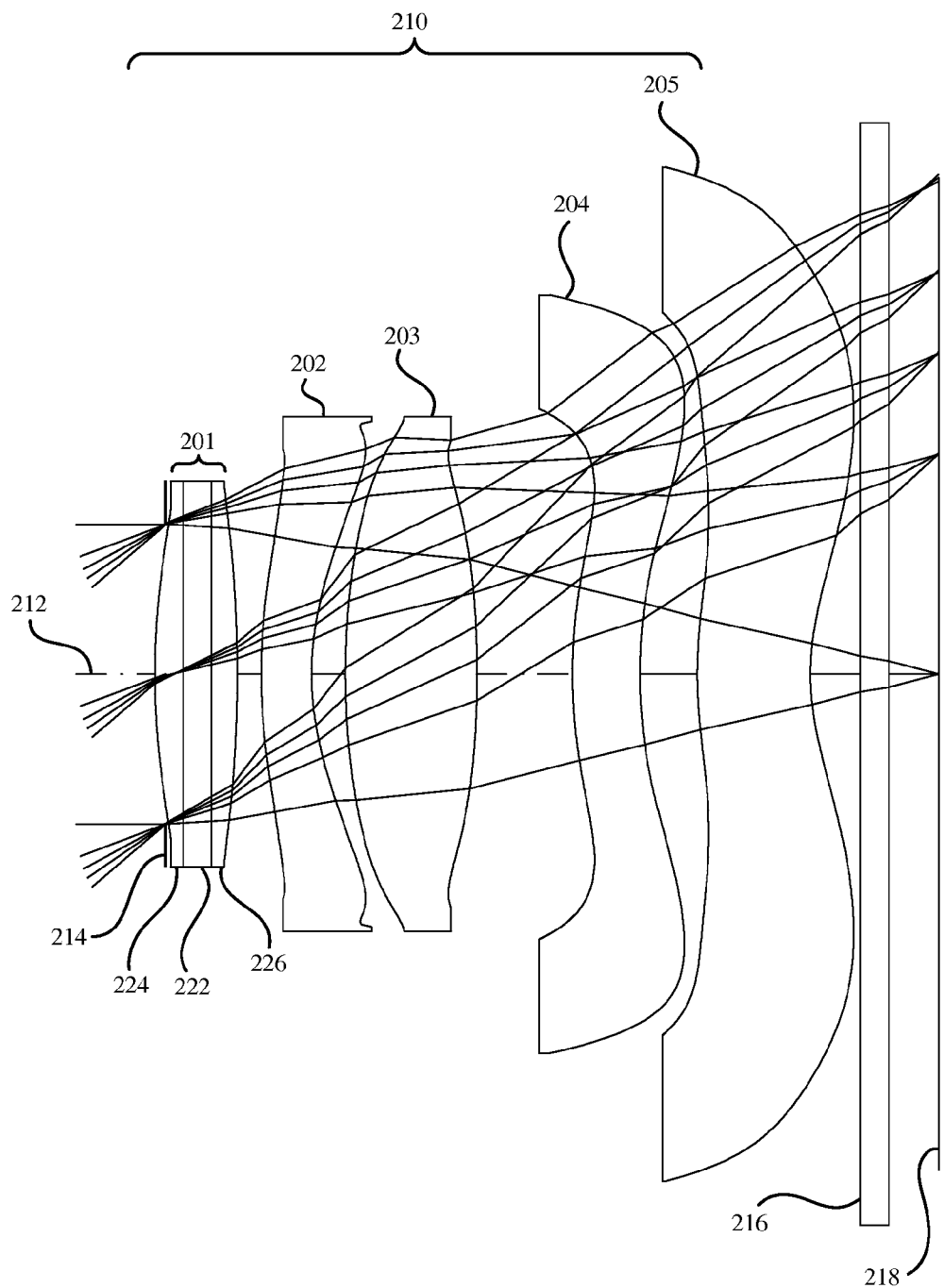
FIG. 4 is a cross-sectional illustration of an example embodiment of a lens system that includes a wafer lens component and four refractive lens elements.
Figure 7:
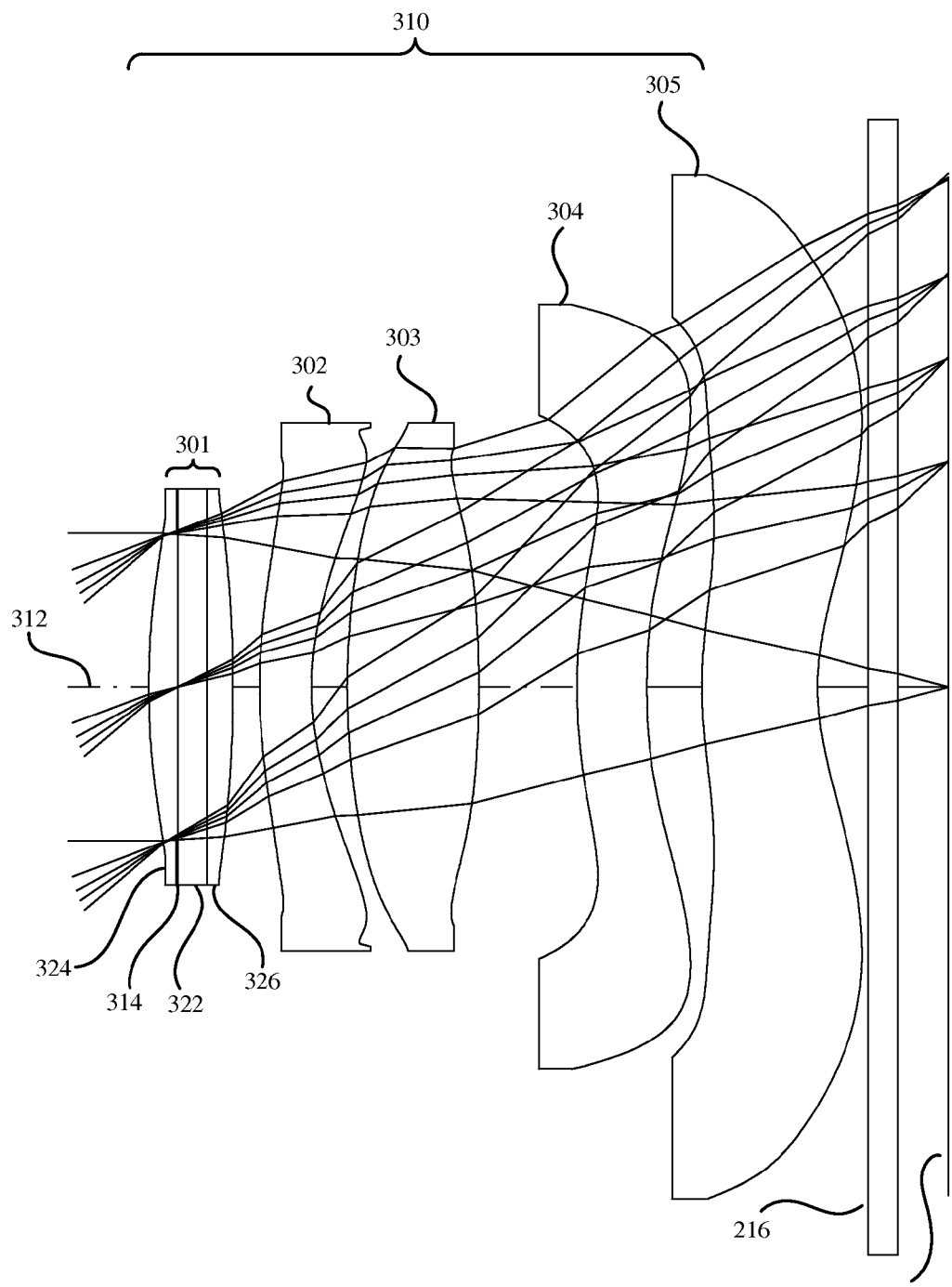
FIG. 7 is a cross-sectional illustration of another example embodiment of a lens system that includes a wafer lens component and four refractive lens elements.
Figure 10:
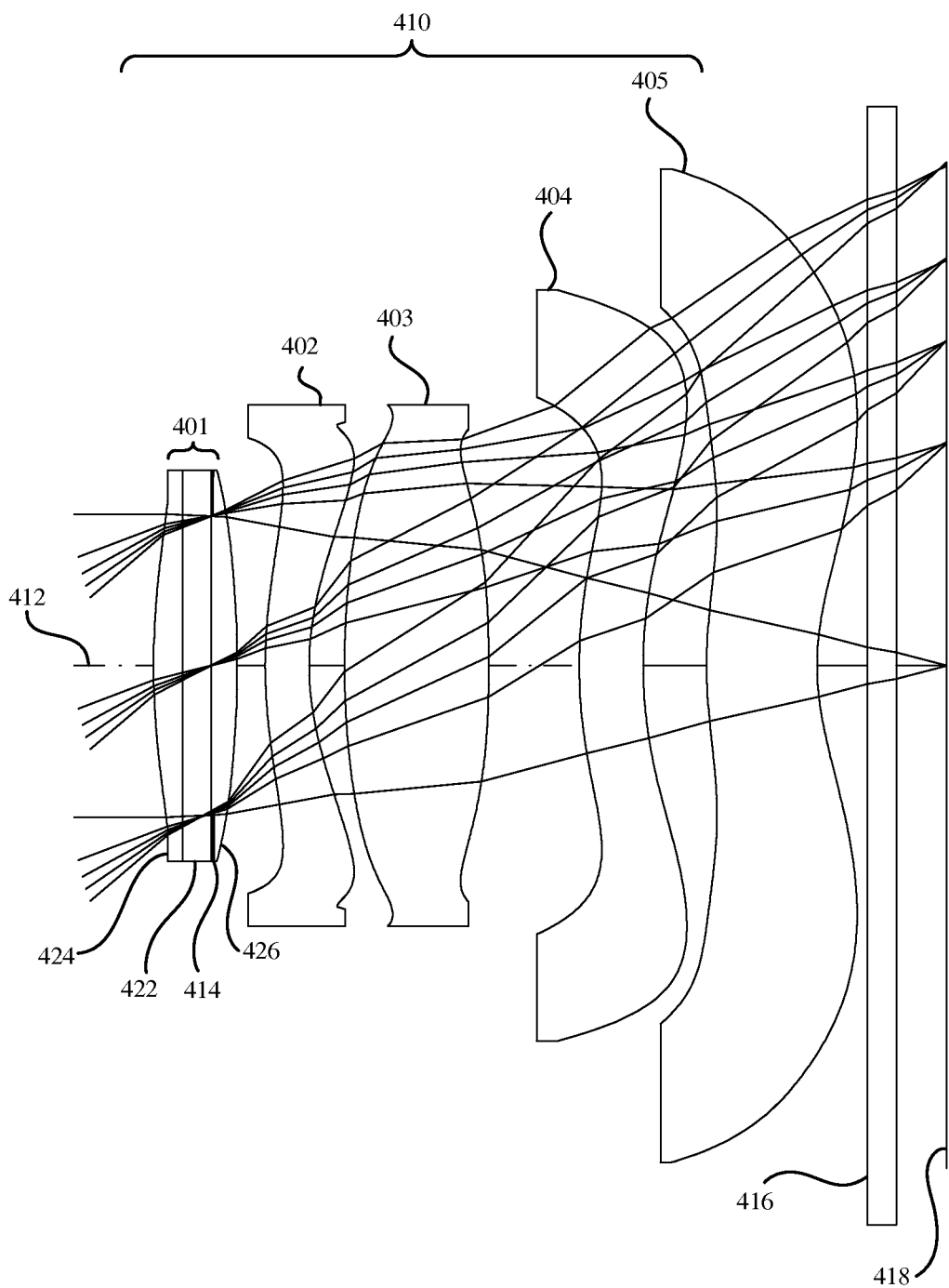
FIG. 10 is a cross-sectional illustration of another example embodiment of a lens system that includes a wafer lens component and four refractive lens elements.
Figure 13:
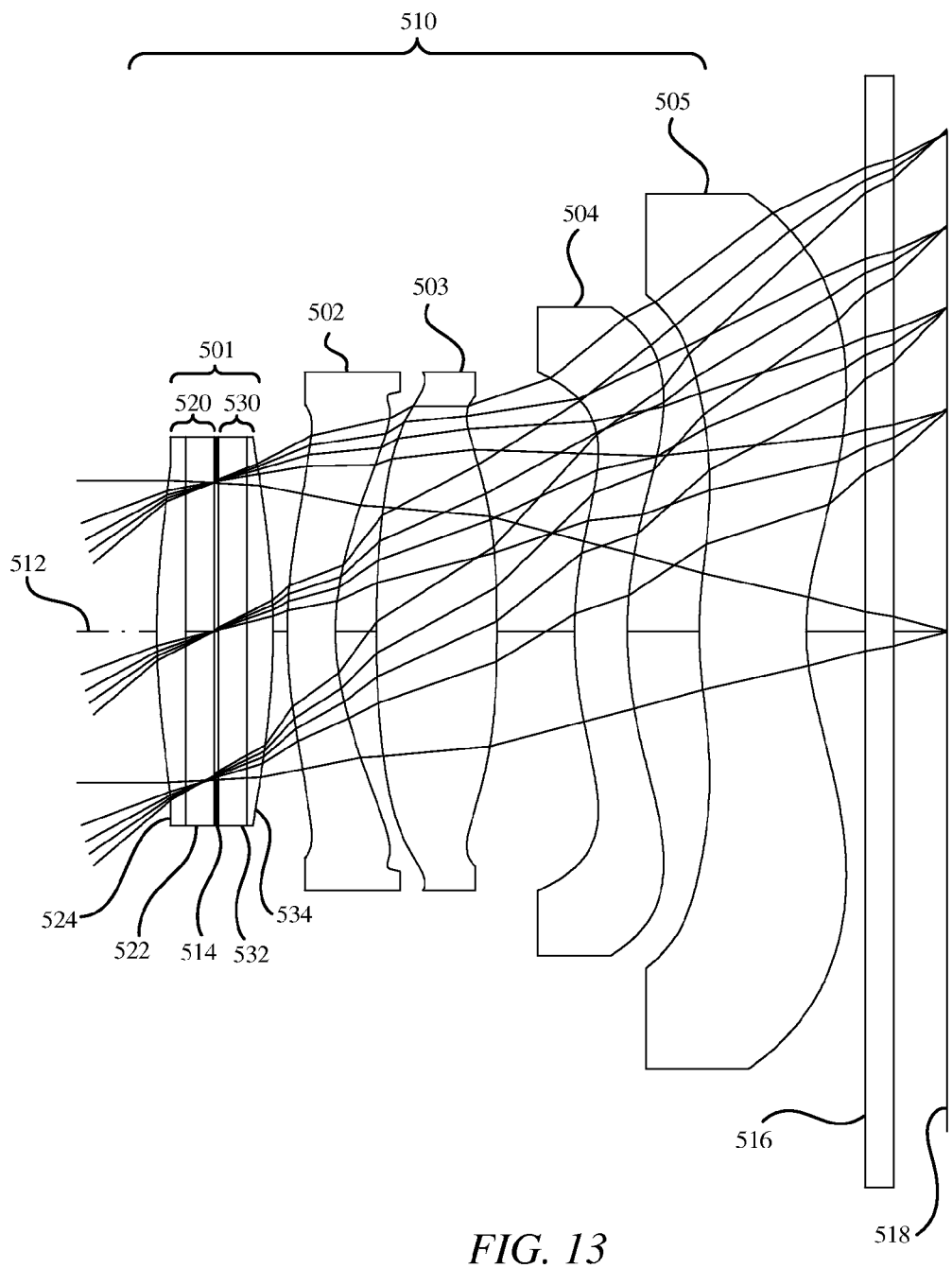
FIG. 13 is a cross-sectional illustration of another example embodiment of a lens system that includes a wafer lens component and four refractive lens elements.
Figure 16:
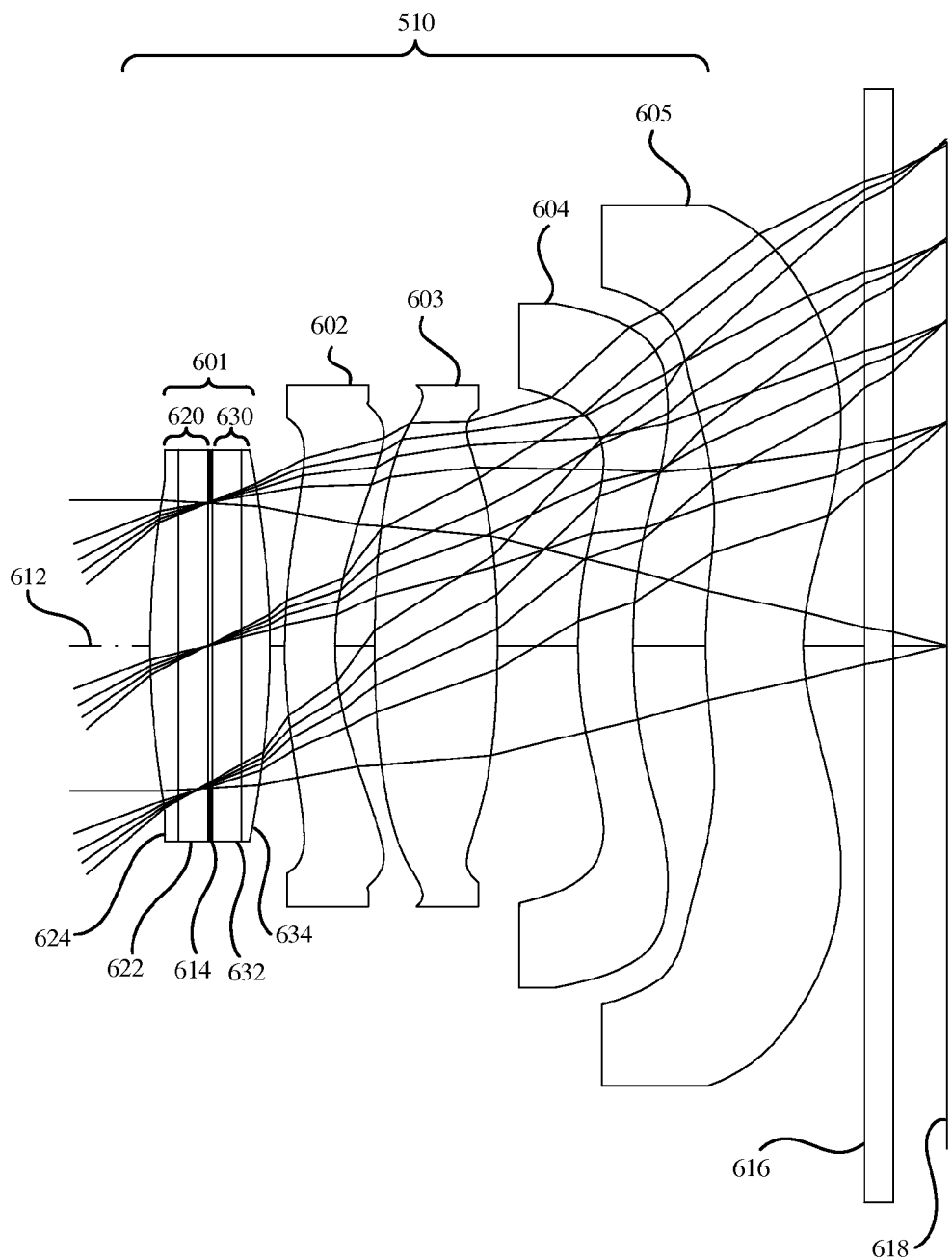
FIG. 16 is a cross-sectional illustration of another example embodiment of a lens system that includes a wafer lens component and four refractive lens elements.
Figure 19:
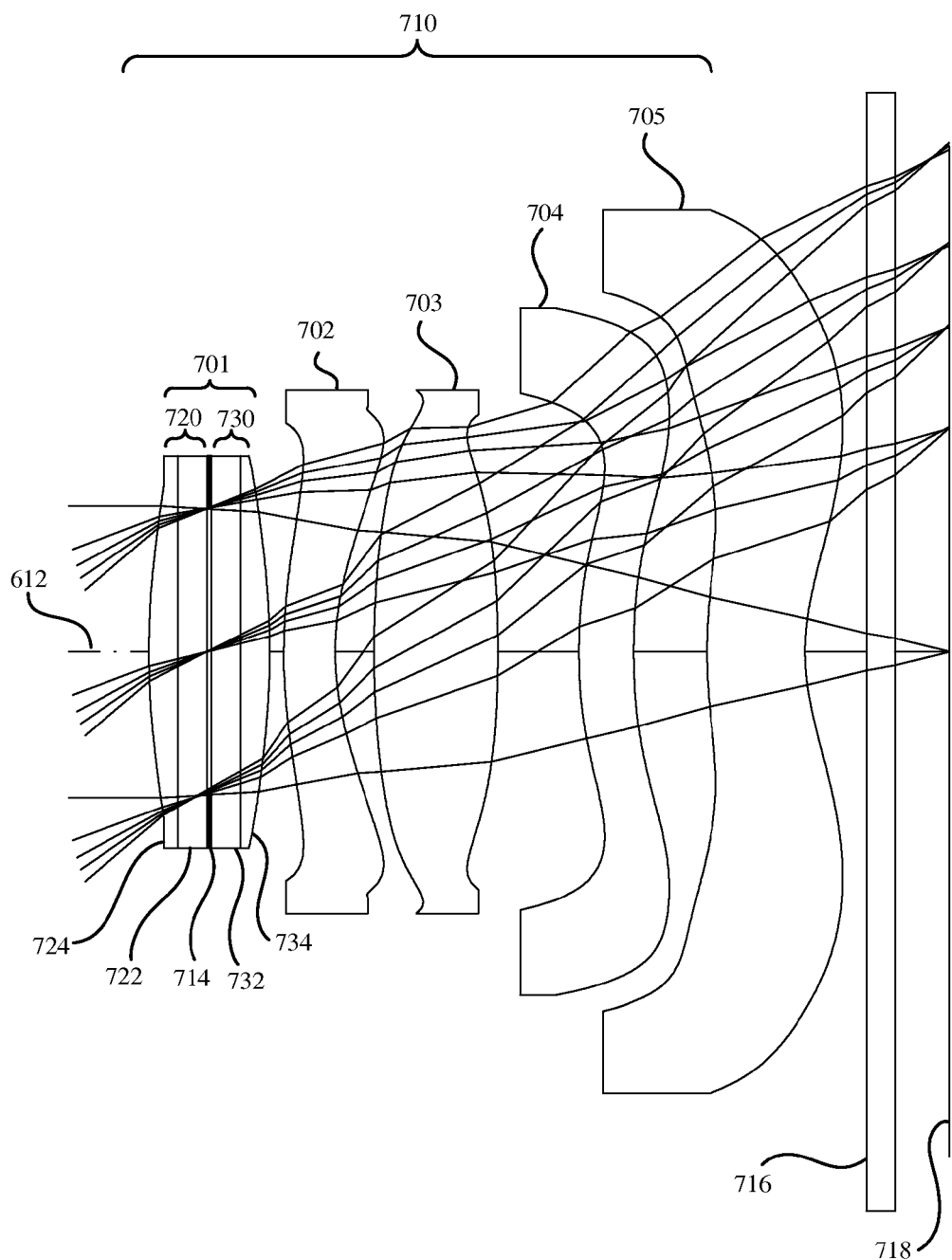
FIG. 19 is a cross-sectional illustration of another example embodiment of a lens system that includes a wafer lens component and four refractive lens elements.
Figure 22:
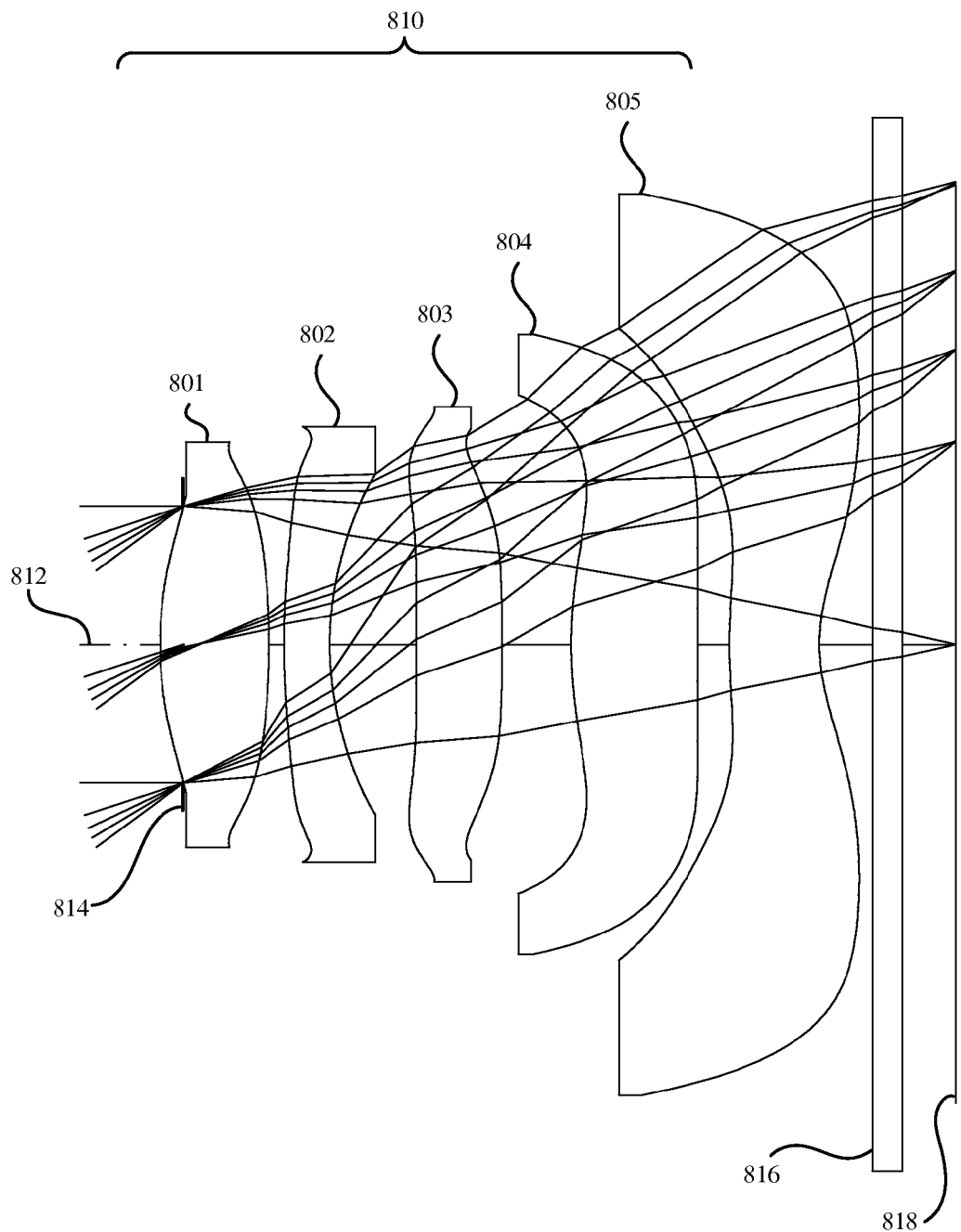
FIG. 22 is a cross-sectional illustration of another example embodiment of a lens system that includes five refractive lens elements.

FIGS. 1 and 22 show various example embodiments that include five refracting lens components. FIGS. 4, 7, and 10 show various example embodiments that include a wafer lens component, some with front and/or rear layers of polymeric materials, and four additional refracting lens components. FIGS. 13, 16, and 19 show various example embodiments that include a wafer lens component, which includes two wafer lens components, and four additional refracting lens elements. These examples are not intended to be limiting, and variations on the various parameters given for the lens system are possible while still achieving similar results.

The refractive lens components in the various embodiments may be composed of plastic materials. In at least some embodiments, the refractive lens elements may be composed of injection molded plastic material. However, other transparent optical materials may be used. Also note that, in a given embodiment, different ones of the lens elements may be composed of materials with different optical characteristics, for example different Abbe numbers and/or different refractive indices. The wafer lens components in the embodiments may be composed of a single or multiple layer laminate of polymeric or plastic materials on a planar substrate, which may be a planar glass substrate.

The camera may also include a frontal aperture stop (AS) located in front of (i.e., on the object side of) a first lens component. While FIGS. 1, 4, and 22 show frontal aperture stop located at or near the front vertex of the lens system, location of the aperture stop may be closer to or farther away from the vertex of the lens component. Further, in some embodiments, the aperture stop may be located elsewhere in the lens system. For example, the aperture stop may be located at a planar surface of the wafer lens component as shown in FIGS. 4, 7, 10, 13, 16, and 19.

The camera may also, but not necessarily, include an infrared (IR) filter located between a last lens component of the lens system and the photosensor. The IR filter may, for example, be composed of a glass material. However, other materials may be used. Note that the IR filter does not affect the effective focal length of the lens system. Further note that the camera may also include other components in addition to those illustrated and described herein.

In the camera, the lens system forms an image at an image plane (IP) at or near the surface of the photosensor. The image size for a distant object is directly proportional to the effective focal length (f) of a lens system. The total track length (TTL) of the lens system is the distance on the optical axis (AX) between the front vertex at the object side surface of the first (object side) lens component and the image plane. For lens system having a large FOV and a low F-number, the TTL is normally greater than the effective focal length.

In at least some embodiments, the lens system may be configured such that the effective focal length f of the lens system is at or about 4.1 millimeters (mm), the F-number (focal ratio, or F-number) is at or about 2.2, the field of view (FOV) is at or about 74 degrees (although narrower or wider FOVs may be achieved), and the total track (TTL) is within the range of about 5.25 mm to about 5.5 mm. More generally, the lens system may be configured to satisfy the relation TTL/f>1.0.

In some example embodiments described herein, the lens system may be configured such that the effective focal length f of the lens system is 4.1 mm at reference wavelength 555 nm and the F-number is 2.2. The lens system may, for example, be configured with focal length f of 4.1 mm and F-number of 2.2 to satisfy specified optical, imaging, and/or packaging constraints for particular camera system applications. Note that the F-number, also referred to as the focal ratio or F-number is defined by f/D, where D is the diameter of the entrance pupil, i.e., the effective aperture. As an example, at f=4.1 mm, an F-number of 2.2 is achieved with an effective aperture diameter of 1.86 mm. The example embodiment may also be configured with a field of view (FOV) at or about 74 degrees, a half FOV at or about 37 degrees. Total track length (TTL) of the example embodiments vary from about 5.25 mm to about 5.5 mm. The ratio of TTL/f varies within the range of about 1.28 to about 1.34 for the example embodiments.

However, note that the focal length f, F-number, and/or other parameters may be scaled or adjusted to meet various specifications of optical, imaging, and/or packaging constraints for other camera system applications. Constraints for a camera system that may be specified as requirements for particular camera system applications and/or that may be varied for different camera system applications include but are not limited to the focal length f, effective aperture, F-number, field of view (FOV), imaging performance requirements, and packaging volume or size constraints.

In some embodiments, the lens system may be equipped with an adjustable iris (entrance) pupil or aperture stop. Using an adjustable aperture stop, the F-number (focal ratio) may be dynamically varied within a range. For example, if the lens is well corrected at f/2.2, at a given focal length f and FOV, then the focal ratio may be varied within the range of 2.2 to 8 (or higher) by adjusting the aperture stop, assuming that the aperture stop can be adjusted to the desired F-number setting. In some embodiments, the lens system may be used at faster focal ratios (F-number<2.2) by adjusting the aperture stop with degraded image quality performance at the same FOV (e. g. 74 degrees), or with reasonably good performance at a smaller FOV.

In some embodiments, the lens system may also be equipped with a focusing mechanism for focusing an object scene at infinity (object scene distance from camera>20 meters) to near object distance (<50 mm). For example, in some embodiments, the lens system as described herein may be equipped with adjustable focus mechanism wherein the lens system and/or photosensor at the image plane may be moved for focusing an object scene at distances ranging from greater than 20 meters to less than 50 mm.

While ranges of values may be given herein as examples of adjustable cameras and lens systems in which one or more optical parameters may be dynamically varied (e.g., using adjustable aperture stop and/or adjustable focus), embodiments of camera systems that include fixed (non-adjustable) lens systems in which values for optical and other parameters are within these ranges may be implemented.

Referring first to embodiments as illustrated in FIGS. 1 and 22, a compact lens system 110, 810 suitable for use in a camera may include five lens components. The five lens components 101-106 in the lens system 110 of FIG. 1 and the five lens components 801-806 in the lens system 810 of FIG. 22 each have a refractive power and form a lens system having a focal length of f. The five lens components of each of the lens systems 110, 810 are arranged along an optical axis (AX) 112, 812 from an object side to an image side as follows:

a first lens component 101, 201 having a positive refractive power, a focal length $f_1$, and a convex object side surface;
 a second lens component 102, 202 having a negative refractive power and a focal length $f_2$;
 a third lens component 103, 203 having a positive refractive power and a focal length $f_3$;
 a fourth lens component 104, 204 having a positive refractive power and a focal length $f_4$; and
 a fifth lens component 105, 205 having a negative refractive power and a focal length $f_5$.

In addition, at least one surface, the object side or the image side, of each of the five lens components is aspheric. In some embodiments both the object side surface and the image side surface of one or more of the five lens components is aspheric.

The lens systems 110, 810 form an image on or near the surface of an image sensor 118, 818. A cover material 116, 816, such as a cover glass or an infrared cut filter, may be placed between the lens systems 110, 810 and the image sensor 118, 818. A frontal aperture stop (AS) 114, 814 may be located on the object side of the first lens component 101, 801.

Referring now to embodiments as illustrated in FIGS. 4, 7, and 10, a compact lens system 210, 310, 410 suitable for use in a camera may include five lens components. The five lens components 201-206 in the lens system 210 of FIG. 4, the five lens components 301-306 in the lens system 310 of FIG. 7, and the five lens components 401-406 in the lens system 410 of FIG. 10 each have a refractive power and form a lens system having a focal length of f.

The first lens component 201, 301, 401 of the embodiments illustrated in FIGS. 4, 7, and 10 is in the form of a wafer lens component in which a laminate layer of polymeric or plastic materials is formed on a planar substrate, which may be a planar glass substrate. The remaining five lens components, 202-205 in the lens system 210 of FIG. 4, 302-305 in the lens system 310 of FIG. 7, and 402-405 in the lens system 410 of FIG. 10, are shown as lens elements formed of a single transparent mass of refractive material. In other embodiments, not shown, one or more of the remaining five lens components may be a grouped plurality of such masses arranged in series, such as an additional wafer lens component. The five lens components of each of the lens systems 210, 310, 410 are arranged along an optical axis (AX) 212, 312, 412 from an object side to an image side as follows:

a first lens component 201, 301, 401 in the form of a wafer lens component, having a positive refractive power, a focal length $f_1$, and a convex object side surface;
 a second lens component 202, 302, 402 having a negative refractive power and a focal length $f_2$;
 a third lens component 203, 303, 403 having a positive refractive power and a focal length $f_3$;
 a fourth lens component 204, 304, 404 having a positive refractive power and a focal length $f_4$; and
 a fifth lens component 205, 305, 405 having a negative refractive power and a focal length $f_5$.

In addition, at least one surface, the object side or the image side, of each of the five lens components is aspheric. In some embodiments both the object side surface and the image side surface of one or more of the five lens components is aspheric.

The lens systems 210, 310, 410 form an image on or near the surface of an image sensor 218, 318, 418. A cover material 216, 316, 416, such as a cover glass or an infrared cut filter, may be placed between the lens systems 210, 310, 410 and the image sensor 218, 318, 418.

The wafer lens 201, 301, 401 may include a planar substrate 222, 322, 422 and single layer laminates 224, 226, 324, 326, 424, 426 of polymeric or plastic material on each side of the planar substrate, which may be a planar glass substrate. The laminate layers 224, 226, 324, 326, 424, 426 of polymeric or plastic material may be formed using known manufacturing methods such as casting, molding, or microlithographic processes on the planar substrate 222, 322, 422. If polymeric material is used it may be an ultra-violet light (UV) curable polymeric. The laminate layers 224, 226, 324, 326, 424, 426 are formed with a shape that provides the refractive power for the wafer lens component 201, 301, 401.

In some embodiments 210, a frontal aperture stop (AS) 214 may be located on the object side of the first lens component 201. In other embodiments 310, 410, the wafer lens component 301, 401 may include an electrochromic layer 314, 414 that provides a variable light transmittance in response to an applied electrical voltage. The electrochromic layer 314, 414 may supplement the function of the aperture stop or, in other embodiments, serve the function of a variable aperture stop without using an aperture stop. The electrochromic layer 314, 414 may be located either on the object planar side or the image planar side of the planar substrate 322, 422. The electrochromic layer 314, 414 may be composed of transparent film layer of electrically conductive organic or inorganic material, such as metallic oxides and conductive polymers.

The wafer lens component is comprised as a unit of the combination of a polymeric laminate layer and a planar substrate. Thus the refractive power of the wafer lens component is provided by the laminate layer or layers and the planar substrate or substrates. The laminate layer and the planar substrate will generally have different characteristics such as the indices of refraction and Abbe numbers. These composite optical materials contribute to the refractive power of the wafer lens component and these composite material refractive indices are considered in the computation of the refractive power of the wafer lens or wafer lens group. Therefore, the wafer lens component differs optically from a lens element of the same geometry that is formed of a single transparent mass of refractive material and the planar substrate, which may be a planar glass substrate, of the wafer lens does enter into the lens computations.

Referring now to embodiments as illustrated in FIGS. 13, 16, and 19, a compact lens system 510, 610, 710 suitable for use in a camera may include five lens components. The five lens components 501-505 in the lens system 510 of FIG. 13, the five lens components 601-605 in the lens system 610 of FIG. 16, and the five lens components 701-705 in the lens system 710 of FIG. 19 each have a refractive power and form a lens system having a focal length of f.

The first lens component 501, 601, 701 of the embodiments illustrated in FIGS. 13, 16, and 19 is in the form of a wafer lens component in which laminate layers of polymeric or plastic materials are formed on planar substrates, which may be planar glass substrates. The remaining five lens components, 502-505 in the lens system 510 of FIG. 13, 602-605 in the lens system 610 of FIG. 16, and 702-705 in the lens system 710 of FIG. 19, are shown as lens elements formed of a single transparent mass of refractive material. In other embodiments, not shown, one or more of the remaining five lens components may be a grouped plurality of such masses arranged in series, such as an additional wafer lens component. The five lens components of each of the lens systems 510, 610, 710 are arranged along an optical axis (AX) 512, 612, 712 from an object side to an image side as follows:

a first lens component 501, 601, 701 in the form of a wafer lens component, having a positive refractive power, a focal length $f_1$, and a convex object side surface;
a second lens component 502, 602, 702 having a negative refractive power and a focal length $f_2$;
a third lens component 503, 603, 703 having a positive refractive power and a focal length $f_3$;
a fourth lens component 504, 604, 704 having a positive refractive power and a focal length $f_4$; and
a fifth lens component 505, 605, 705 having a negative refractive power and a focal length $f_5$.

In addition, at least one surface, the object side or the image side, of each of the five lens components is aspheric. In some embodiments both the object side surface and the image side surface of one or more of the five lens components is aspheric.

The lens system 510, 610, 710 forms an image on or near the surface of an image sensor 518, 618, 718. A cover material 516, 616, 716, such as a cover glass or an infrared cut filter, may be placed between the lens systems 510, 610, 710 and the image sensor 518, 618, 718.

In at least some embodiments of the lens systems 510, 610, 710 illustrated in FIGS. 13, 16, and 19, the wafer lens component 501, 601, 701 with positive dioptric power and focal length $f_1$ may comprise two wafer lenses 520, 530, 620, 630, 720, 730.

Referring to the lens system 510 illustrated in FIG. 13, the wafer lenses 520, 530 may each include a planar substrate 522, 532, which may be a planar glass substrate. A laminate layer 524, 534 of polymeric or plastic material may be formed on one surface of the planar substrate 522, 532 using known manufacturing methods such as casting, molding, or microlithographic process. If polymeric material is used it may be a UV curable polymeric. The laminate layer 524, 534 is formed with a shape that provides the refractive power for the wafer lens. The two wafer lenses 520, 530 may be arranged so that the first laminate layer 524 faces the object side and the second laminate layer 524 faces the image side. The plano surfaces of the two planar substrates 522, 532 may face one another either in full overall contact or in spaced parallel relation with the spacing being of such small magnitude that it does not enter into the lens computations.

The wafer lens component is comprised as a unit of the combination of a polymeric laminate layer and a planar substrate, which may be a planar glass substrate. Thus the refractive power of the wafer lens component is provided by the laminate layer or layers and the planar substrate or substrates. The laminate layer and the planar substrate will generally have different characteristics such as the indices of refraction and Abbe numbers. These composite optical materials contribute to the refractive power of the wafer lens component and these composite material refractive indices are considered in the computation of the refractive power of the wafer lens or wafer lens group. Therefore, the wafer lens component differs optically from a lens element of the same geometry that is formed of a single transparent mass of refractive material and the planar substrate of the wafer lens does enter into the lens computations.

The wafer lens component 501 may include an electrochromic layer 514 that provides a variable light transmittance in response to an applied electrical voltage. The electrochromic layer 514 may serve the function of a variable aperture stop. The electrochromic layer 514 may be located in between the image side planar surface of the first wafer lens substrate 522 and the object side planar surface of the second wafer lens substrate 532. The electrochromic layer 514 may be composed of transparent film layer of electrically conductive organic or inorganic material, such as metallic oxides and conductive polymers.

The lens systems 610, 710 illustrated in FIGS. 16 and 19 show a structure for the wafer lens component 601, 701 that is similar to the structure for the wafer lens component 501 that is illustrated in FIG. 13. In FIGS. 16 and 19 features similar to those in FIG. 13 have the same last two digits in the reference numerals.

FIG. 25A shows a side elevation of a wafer lens component 2501. FIG. 25B shows a pictorial view of the wafer lens component 2501. FIG. 25C shows an exploded pictorial view of the wafer lens component 2501. The wafer lens component 2501 has a planar substrate 2522 with a refractive element 2524 molded on a first plano surface of the planar substrate and a light controlling element 2514 applied to the opposite plano surface of the planar substrate. The light controlling element may be on either the object side or the image side of the planar substrate. A second refractive element 2526 is molded on the light controlling element 2514 on the side of the light controlling element opposite from side applied to the plano surface of the planar substrate. This arrangement of the wafer lens component 2501 is similar to the wafer lens component of the embodiments shown in FIGS. 7 and 10. While the light controlling element 2514 is illustrated as having a substantial thickness for clarity, in some embodiments the light controlling element may be a thin film that is much thinner than what is suggested by the figures. in some embodiments the light controlling element may be 1 to 2 microns thick.

The light controlling element 2514 may be in the form of an aperture stop that includes an opaque material which defines a transparent opening, such as a circular opening, centered on the optical axis. In another embodiment the light controlling element may be in the form of a neutral density filter that reduces the intensity of light uniformly over the entire surface.

Figure 28:
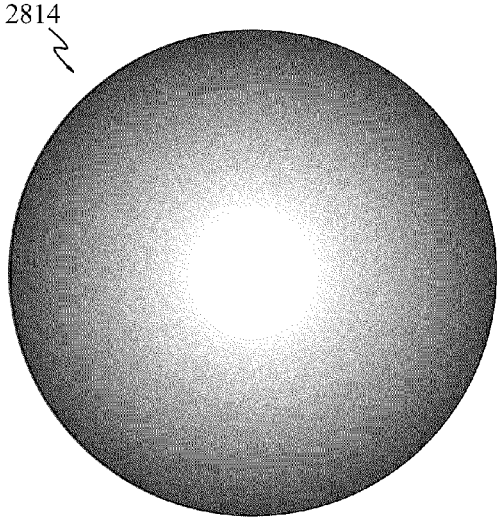
FIG. 28 shows a plan view of an apodized aperture.

In yet another embodiment the light controlling element may be in the form of an apodized aperture that reduces the intensity of light by a smoothly increasing amount as the distance from the optical axis increases, as suggested by FIG. 28. An apodized aperture may provide a smoothly increasing attenuation of transmitted light from a central transparent opening with substantially no attenuation to a fully opaque outer edge that fully attenuates transmitted light. In other embodiments, an apodized aperture may provide a smoothly increasing attenuation of transmitted light that begins with a substantial attenuation and/or ends before fully attenuating the light. For example, an apodized aperture may include a transparent circular opening centered on the optical axis joined to an opaque outer ring by an apodized ring. The apodized ring may provide a smoothly increasing attenuation of transmitted light that begins at the outer edge of the transparent circular opening with a substantial attenuation of perhaps 20% and ends at the inner edge of the opaque outer ring with less than full attenuation of perhaps 80%.

The light controlling element 2514 may provide a variable light transmittance. In some embodiments, the light controlling element may be a thin film layer of conductive organic or inorganic material applied to the planar substrate 2522 to provide an electrochromic lens component having variable light transmittance in response to an applied electrical voltage. In one embodiment, the electrochromic lens component provides a variable neutral density filter.

Figure 26:
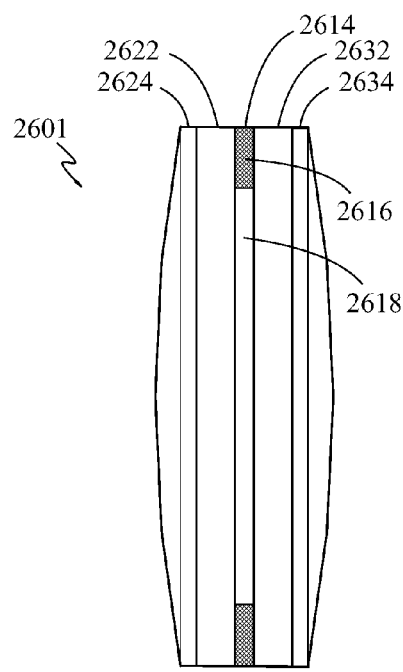
FIG. 26 shows a side elevation of another wafer lens component.

FIG. 26 shows a side elevation of another wafer lens component 2601. The wafer lens component 2601 has a first planar substrate 2622 with a first refractive element 2624 molded on a first plano surface of the first planar substrate. The wafer lens component 2601 further has a second planar substrate 2632 with a second refractive element 2634 molded on a second plano surface of the second planar substrate. The first refractive element 2624 and the second refractive element 2634 are arranged to form the two outside elements of the wafer lens component 2601. A light controlling element 2614 is placed between the first planar substrate 2622 and the second planar substrate 2632 to be supported by the plano surfaces of the planar substrates opposite the plano surfaces on which the refractive elements 2624, 2634 are molded. This arrangement of the wafer lens component 2601 is similar to the wafer lens component of the embodiments shown in FIGS. 22 and 25. The light controlling element 2614 may be of any of the forms previously described in connection with FIGS. 25A-25C. The placement of a light controlling element 2614 between two planar substrates 2622, 2632 may be advantageous when the light controlling element is thin, for example only a few microns thick.

Figure 27:
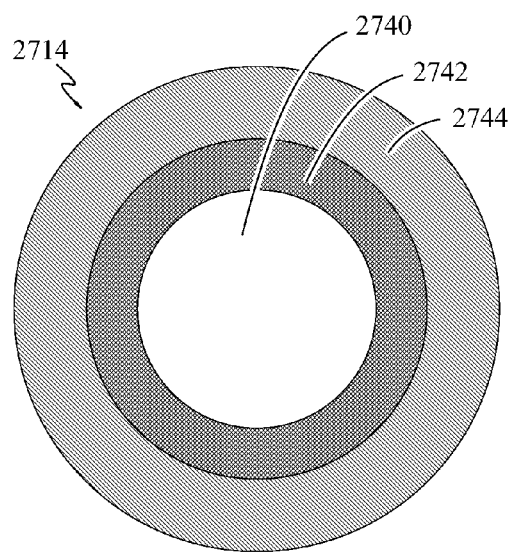
FIG. 27 shows a plan view of an electrochromic lens component that provides a variable aperture stop.

FIG. 27 shows a plan view of an electrochromic lens component 2714 that provides a variable aperture stop. The embodiment illustrated includes a transparent circular opening 2740 centered on the optical axis. The transparent circular opening 2740 is surrounded by two concentric annular rings 2742, 2744. The concentric annular rings may be electrochromic films that are adjustable between being substantially transparent to being substantially opaque to provide a solid state equivalent of a mechanical aperture stop.

In another embodiment an electrochromic lens component may provide an apodized aperture of the type illustrated in FIG. 28 with a variable intensity profile distribution across the aperture opening for the light energy transmitted through the optical system.

FIGS. 29-37 illustrate embodiments of electrochromic lens components that may be used to provide a light control for some embodiments of the lens system described herein.

Figure 29:
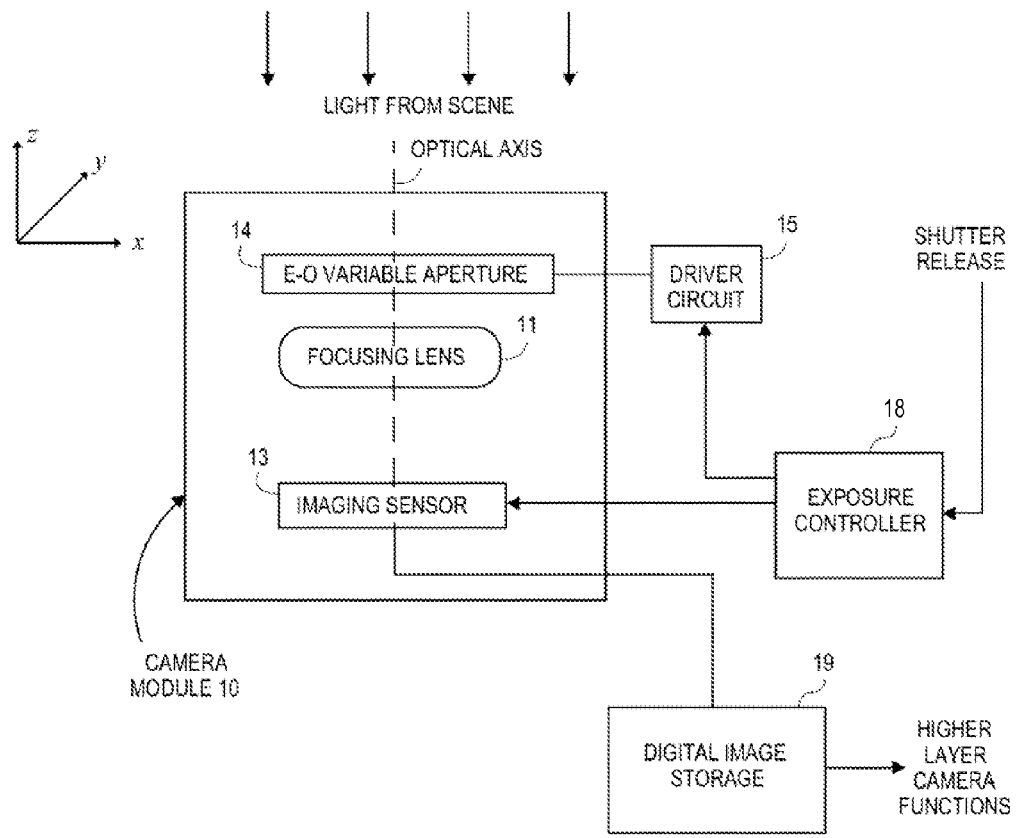
FIG. 29 is a block diagram of camera-related elements including a camera module and associated electronics circuitry.

FIG. 29 is a block diagram of the camera module 10 together with electronic circuit elements that are needed to implement the camera function. Note that there may be additional functions that are implemented in the consumer electronics device as is known to those of ordinary skill in the art but that are not described here in the interest of conciseness, e.g. communication network interfaces, display screens, touch screens, keyboards, and audio transducers. The camera module 10 has an imaging sensor 13 that is part of an optical system, which also includes a focusing lens 11 and an electro-optically (E-O) variable aperture 14. These optical components are aligned to an optical axis as shown. Note however, that while in this particular example all of the optical components are in a straight line, in other embodiments there may be a mirror or other optical deflector that allows one or more of the components to be positioned off of a straight line. Nevertheless, those components may still be considered "aligned with the optical axis." What is shown in FIG. 29 is a particularly efficient mechanism (in terms of packaging) that can fit within the tight confines of a low z-height device such as a smart phone, a tablet computer, or a laptop computer, where, in particular, all of the optical interfaces are positioned substantially parallel to a front or rear face of the external housing of the device. In other words, each optical component lies flat within an x-y plane with its height given in the z-direction shown.

The imaging sensor 13 may be any conventional solid-state imaging sensor such as a complementary metal oxide semiconductor (CMOS) sensor chip, which presents an interface to an exposure controller 18 to receive certain parameters for determining an exposure for taking a picture. The sensor parameters may include pixel integration time, which may be set by the exposure controller 18 in accordance with any suitable exposure control algorithm that considers various input variables (e.g., level of scene illumination and the availability of a flash or strobe illumination). The exposure controller 18 may automatically perform the algorithm to determine an appropriate exposure setting, and then signal the imaging sensor to update its parameters in response to a manual shutter release command (e.g., in response to a mechanical or virtual shutter button being actuated by a user of the device). The exposure controller 18 may be implemented as a programmed processor or as a completely hardwired logic state machine together with stored parameter options. Once a digital image has been captured by the imaging sensor 13 under the chosen exposure setting, it may be transferred to a digital image storage 19 (e.g., solid state volatile or non-volatile memory), prior to being further processed or analyzed by higher layer camera functions that yield for example a still picture file (e.g., in a JPEG format) or a video file (e.g., in a digital movie format).

Also included in the camera module 10 is a focusing lens 11 which may include one or more lens components that serve to focus light from the scene onto the imaging sensor 13 (thereby producing an optical image on an active pixel array portion of the imaging sensor 13). The focusing lens 11 may be one of the lens systems described herein. The focusing lens 11 may be part of either a fixed focus optical subsystem, or a variable focus subsystem that implements an autofocus mechanism. In the case of an auto focus mechanism, additional control parameters relating to lens position can be set by the exposure controller 18 for each exposure to be taken, as is apparent to those of ordinary skill in the art.

The camera module 10 also has the E-O variable aperture 14, which for the purposes of the block diagram is shown as being positioned in front of the focusing lens 11 on the optical path. When used with embodiments of the lens system described herein, the E-O variable aperture 14 will be located within the focusing lens 11. The aperture 14 effectively implements a pupil whose width or size is electrically variable. The aperture 14 may be positioned at any suitable aperture location along the optical axis in front of the imaging sensor 13. When the aperture 14 has been electrically controlled into a small or narrow pupil, highly collimated rays are admitted by it, which results in a sharp focus at an image plane of the optical system. On the other hand, when the aperture 14 is configured into a large or wide pupil, un-collimated rays are admitted resulting in an optical image that is sharp around what the focusing lens 11 is focusing on, and may be blurred otherwise. The aperture 14 thus determines how collimated the admitted rays of light from the scene are, that ultimately come to a focus in an image plane. The aperture 14 also determines the amount of incident light or how many incoming rays are admitted, and thus how much light reaches the imaging sensor, where of course the narrower the aperture the darker the digital image that is captured by the sensor 13 (for a given integration time). Control of the effective pupil size of the aperture 14 is achieved using an electronic driver circuit 15, which may receive a control signal or command from the exposure controller 18 that may represent the desired size of the effective pupil. The driver circuit 15 translates this input command into a drive voltage that is applied to the input transparent conductors of the aperture 14, as described below.

Figure 30:
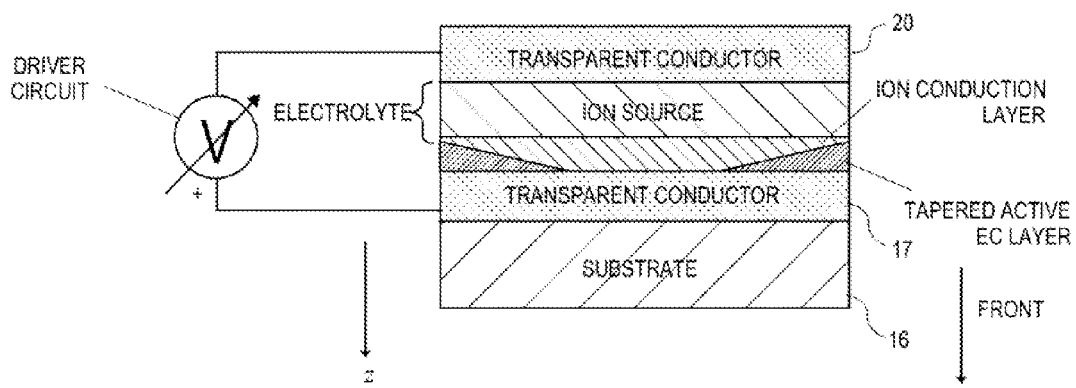
FIG. 30 is a cutaway view of an E-O variable aperture in accordance with an embodiment of the invention.

Turning now to FIG. 30, a cutaway view of the aperture 14 in accordance with an embodiment of the invention is shown. As can be seen, the aperture 14 has a stack that includes a front transparent conductor medium 17 which in this example is connected to the "+" terminal of the driver circuit, an electrolyte medium, an active EC medium, and a rear transparent conductor medium 20 (connected to the complimentary terminal of the driver circuit). In one embodiment, the elements of the stack are formed to be in contact with one another as they are depicted in the figure, i.e. the electrolyte medium is formed as a layer whose surface is in contact with the rear transparent conductor layer 20, and whose opposite surface is in contact with the active EC medium, e.g. an active EC layer, while a surface of the latter is in contact with the front transparent conductor layer 17.

In one embodiment, the electrolyte medium consists of an ion source medium that is adjacent to the rear transparent conductor 20 and is in contact with an ion conduction medium, which in turn is adjacent to the active EC layer. Here, an ion source layer is formed that is not in contact with the active EC layer, but rather is in contact with the ion conduction layer, the latter being in contact with the active EC layer. In other words, the ion conduction layer is entirely sandwiched between the ion source layer and the active EC layer. This arrangement may also be found in other embodiments of the aperture 14, for instance as they are depicted in the cut away views of FIGS. 31-33.

The ion source layer stores suitable ions, for example, lithium ions, that will be used for activating the EC layer when a sufficient charge field, that may be generally vertically directed in the context of the figures here, has been generated between the transparent conductor layers 17, 20. In addition, the ion source layer should be sufficiently clear or transparent to allow light rays from the scene to pass through (in a generally vertical direction in the context of the figures here). The ion source layer may also be referred to as a counter electrode layer.

The ion conduction layer allows for high mobility of the ions that have been produced by the ion source when entering the active EC layer.

The transparent conductor layers 17, 20 in the front and rear are formed on a plano surface of a substrate 16 as shown in FIG. 30. The stack-up of layers, shown in all of the figures here as starting with the transparent conductor layer 17, may be formed on upon another. The substrate is an element of a wafer lens as previously described. The substrate may be made of glass, polycarbonate, or other suitable material or composition that is transparent enough for use in an optical system of a consumer electronics camera and that can be used to support the formation of the transparent conductor layers 17, 20 and one or two refractive components.

A transparent conductor may be, for example, a layer of indium tin oxide (ITO) or other transparent conductive material that is formed as a relatively thin layer. The transparent conductor provides a conductive path for charge from the driver circuit to be applied to the ion source while at the same time allowing the free passage of light rays from the scene. In this case, the front transparent conductor layer 17 is formed on a rear face of the front substrate 16. Note that the references here to "front" and "rear" are only to make it easier to describe the structure of the aperture 14 and are not intended to be otherwise limiting. For example, in one embodiment, the incident light enters that stack up through the front substrate 16 that is at the bottom of the stack shown in FIG. 30; the aperture 14 may also work where the incident light from the scene enters the aperture in the reverse direction, e.g. through a rear substrate.

Still referring to FIG. 30, in this embodiment, the active EC layer is tapered at its edge as shown, forming a gradual ring rather than having an abrupt or step-like edge. The ring-shape is apparent as viewed from above (not shown). In other words, while the EC layer spreads substantially perpendicular to an optical axis of the camera module 10 (see FIG. 29) it does not have uniform thickness and instead has a tapered thickness that drops to essentially zero within an empty inner region of the EC layer as shown in FIG. 30. In this case, this empty inner region is substantially aligned with or centered with the optical axis. The downward tapering of the EC layer makes way for the material of the ion conduction layer to fill that gap, resulting in a substantially frusto-conical shape for the ion conduction layer as seen in FIG. 30. The tapered active EC layer thus presents a minimum pupil width for the aperture 14, being in this case co-extensive with the bottom of the tapered active EC layer.

In operation, the aperture 14 presents effectively a wide pupil so long as there is insufficient current through the outer region of the EC medium, which can be achieved when essentially zero voltage is being applied by the driver circuit to the front and rear transparent conductors. When the driver increases the voltage, ions are forced to travel from the electrolyte medium through the tapered active EC layer, which darkens that outer region of the EC layer. Here it should be noted that the darkness of the EC layer depends on the thickness at that point, in addition to the strength of the current at that point. Thus, the darkness change in the tapered EC layer is gradual in that the darkness increases as one moves outward, away from the center optical axis, for a given fixed voltage. The shape of the taper at the edge of the EC layer may be tuned in order to tune the diffraction qualities of the optical system. This may help create a sharper image on the imaging sensor 13 (see FIG. 29) than an E-O aperture that has an abrupt edge within the active EC layer. For example, tuning the edge of the EC layer may help reduce color aliasing artifacts by reducing spatial frequency response at very high frequencies, and increasing low spatial frequency response (sharpness).

Although not shown in the drawings, a top view of the aperture 14 reveals that the inner region which may be centrally aligned with the optical axis may be formed into any suitable shape, although it is expected that a circular shape may produce improved results in that it matches the naturally circular shape of a lens component of the focusing lens 11. Also, while there are several references here to a "ring" or "ring-like" shape, this does not mean that the external boundary of that shape is necessarily also circular, but rather that the shape is merely annular in that there is an essentially empty inner region surrounded by a non-empty outer region.

The overall process of activation and deactivation of the EC layer is reversible, so that the outer region of the active EC layer can transition from a substantially clear (transparent) state into a colored or dark state (in response to sufficient current being produced through it) and back (when the activation voltage is removed).

In one embodiment, in its clear state (e.g., at zero drive voltage), the aperture 14 has at least 95 percent transmission of light in a visible band of interest (for consumer electronics digital photography); when the effective pupil diameter is then decreased by three "aperture stop" steps (where each step reduces the diameter by a factor of square root of 2, or about 1.414, hence a halving of the effective area of the pupil), the aperture 14 should still exhibit at least 75 percent light transmission.

Figure 34:
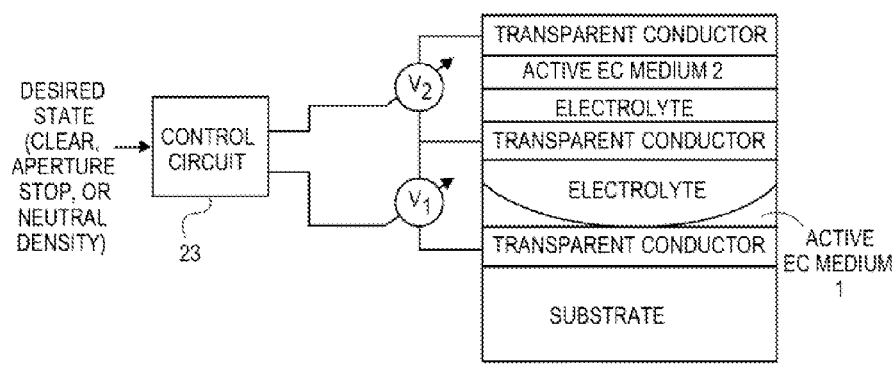
FIG. 34 is a cutaway view of a camera E-O aperture structure that can have at least three states, including a neutral density filter state.

In one embodiment, referring now to FIG. 34, a stack-up according to FIG. 30 having active EC medium 1 is combined with another stack-up having EC medium 2. This enables the structure as a whole (shown in FIG. 34) to be controlled or switched into three states, namely a clear state, a dark aperture stop (or stopped down) state, and a neutral density state in which the aperture as a whole exhibits substantially homogeneous reduction in intensity of light from the scene (across all visible colors or wavelengths of interest). A control circuit 23 translates the input request into suitable driver voltage settings of variable voltage sources V1 and V2 which in turn cause the active EC media 1, 2, respectively, to exhibit the proper opacity.

Figure 31:
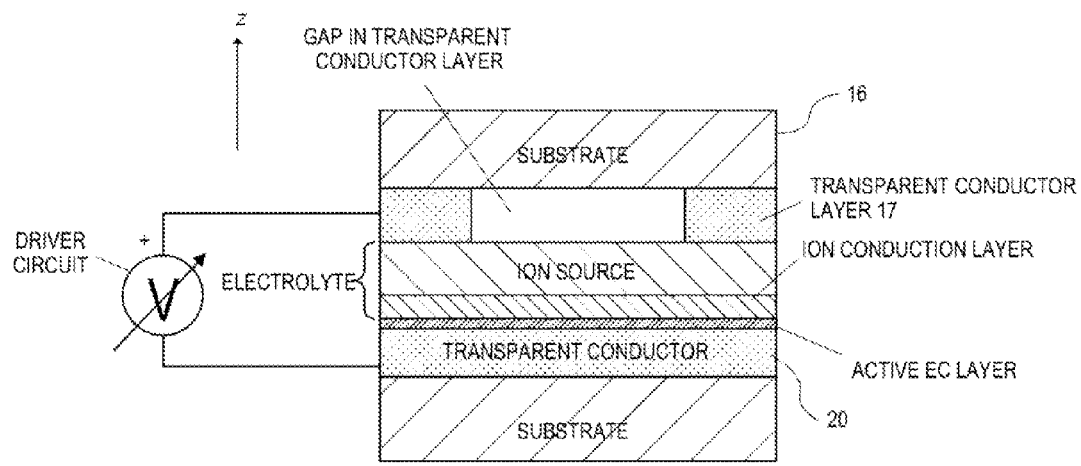
FIG. 31 is a cutaway view of an E-O variable aperture in accordance with another embodiment.

Turning now to FIG. 31, a cut away view of another embodiment of the invention is shown, where in this case the aperture stack is formed such that its front transparent conductor medium or layer 17 is a patterned layer. In particular, as shown in FIG. 31, the front transparent conductor layer 17 has a gap or hole formed in it (e.g., through chemical or mechanical etching) that is substantially aligned with or centered with the optical axis. This gap results in insufficient current being generated through the portion of the active EC layer that lies directly under the gap, to activate that portion of the EC medium. In other words, a ring-like current is generated through the active EC layer (when the activation voltage is applied by the driver circuit). This ensures that the inner region of the aperture stack remains essentially clear, forming a minimum effective pupil width, substantially coextensive with the gap in the transparent conductor layer 17, at a high activation voltage, and yields a progressively larger pupil width as the activation voltage is reduced. In this embodiment, the EC medium consists of an active EC layer that is substantially perpendicular to the optical axis but that also has essentially uniform thickness as shown. The voltage applied by the driver circuit may be modulated or changed continuously from a low or minimum level such as zero volts, which yields a low opacity in the outer region of the EC layer, to a high voltage that yields a high opacity in the outer region of the EC layer.

Figure 32:
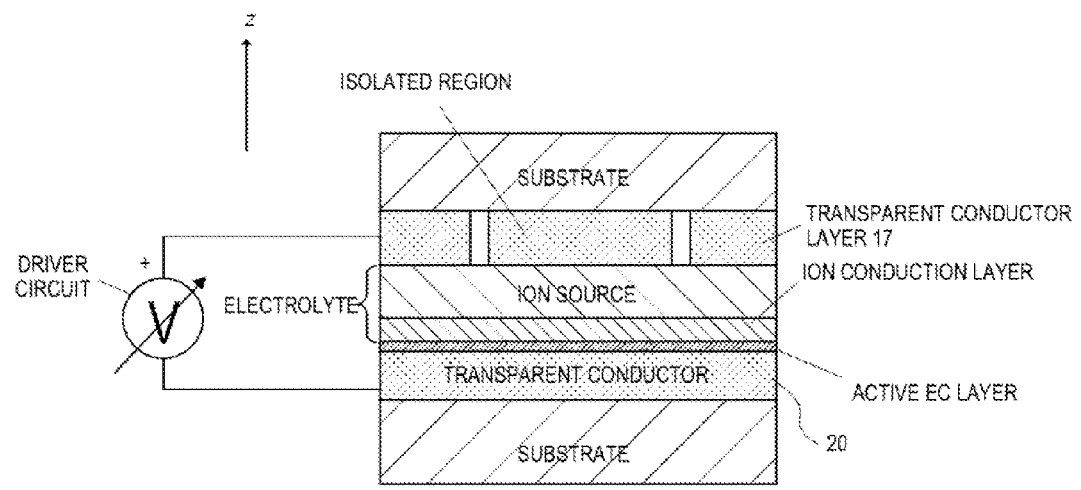
FIG. 32 is a cutaway view of yet another embodiment.

Referring now to FIG. 32, this cut away view illustrates an embodiment where the front transparent conductor layer medium 17 of the aperture stack contains an inner transparent conductor plug region, also referred to as an isolated region, i.e. electrically isolated from an outer region of the front transparent conductor medium 17. This isolated region may be essentially centered or aligned with the optical axis. It may remain electrically floating or it may alternatively be tied to a different voltage than the outer region of the front transparent conductor medium 17, while the latter is being driven to an activation voltage by the driver circuit. This mechanism again produces a ring-like current through an outer region of the active EC layer, thereby maintaining very low opacity in the inner region of the active EC layer. Thus, similar to the embodiments described above, at a high drive voltage, the outer region of the active EC layer (which is subjected to the ring-like current) reaches high opacity, while its inner region is subjected to essentially no or very low current and thus remains at low opacity.

It should be noted that a further advantage of the embodiment of FIG. 32 over that of FIG. 31 may be that the difference in optical property between the inner region of the optical path through the aperture 14 (centered or aligned with the optical axis), and the outer region of the optical path (which is subjected to greater opacity by the active EC layer) is reduced, when the drive voltage is minimum and the pupil size is at its widest. In other words, light rays from the scene that pass through the inner region of the aperture 14 will be subjected to essentially the same optical characteristics as the light rays that travel through the outer region (assuming that the effect of the physical gap shown between the isolated region and the outer region of the front transparent conductor layer 17 in FIG. 32 can be ignored). This might not be the case with the embodiment of FIG. 30 (because of the tapered active EC layer) and with the embodiment of FIG. 31 (because of the substantial gap in the transparent conductor layer 17).

Figure 33:
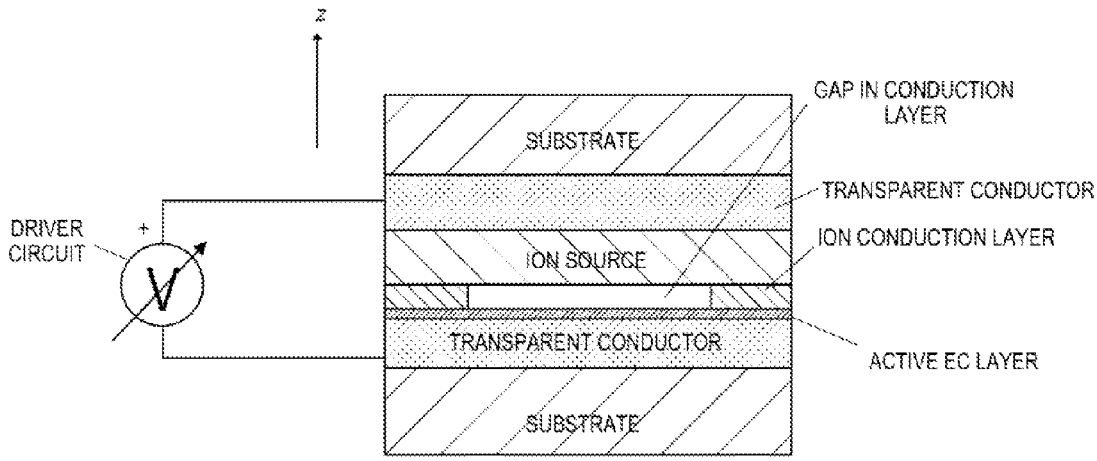
FIG. 33 is a cutaway view of a further embodiment of the E-O variable aperture.

Turning now to FIG. 33, in yet another embodiment of the aperture stack, the ion conduction medium or layer becomes a patterned layer as shown, by forming a gap or hole in what may be an otherwise uniformly thick ion conduction layer. The hole may be substantially aligned or centered with the optical axis as shown. This means that when the activation voltage is applied by the driver circuit, not enough ions from the ion source layer will be traveling through the (empty) inner region of the ion conduction layer, and thus should not impact the inner region of the active EC layer that lies directly underneath the hole. Thus, there should be no substantial darkening of the inner region of the active EC layer. Once again, a minimum effective pupil width is achieved in this case, using a different mechanism than those described in FIGS. 30-32. Once again, a ring-like current is generated through the EC layer (when the activation voltage is applied by the driver circuit) in order to reduce the width of the aperture. The minimum width or area of the aperture may correspond to essentially the size of the hole in the ion conduction layer.

Figure 35:
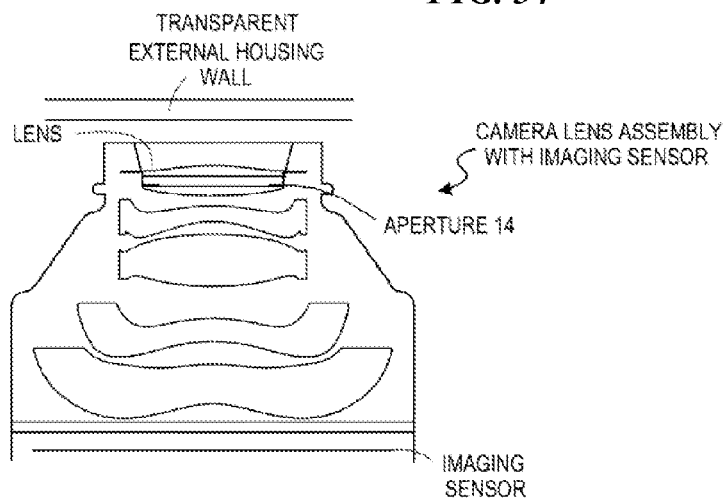
FIG. 35 shows an optical system of a camera module integrated in a consumer electronics device, in which the E-O aperture may be placed.

FIG. 35 shows an optical system of a camera module integrated in a consumer electronics device, in which the E-O aperture may be placed. The lens assembly includes a lens and an image sensor. The object side of the lens may be adjacent a transparent external housing wall for the consumer electronics device such that the optical axis of the lens extends through the transparent external housing wall. The E-O aperture 14 is included in the first lens component on the object side of the lens. The lens component that includes the E-O aperture 14 is the lens component nearest the transparent external housing wall.

Figure 36:
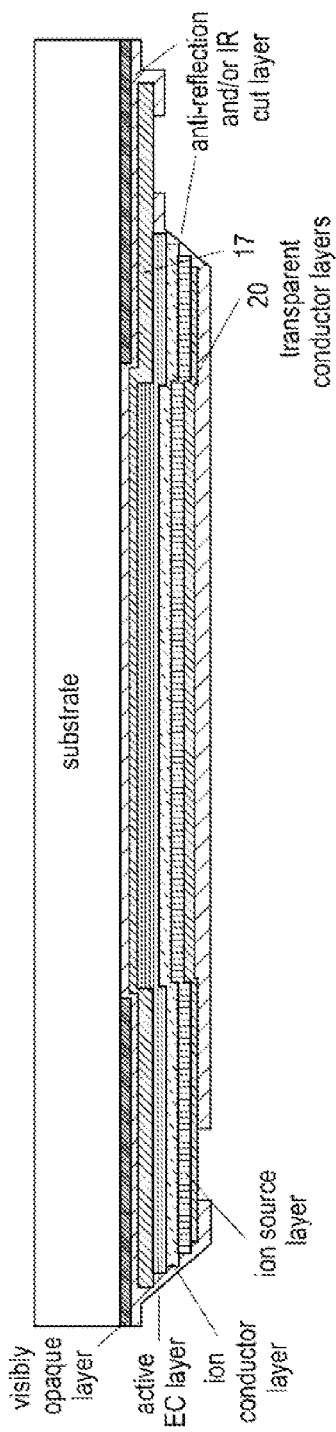
FIG. 36 is a cut-away view of an electro-optic aperture.

Turning now to FIG. 36, a section view of an electro-optic aperture is shown in accordance with another embodiment of the invention. A stack of the aperture here is similar to the embodiment of FIG. 30 in that there is a substrate on which a transparent conductor medium or layer 17 has been formed. As suggested above, the substrate may be made of any suitable material such as sapphire or glass or other sufficiently transparent material on which the stack of the electro-optic aperture and a refractive element may be formed. In contact with the transparent conductor medium 17 is an active EC layer, an opposite surface of which is in contact with an ion conduction layer. The latter is in contact with an ion source layer. This entire sandwich is bounded by the front and rear transparent conductor layers 17, 20. In the embodiment of FIG. 36, there is also a front anti-reflection and/or infrared (IR) cut layer that has been formed between the front transparent conductor layer 17 and the substrate. In addition, the imaging path through the aperture has been defined, in this case, by the addition of a visibly opaque layer having an inner opening. The visibly opaque layer in this example has been applied directly to the substrate, and is formed between the substrate and the adjacent anti-reflection and/or IR cut layer. Note also that openings are formed in the front anti-reflection and/or IR cut layer and a rear anti-reflection layer, so as to allow electrical contacts (not shown) to directly connect with the front and rear transparent conductor layers 17, 20, in order to apply the electro-optic aperture's activation voltage. In this case, the front and rear anti-reflection and/or IR cut layers entirely envelop or cover the aperture stack, except for the regions needed to make electrical contact (as shown).

Figure 37:
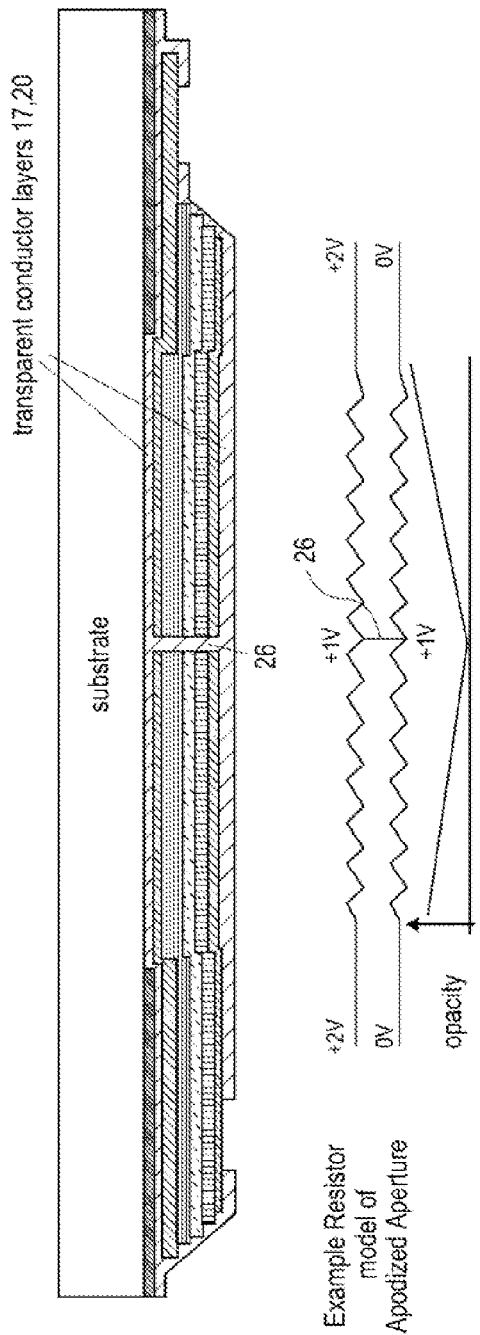
FIG. 37 is a cut-away view of an embodiment of the invention in which a conductive section has been added to directly connect the transparent conductor layers, within the imaging path.

Turning now to FIG. 37, another embodiment of the invention is shown in which the stack of FIG. 36 has been modified by the addition of a conductive section 26. This is described in FIG. 37 as being a small electrical short that is located approximately at the center of the imaging path, directly connecting the two transparent conductor layers 17, 20. In one embodiment, this conductive section or short 26 is relatively small, for example, on the order of about 10 micrometers thick or wide. The conductive section may be formed somewhat similar to how a via is formed in a microelectronic manufacturing process between different metal layers of an integrated circuit. Note that the conductive section 26 may be made of the same material as the front and rear transparent conductor mediums 17, 20.

FIG. 37 also shows an example resistor circuit model of such an "apodized" aperture, in which an activation voltage of in this case 2 Volts is being applied to the two transparent conductor layers 17, 20. The conductive section 26 by virtue of being located at the center of the imaging path will have the midpoint voltage of about +1 Volt. Note, however, that the potential across the active EC medium will vary from essentially zero volts at the center (due to the presence of the conductive section 26) and progressively greater towards the periphery of the imaging path, here up to 2 Volts at the periphery. This means that the EC medium is least opaque at the center, and progressively more opaque moving outward to the periphery. It can also be seen that if the conductive section 26 is made thicker or larger, the smallest or minimum pupil size of the aperture may also be larger, because the region of the EC layer across which there is zero voltage is larger.

Although FIG. 37 shows the conductive section 26 as being oriented at about 90° relative to the front and rear transparent conductor layers 17, 20, and is located closer to a center rather than a periphery of a cross-section of the imaging path, an alternative may be to locate and orient or shape the conductive section 26 differently. In addition, there may be more than one such discrete conductive section or short that directly connects the transparent conductor layers 17, 20.

Figure 38:
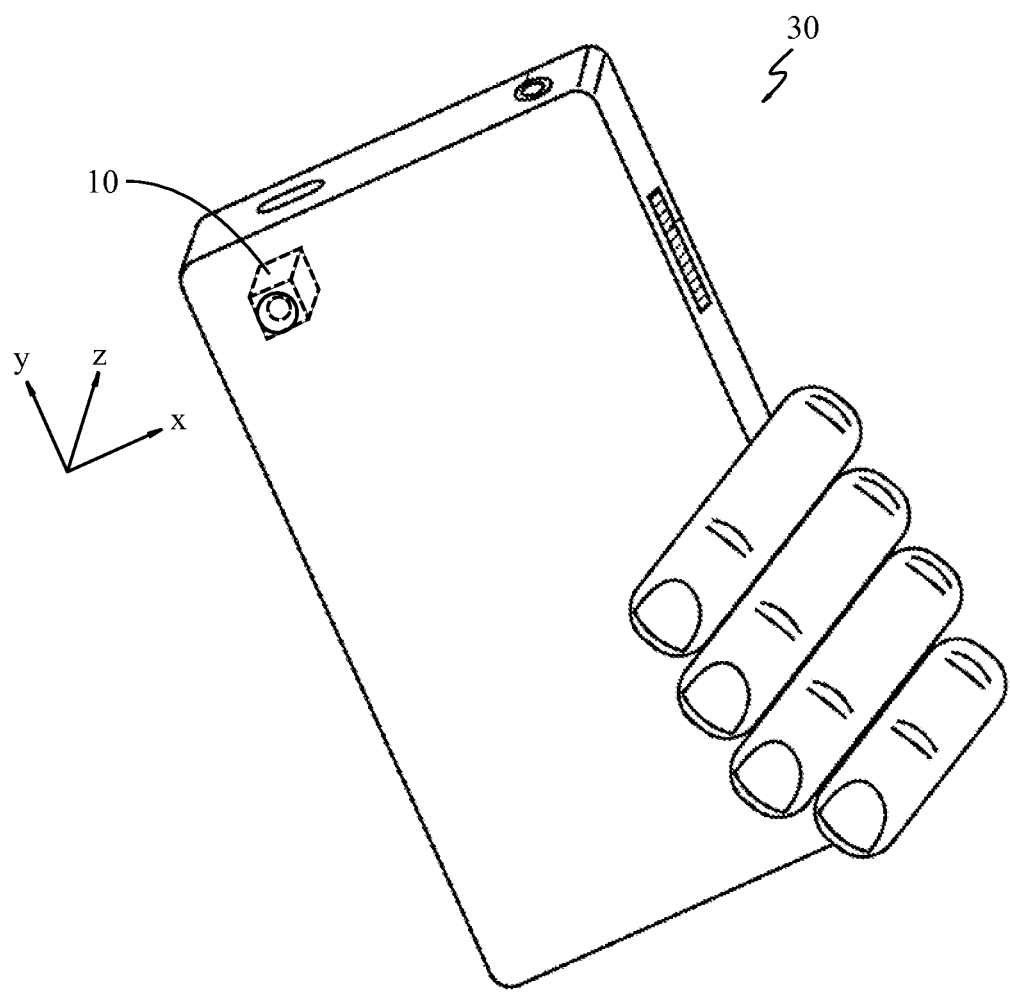
FIG. 38 is a perspective view of a portable wireless communications device in which a camera module is integrated.

Referring now to FIG. 38, a perspective view of a portable wireless communications device 30 in which a camera module 10 using a lens system in accordance with an embodiment of the invention is integrated. The device in this case may be a smart phone or a tablet computer, which is a handheld device in the sense of being intended for use while held in a single hand of the user. Of course, the camera module 10 may alternatively be integrated in other types of portable wireless devices, such as laptop or notebook computers, and it may also be integrated within non-portable devices such as desktop personal computers, television monitors, or any other electronic device that has a particularly short profile in the Z-axis (Z-height). In the case of the smart phone or tablet computer, the device has an outer housing in which is integrated a cellular network wireless communications circuit that enables the device to function as a mobile telephony terminal or end station. The portable wireless communications device may have an outer housing whose Z-height is in the range of 8 mm-13 mm, thereby being particularly fitting to receive therein a camera module that has a Z-height within the range of 6 mm-9 mm. The lens systems described herein are suitable for creating compact lens systems having a low F-number and a wide field of view that may be used in such camera modules.

The following Tables provide example values for various optical and physical parameters of embodiments of the lens systems as described herein and illustrated in FIGS. 1, 4, 7, 10, 13, 16, 19, and 22. These tables may be described as providing optical prescriptions for the exemplary lens systems. For example, Tables 1A and 1B provide an optical prescription for the example embodiment of the lens system 110 with five lens components as illustrated in FIG. 1.

In the Tables, all dimensions are in millimeters unless otherwise specified. A positive radius indicates that the center of curvature is to the image side of the surface. A negative radius indicates that the center of curvature is to the object side of the surface. "INF" stands for infinity (as used in optics). "ASP" indicates an aspheric surface, and "FLT" indicates a flat surface. The thickness (or separation) is the axial distance from the intersection of a surface with the optical axis to the intersection of the next surface with the optical axis. The design wavelengths represent wavelengths in the spectral band of the imaging system.

For materials of the lens elements, window, wafer substrate, and IR filter, a refractive index $N_d$ at the helium d-line wavelength is provided, as well as an Abbe number $V_d$ relative to the d-line and the C- and F-lines of hydrogen. The Abbe number, $V_d$, may be defined by the equation:

$$V_d = (N_d - 1)/(N_F - N_C),$$

where $N_F$ and $N_C$ are refractive index values of the material at the F and C lines of hydrogen, respectively.

Referring to the Tables of aspheric constants (Tables 1B, 2B, 3B, 4B, 5B, 6B, 7B, 8B, and 9B), the aspheric equation describing an aspherical surface may be given by:

$$Z = \frac{cr^2}{1 + \sqrt{1 - (1+K)c^2 r^2}} + Ar^4 + Br^6 + Cr^8 + Dr^{10} + Er^{12} + Fr^{14} + Gr^{16}$$

where Z is the sag of the surface parallel to the Z-axis (for all embodiments the Z-axis coincides with the optical axis);

c is the curvature of the surface (the reciprocal of the radius of curvature of the surface);

K is the conic constant; and

A, B, C, D, E, F, and G are the aspheric coefficients.

In the Tables "E" denotes exponential notation (powers of 10).

Note that the values given in the following Tables for the various parameters in the various embodiments of the lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some of the values in the Tables may be scaled up or down for larger or smaller implementations of a camera using an embodiment of a lens system as described herein.

Further note that the surface numbers (Si) of the elements in the various embodiments of the lens system as shown in the Tables are listed from the first surface 0 at the object plane to the last surface at the image plane. Since number and location of elements may vary in embodiments, the surface number(s) that correspond to some elements may vary in the different Tables. For example, for the lens systems shown in Tables 1A, 2A, and 8A the aperture stop is surface 2 and surface 3 is a dummy surface. The first lens element has surfaces 4 and 5 for the lens systems shown in Tables 1A and 8A. Note that where reference is given to the radius of curvature ($R_i$) of the surfaces of the lens element in this document, the reference ($R_i$) used (e.g., $R_1$ and $R_2$ for the surfaces of the first lens component are the same for all of the embodiments. But these surface numbers may, but do not necessarily, correspond to the surface numbers of the lens components as given in the Tables.

The effective focal length of the lens systems is given by f. The total track length (TTL) of the lens systems is the distance along the optical axis between the object side surface of the first component $L_1$ and the image plane. The lens systems are configured such that the ratio (TTL/f) of the lens systems satisfy the relation:

$$1.2 < TTL/f < 1.4$$

An aperture stop AS, which may be located near the front object side lens component $L_1$, may determine the entrance pupil of the lens system. The lens system focal ratio or f-number is defined as the lens system effective focal length f divided by the entrance pupil diameter. The IR filter 118 may act to block infrared radiation that could damage or adversely affect the photosensor, and may be configured so as to have no effect on f.

Embodiments of the lens systems described herein cover applications in the visible region of the spectrum from 470 nanometers (nm) to 650 nm with a reference wavelength at 555 nm. The optical prescriptions in the following Tables provide high image quality for the stated f-number over 470 nm to 650 nm spectrum.

The five lens components $L_1$, $L_2$, $L_3$, $L_4$, and $L_5$ of the exemplary lens systems may be composed of plastic materials with refractive indices and Abbe numbers as listed in the Tables. In at least some embodiments, three types of plastic materials may be used for the lens components. Lens component $L_1$ may be composed of a first plastic material with an Abbe number of 56.3, lens components $L_3$, $L_4$, and $L_5$ may be composed of a second plastic material with an Abbe number $V_1$ of 55.9, and lens component $L_2$ may be composed of a third plastic material with an Abbe number $V_2$ of 21.5. In other embodiments, plastic materials with similar Abbe numbers may be used. It is desirable that the Abbe number $V_2$ for the plastic material used for the second lens component $L_2$, which has a negative refractive power, be substantially less than the Abbe numbers for the plastic materials used for the remaining lens components. The application of these plastic materials for the lens components allows the lens system to be optimized and corrected for chromatic aberrations over the visible region.

The lens component materials may be chosen and the refractive power distribution of the lens components may be calculated to satisfy the effective focal length f and correction of the field curvature or Petzval sum. The monochromatic and chromatic variations of optical aberrations may be reduced by adjusting the radii of curvature and aspheric coefficients or geometrical shapes of the lens components and axial separations as illustrated in the Tables to produce well corrected and balanced minimal residual aberrations.

FIG. 1 is a cross-sectional illustration of an example embodiment of a compact lens system 110 having a first lens component $L_1$ 101 that is a single lens element. An aperture stop AS 114 is located on the object side of the first lens component $L_1$ 101. The lens system 110 includes five lens components 101-105 with refractive power. The parts of the lens system 110 are arranged along an optical axis AX of the lens system from the first object side lens component $L_1$ 101 to the fifth image side lens component $L_5$ 105 (from left to right in the drawing). The lens system 110 forms an image at the surface of a photosensor 118. In some embodiments, an infrared (IR) filter 116 may be located between the fifth lens component $L_5$ 105 and the photosensor 118.

The fourth lens component $L_4$ 104 of the lens system 110 has positive refractive power, positive focal length $f_4$, and a concave object side surface. In addition, lens component $L_4$ of lens system 110 is positive meniscus in shape and has positive vertex radii of curvature $R_7$ and $R_8$, where is the radius of the object side surface and where is the radius of the image side surface, the values for both radii being at the optical axis 112. Further, $R_8 > R_7 - D_7$, where $D_7$ is the thickness of the lens at the optical axis 112.

Figure 2:
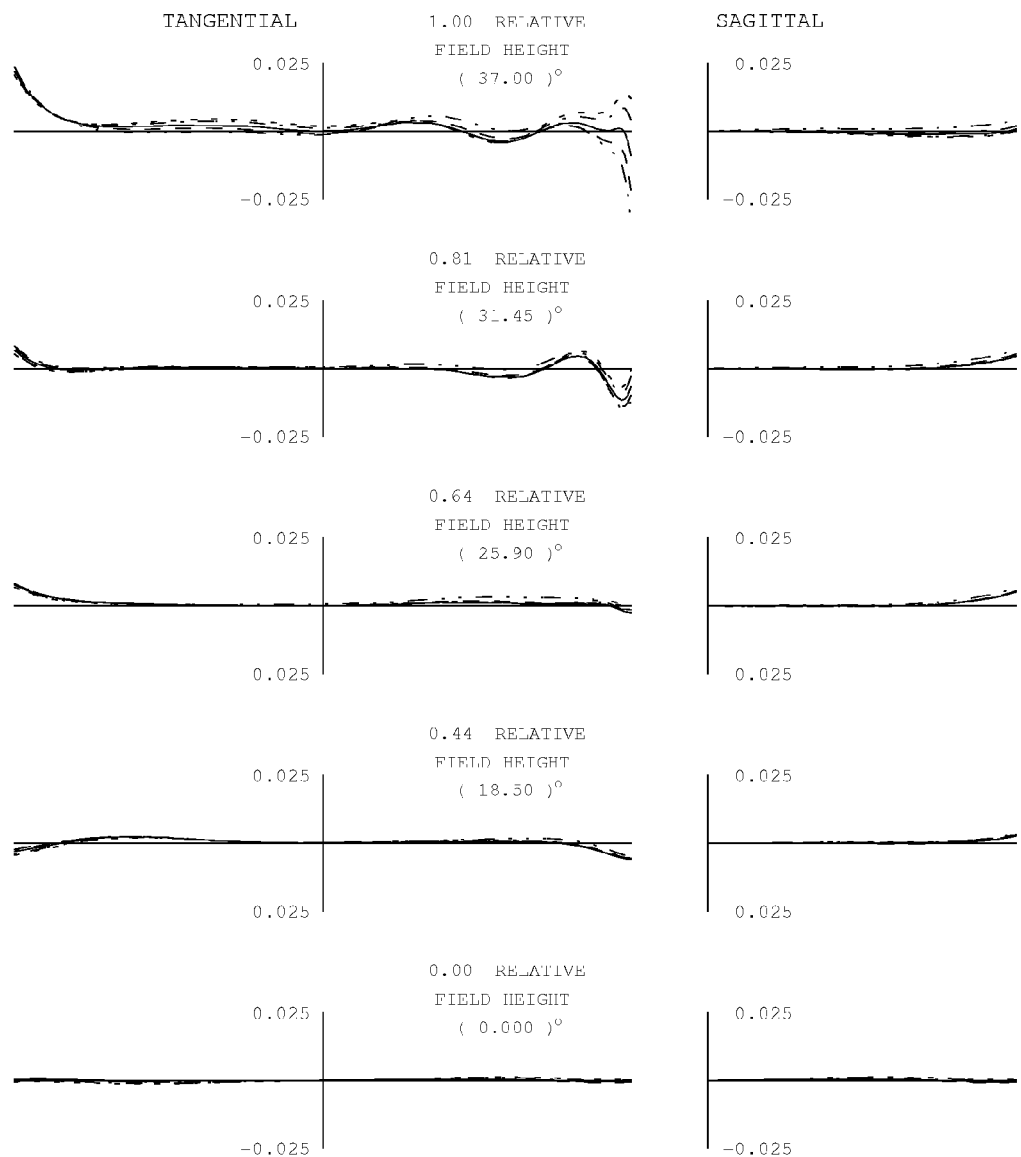
FIG. 2 shows the polychromatic ray aberration curves over the half field of view and over the visible spectral band ranging 470 nm to 650 nm for the lens system illustrated in FIG. 1.

FIG. 2 shows the polychromatic ray aberration curves over the half field of view (HFOV=37.0 degrees) over the visible spectral band ranging from 470 nm to 650 nm for a lens system 110 as illustrated in FIG. 1 and described in Tables 1A and 1B.

Figure 3:
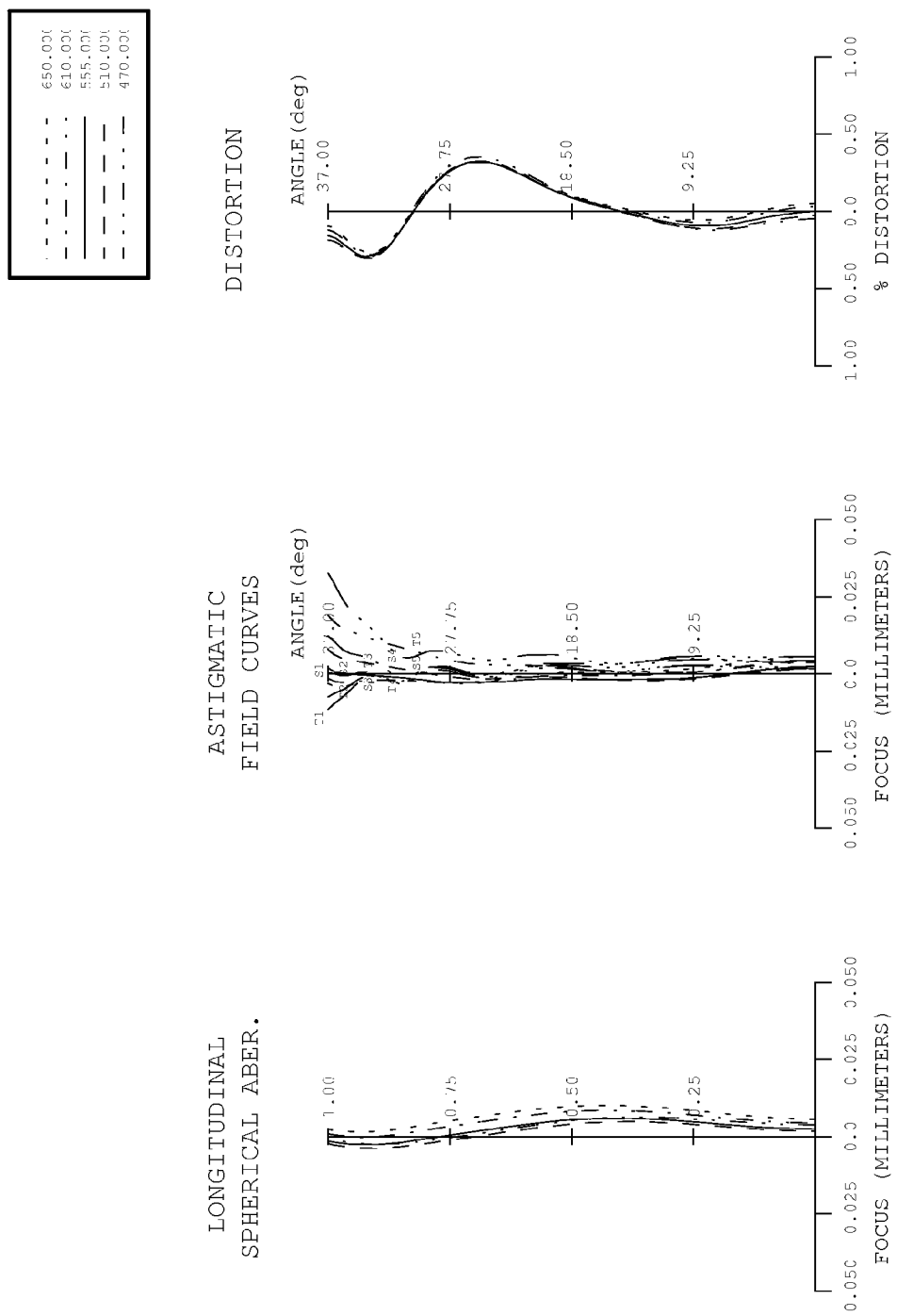
FIG. 3 shows the polychromatic curves of spherical aberration, astigmatism, and distortion over the visible band ranging 470 nm to 650 nm for the lens system illustrated in FIG. 1.

FIG. 3 shows the polychromatic curves for the chromatic variations of spherical aberration, astigmatic field curves, and distortion for the lens system 110 as illustrated in FIG. 1 and described in Tables 1A and 1B.

FIG. 4 is a cross-sectional illustration of an example embodiment of a compact lens system 210 having a first lens component $L_1$ 201 that is a wafer lens component with refractive power. An aperture stop AS 214 is located on the object side of the first lens component $L_1$ 201. The lens system 210 includes five lens components 201-205 with refractive power. The parts of the lens system 210 are arranged along an optical axis AX of the lens system from the first object side lens component $L_1$ 201 to the fifth image side lens component $L_5$ 205 (from left to right in the drawing). The lens system 210 forms an image at the surface of a photosensor 218. In some embodiments, an infrared (IR) filter 216 may be located between the fifth lens component $L_5$ 205 and the photosensor 218.

The wafer lens component $L_1$ 201 may be composed of a planar substrate 222 and layer laminates 224, 226 of UV curable polymeric or plastic materials formed using known manufacturing methods such as casting, molding, or microlithographic process on the planar substrate, which may be a planar glass substrate. The remaining four lens components $L_2$, $L_3$, $L_4$, and $L_5$ 202-205 of the lens system 210 may be composed of plastic materials with refractive indices and Abbe numbers as listed in Table 2A.

The fourth lens component $L_4$ 204 of the lens system 210 has positive refractive power, positive focal length $f_4$, and a concave object side surface. In addition, lens component $L_4$ of lens system 210 is positive meniscus in shape and has positive vertex radii of curvature $R_7$ and $R_8$, where is the radius of the object side surface and where is the radius of the image side surface, the values for both radii being at the optical axis 212. Further, $R_8 > R_7 - D_7$, where $D_7$ is the thickness of the lens at the optical axis 212.

Figure 5:
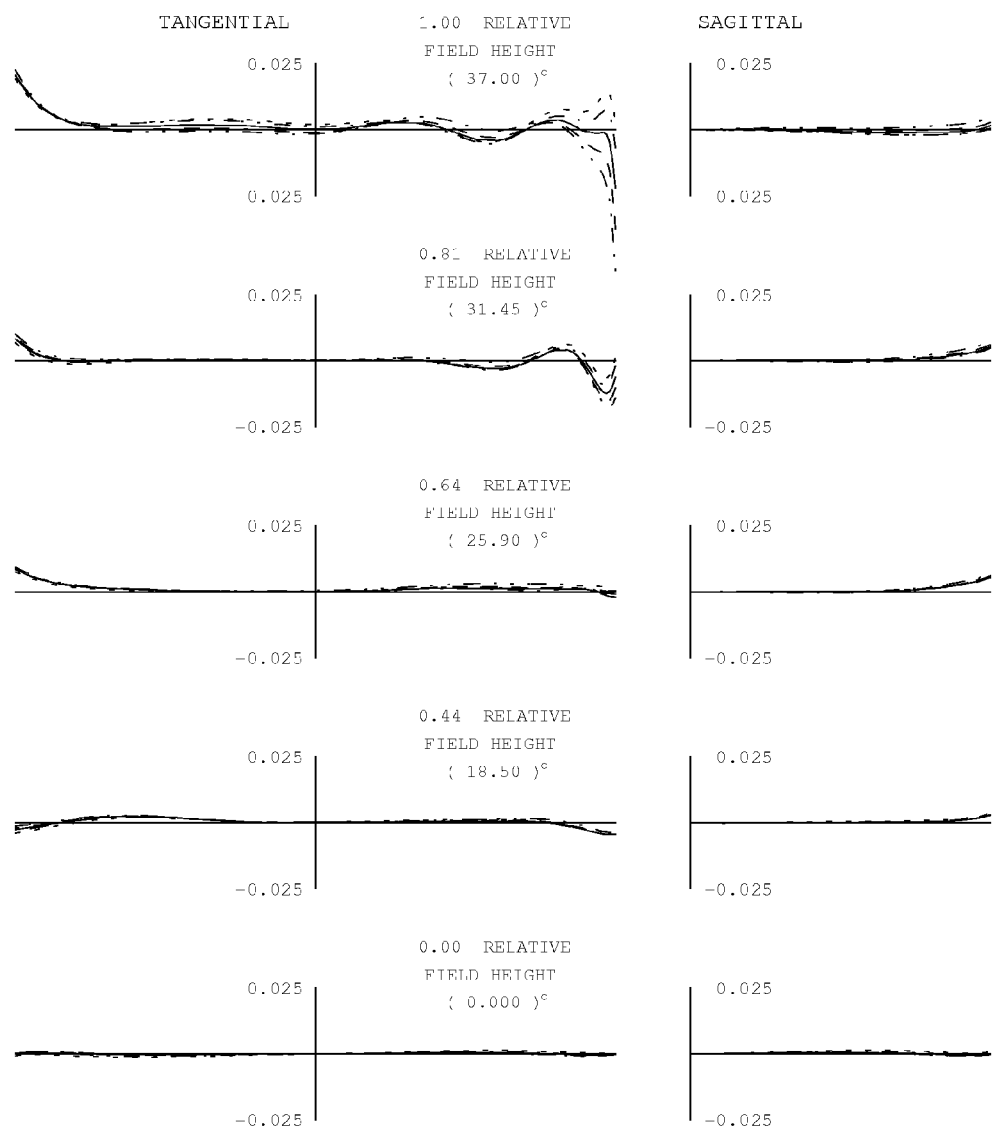
FIG. 5 shows the polychromatic ray aberration curves over the half field of view and over the visible spectral band ranging 470 nm to 650 nm for the lens system illustrated in FIG. 4.

FIG. 5 shows the polychromatic ray aberration curves over the half field of view (HFOV=37.0 degrees) over the visible spectral band ranging from 470 nm to 650 nm for a lens system 210 as illustrated in FIG. 4 and described in Tables 2A and 2B.

Figure 6:
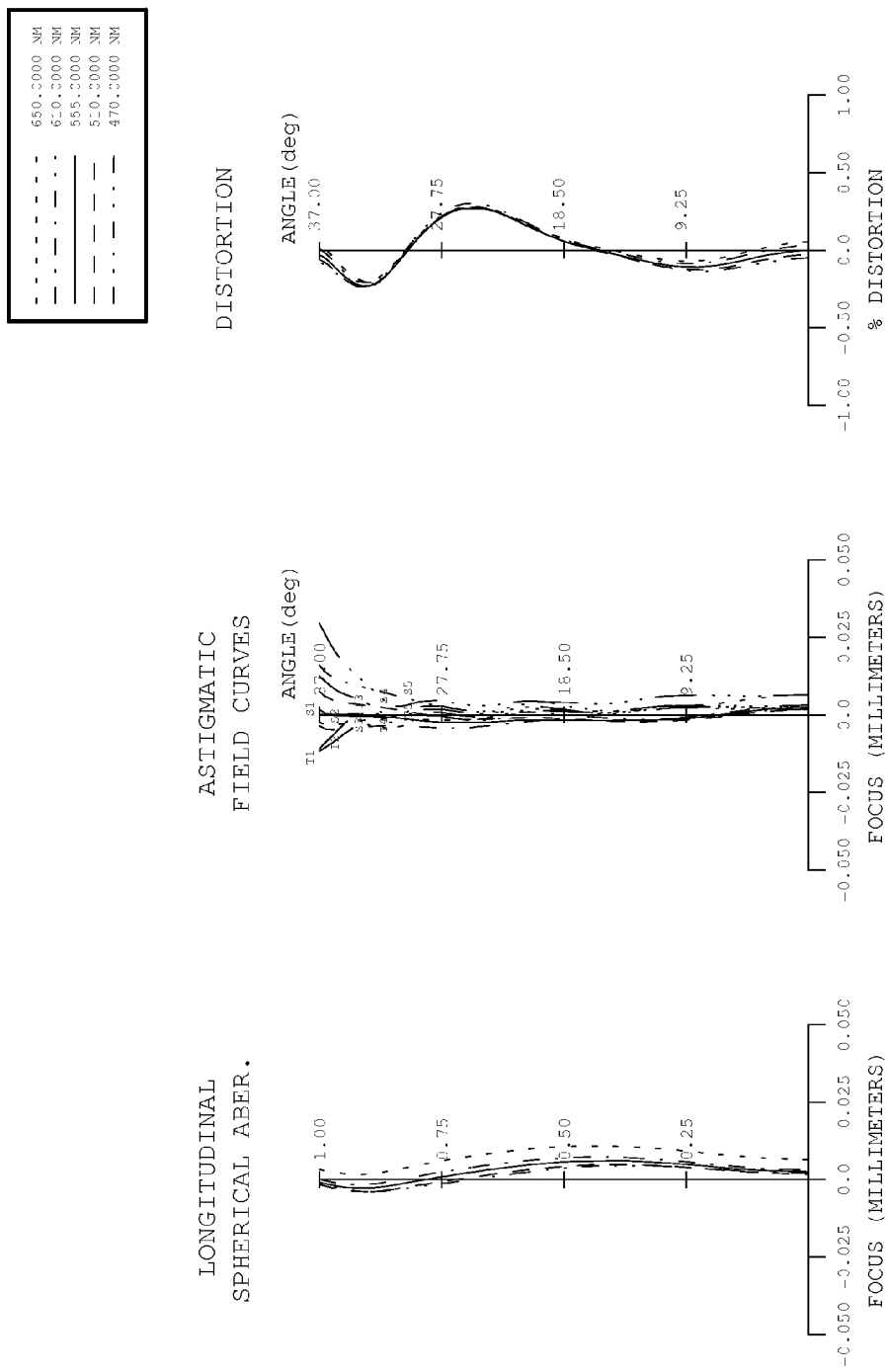
FIG. 6 shows the polychromatic curves of spherical aberration, astigmatism, and distortion over the visible band ranging 470 nm to 650 nm for the lens system illustrated in FIG. 4.

FIG. 6 shows the polychromatic curves for the chromatic variations of spherical aberration, astigmatic field curves, and distortion for the lens system 210 as illustrated in FIG. 4 and described in Tables 2A and 2B.

FIG. 7 is a cross-sectional illustration of an example embodiment of a compact lens system 310 having a first lens component $L_1$ 301 that is a wafer lens component with refractive power. An aperture stop AS 314 is applied to the object side plano surface of the planar substrate 322. The lens system 310 includes five lens components 301-305 with refractive power. The parts of the lens system 310 are arranged along an optical axis AX of the lens system from the first object side lens component $L_1$ 301 to the fifth image side lens component $L_5$ 305 (from left to right in the drawing). The lens system 310 forms an image at the surface of a photosensor 318. In some embodiments, an infrared (IR) filter 316 may be located between the fifth lens component $L_5$ 305 and the photosensor 318.

The aperture stop 314 may be a fixed aperture stop in the form of a material applied to the planar substrate 322 to provide a transparent opening, such as a circular opening, centered on the optical axis. In another embodiment, a thin film layer 314 of conductive organic or inorganic material may be deposited on the planar substrate 322 to provide an aperture stop in the form of an electrochromic lens component having variable light transmittance in response to an applied electrical voltage. The electrochromic lens component 314 may provide a central transparent opening that can be adjusted by an applied voltage that provides a variable intensity profile distribution across the aperture opening for the light energy transmitted through the optical system.

The fourth lens component $L_4$ 304 of the lens system 310 has positive refractive power, positive focal length $f_4$, and a concave object side surface. In addition, lens component $L_4$ of lens system 310 is positive meniscus in shape and has positive vertex radii of curvature $R_7$ and $R_8$, where is the radius of the object side surface and where is the radius of the image side surface, the values for both radii being at the optical axis 312. Further, $R_8 > R_7 - D_7$, where $D_7$ is the thickness of the lens at the optical axis 312.

Figure 8:
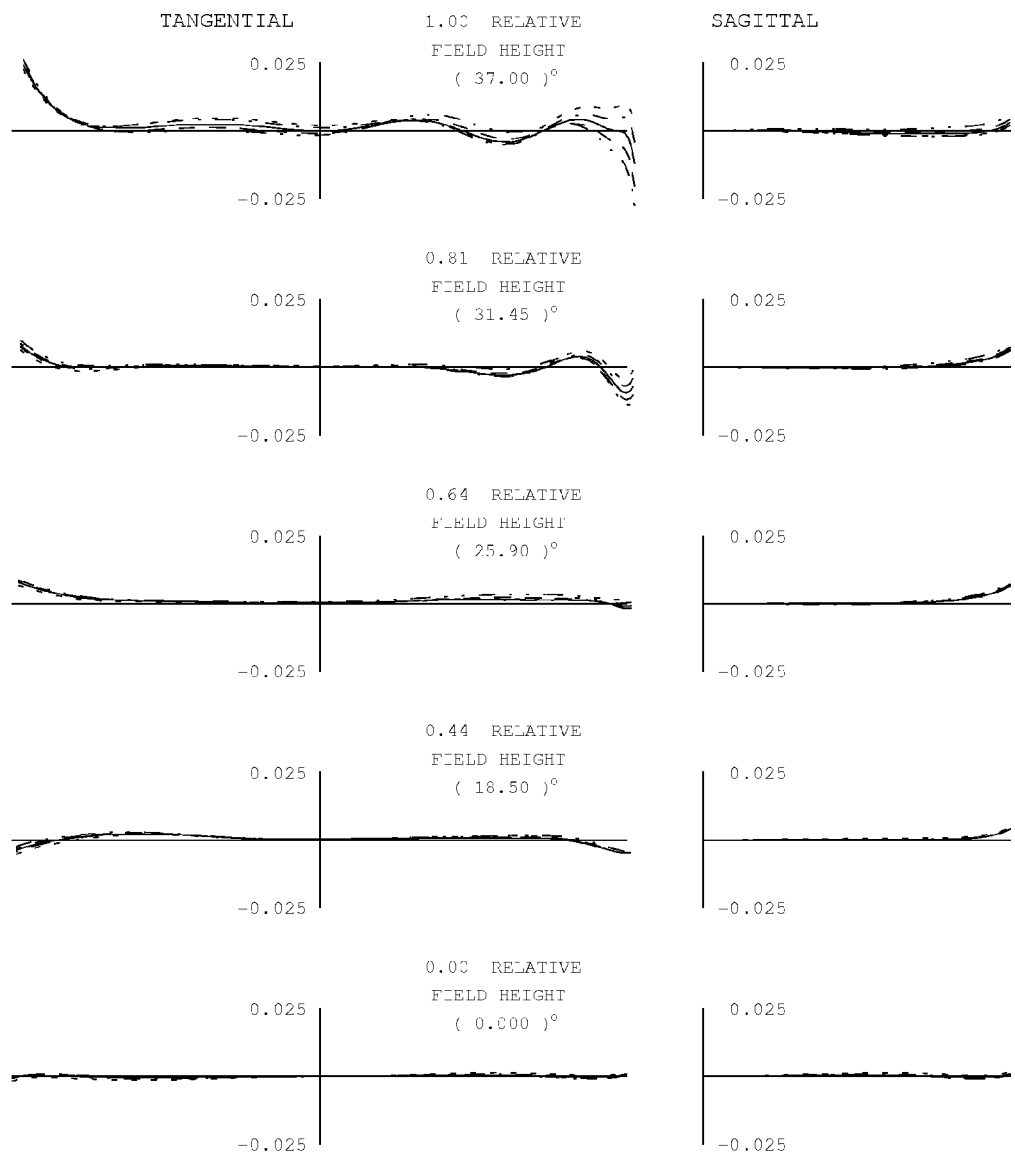
FIG. 8 shows the polychromatic ray aberration curves over the half field of view and over the visible spectral band ranging 470 nm to 650 nm for the lens system illustrated in FIG. 7.

FIG. 8 shows the polychromatic ray aberration curves over the half field of view (HFOV=37.0 degrees) over the visible spectral band ranging from 470 nm to 650 nm for a lens system 310 as illustrated in FIG. 7 and described in Tables 3A and 3B.

Figure 9:
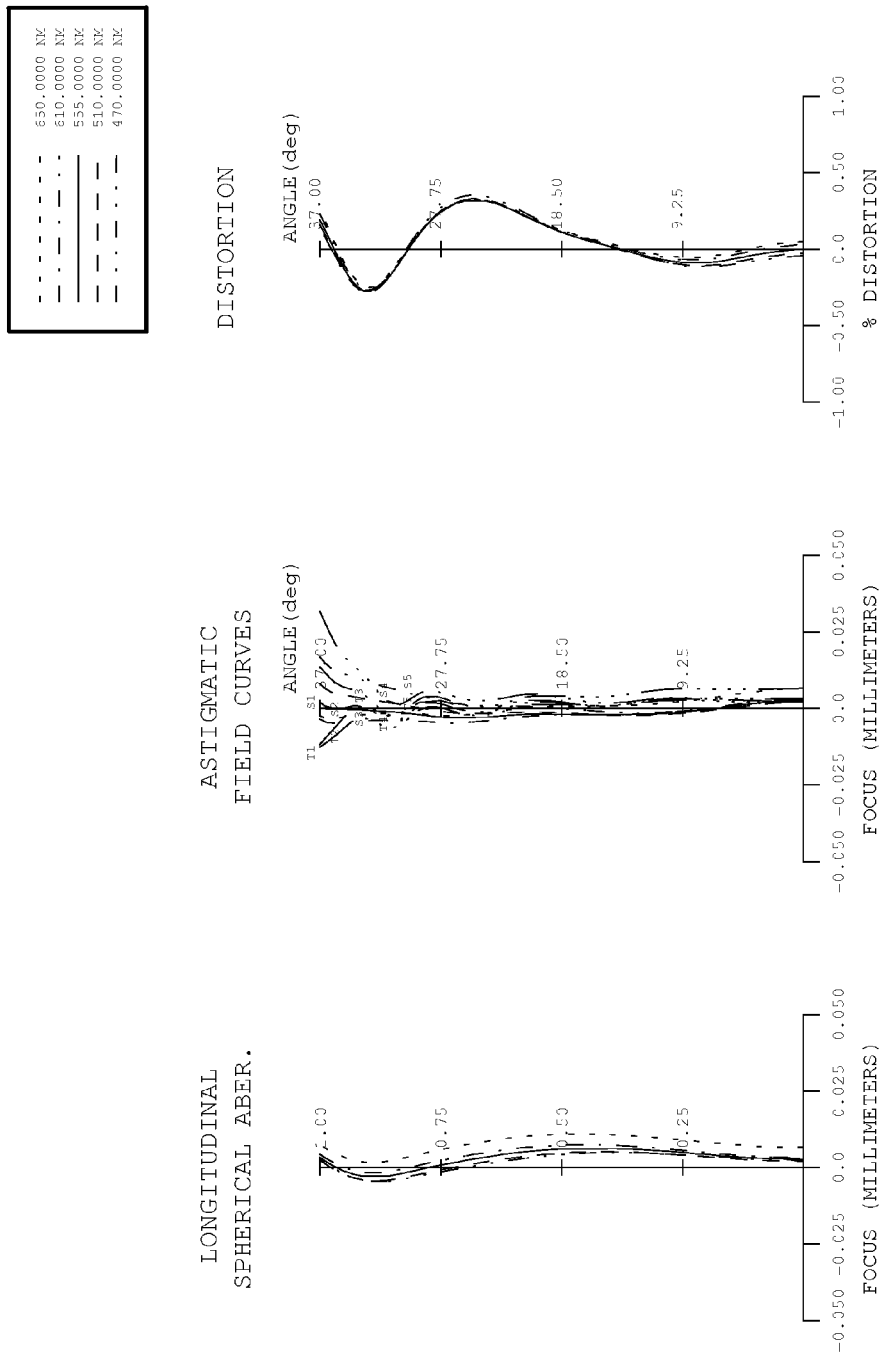
FIG. 9 shows the polychromatic curves of spherical aberration, astigmatism, and distortion over the visible band ranging 470 nm to 650 nm for the lens system illustrated in FIG. 7.

FIG. 9 shows the polychromatic curves for the chromatic variations of spherical aberration, astigmatic field curves, and distortion for the lens system 310 as illustrated in FIG. 7 and described in Tables 3A and 3B.

FIG. 10 is a cross-sectional illustration of an example embodiment of a compact lens system 410 having a first lens component $L_1$ 401 that is wafer lens component with refractive power. An aperture stop AS 414 is applied to the image side plano surface of the planar substrate 422. The lens system 410 includes five lens components 401-405 with refractive power. The parts of the lens system 410 are arranged along an optical axis AX of the lens system from the first object side lens component $L_1$ 401 to the fifth image side lens component $L_5$ 405 (from left to right in the drawing). The lens system 410 forms an image at the surface of a photosensor 418. In some embodiments, an infrared (IR) filter 416 may be located between the fifth lens component $L_5$ 405 and the photosensor 418.

The aperture stop 414 may be a fixed aperture stop in the form of a material applied to the planar substrate 422 to provide a transparent opening, such as a circular opening, centered on the optical axis. In another embodiment, a thin film layer 414 of conductive organic or inorganic material may be deposited on the planar substrate 422 to provide an aperture stop in the form of an electrochromic lens component having variable light transmittance in response to an applied electrical voltage. The electrochromic lens component 414 may provide a central transparent opening that can be adjusted by an applied voltage that provides a variable intensity profile distribution across the aperture opening for the light energy transmitted through the optical system.

The fourth lens component $L_4$ 404 of the lens system 410 has positive refractive power, positive focal length $f_4$, and a concave object side surface. In addition, lens component $L_4$ of lens system 410 is positive meniscus in shape and has positive vertex radii of curvature $R_7$ and $R_8$, where is the radius of the object side surface and where is the radius of the image side surface, the values for both radii being at the optical axis 412. Further, $R_8 > R_7 - D_7$, where $D_7$ is the thickness of the lens at the optical axis 412.

Figure 11:
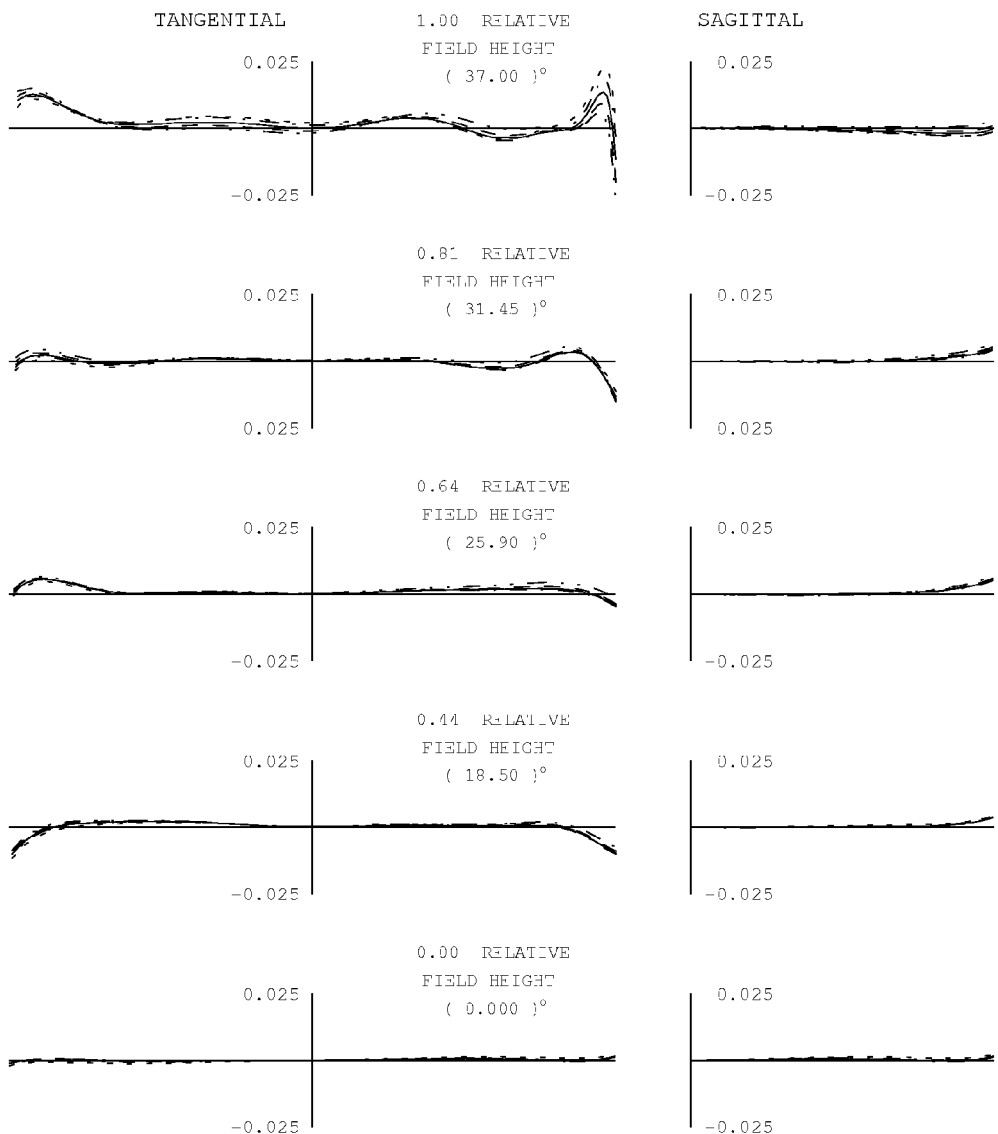
FIG. 11 shows the polychromatic ray aberration curves over the half field of view and over the visible spectral band ranging 470 nm to 650 nm for the lens system illustrated in FIG. 10.

FIG. 11 shows the polychromatic ray aberration curves over the half field of view (HFOV=37.0 degrees) over the visible spectral band ranging from 470 nm to 650 nm for a lens system 410 as illustrated in FIG. 10 and described in Tables 4A and 4B.

Figure 12:
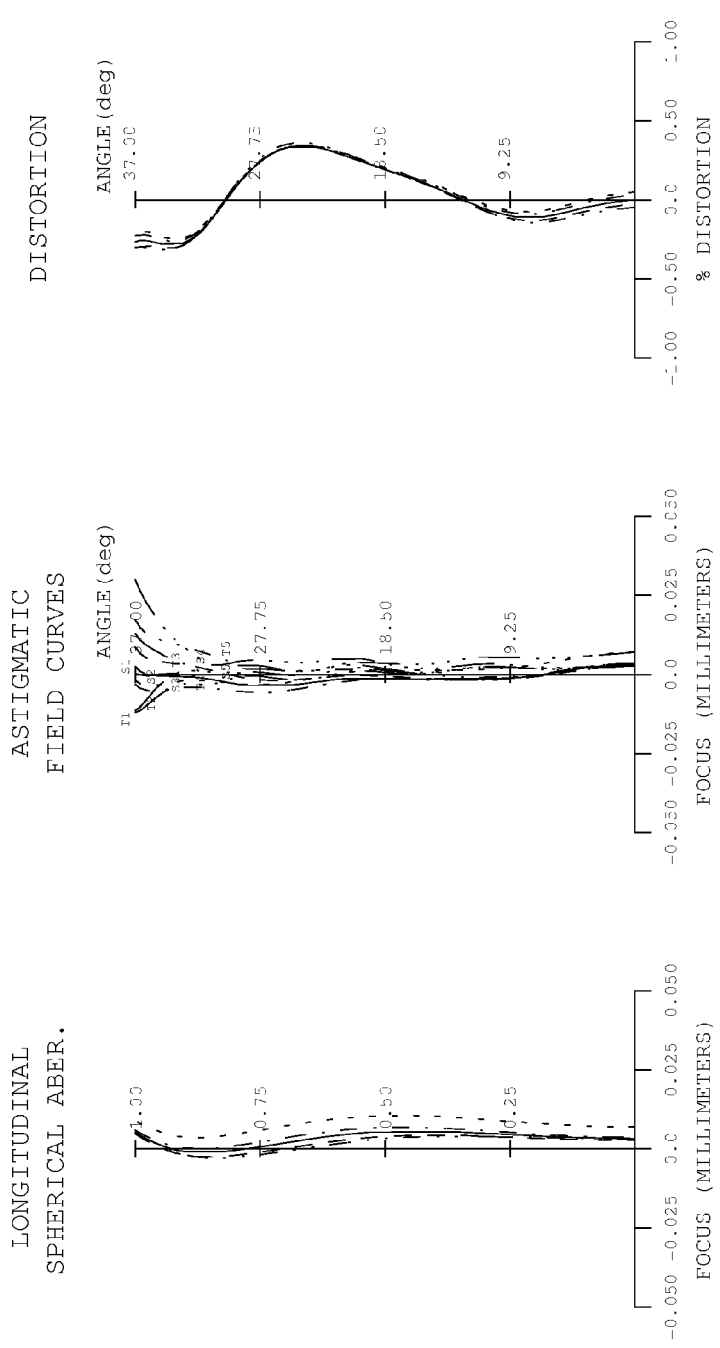
FIG. 12 shows the polychromatic curves of spherical aberration, astigmatism, and distortion over the visible band ranging 470 nm to 650 nm for the lens system illustrated in FIG. 10.

FIG. 12 shows the polychromatic curves for the chromatic variations of spherical aberration, astigmatic field curves, and distortion for the lens system 410 as illustrated in FIG. 10 and described in Tables 4A and 4B.

FIG. 13 is a cross-sectional illustration of an example embodiment of a compact lens system 510. The lens system 510 includes a wafer lens group component $L_1$ 501, comprising a first wafer lens component 520 and a second wafer lens component 530, each with refractive power, and four additional lens components 502-505 with refractive power. The parts of the lens system 510 are arranged along an optical axis AX of the lens system from the first object side lens component $L_1$ 501 to the fifth image side lens component $L_5$ 505 (from left to right in the drawing). The lens system 510 forms an image at the surface of a photosensor 518. In some embodiments, an infrared (IR) filter 516 may be located between the fifth lens component $L_5$ 505 and the photosensor 518.

The wafer lens group component 501 may be equipped with an electrochromic layer 514 located between the planar image side surface of the substrate 522 of the first wafer lens component 520 and the planar object side surface of the substrate of the second wafer lens component 530. The electrochromic layer 514 comprises a transparent layer of conductive organic polymer or inorganic material having variable light transmittance in response to an applied electrical voltage. The lens system 510 may also be equipped and used with a standard iris type aperture stop (not shown).

The fourth lens component $L_4$ 504 of the lens system 510 has positive refractive power, positive focal length $f_4$, and a concave object side surface. In addition, lens component $L_4$ of lens system 510 is positive meniscus in shape and has positive vertex radii of curvature $R_7$ and $R_8$, where is the radius of the object side surface and where is the radius of the image side surface, the values for both radii being at the optical axis 512. Further, $R_8 > R_7 - D_7$, where $D_7$ is the thickness of the lens at the optical axis 512.

Figure 14:
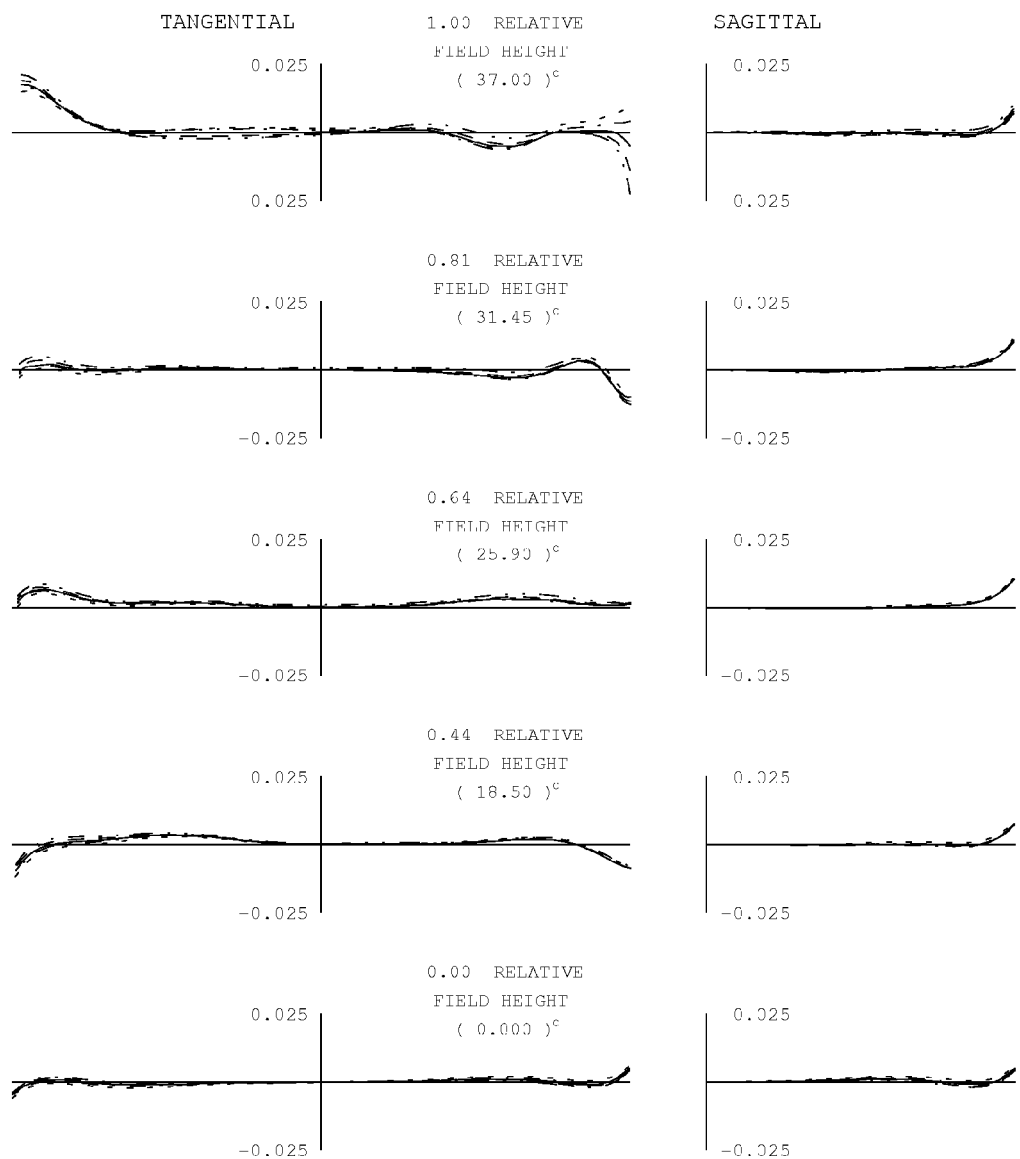
FIG. 14 shows the polychromatic ray aberration curves over the half field of view and over the visible spectral band ranging 470 nm to 650 nm for the lens system illustrated in FIG. 13.

FIG. 14 shows the polychromatic ray aberration curves over the half field of view (HFOV=37.0 degrees) over the visible spectral band ranging from 470 nm to 650 nm for a lens system 510 as illustrated in FIG. 13 and described in Tables 5A and 5B.

Figure 15:
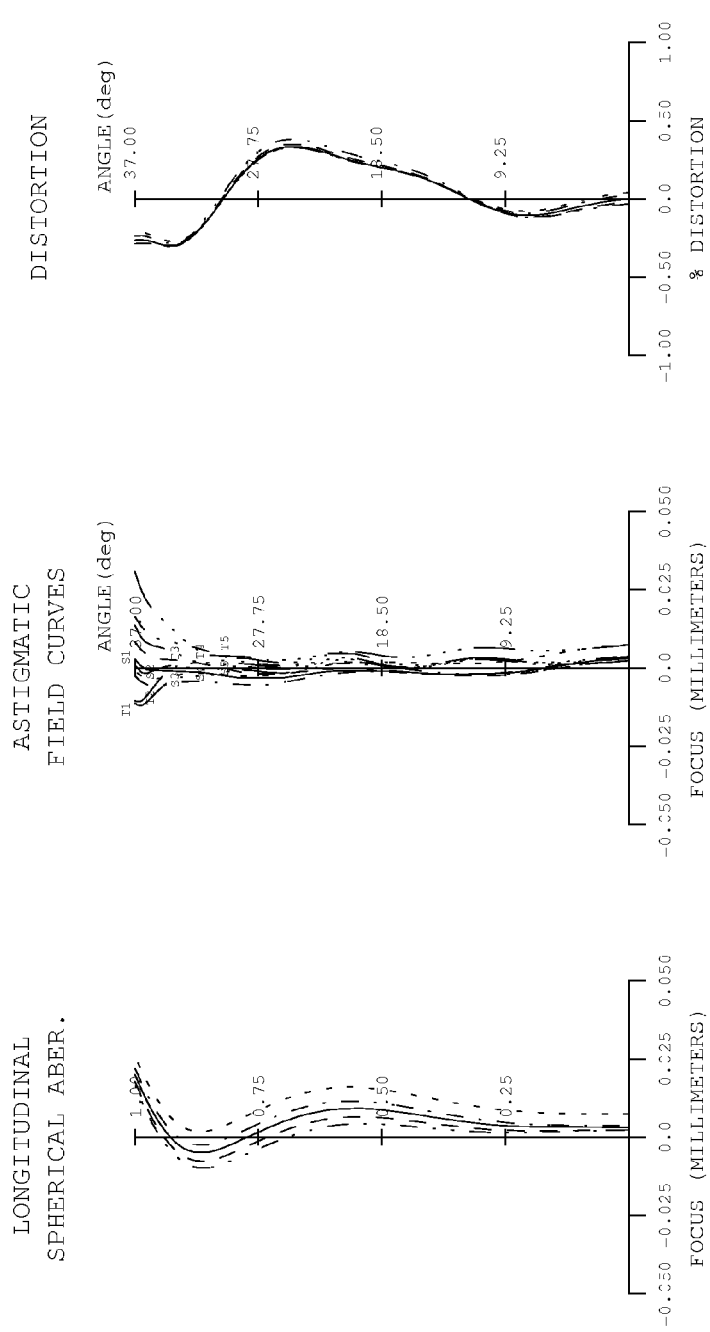
FIG. 15 shows the polychromatic curves of spherical aberration, astigmatism, and distortion over the visible band ranging 470 nm to 650 nm for the lens system illustrated in FIG. 13.

FIG. 15 shows the polychromatic curves for the chromatic variations of spherical aberration, astigmatic field curves, and distortion for the lens system 510 as illustrated in FIG. 13 and described in Tables 5A and 5B.

FIG. 16 is a cross-sectional illustration of an example embodiment of a compact lens system 610. The lens system 610 includes a wafer lens group component $L_1$ 601, comprising a first wafer lens component 620 and a second wafer lens component 630, each with refractive power, and four additional lens components 602-605 with refractive power. The parts of the lens system 610 are arranged along an optical axis AX of the lens system from the first object side lens component $L_1$ 601 to the fifth image side lens component $L_5$ 605 (from left to right in the drawing). The lens system 610 forms an image at the surface of a photosensor 618. In some embodiments, an infrared (IR) filter 616 may be located between the fifth lens component $L_5$ 605 and the photosensor 618.

The wafer lens group component 601 may be equipped with an electrochromic layer 614 located between the planar image side surface of the substrate 622 of the first wafer lens component 620 and the planar object side surface of the substrate of the second wafer lens component 630. The electrochromic layer 614 comprises a transparent layer of conductive organic polymer or inorganic material having variable light transmittance in response to an applied electrical voltage. The lens system 610 may also be equipped and used with a standard iris type aperture stop (not shown).

The fourth lens component $L_4$ 604 of the lens system 610 has positive refractive power, positive focal length $f_4$, and a concave object side surface. In addition, lens component $L_4$ of lens system 610 is positive meniscus in shape and has positive vertex radii of curvature $R_7$ and $R_8$, where is the radius of the object side surface and where is the radius of the image side surface, the values for both radii being at the optical axis 612. Further, $R_8 > R_7 - D_7$, where $D_7$ is the thickness of the lens at the optical axis 612.

Figure 17:
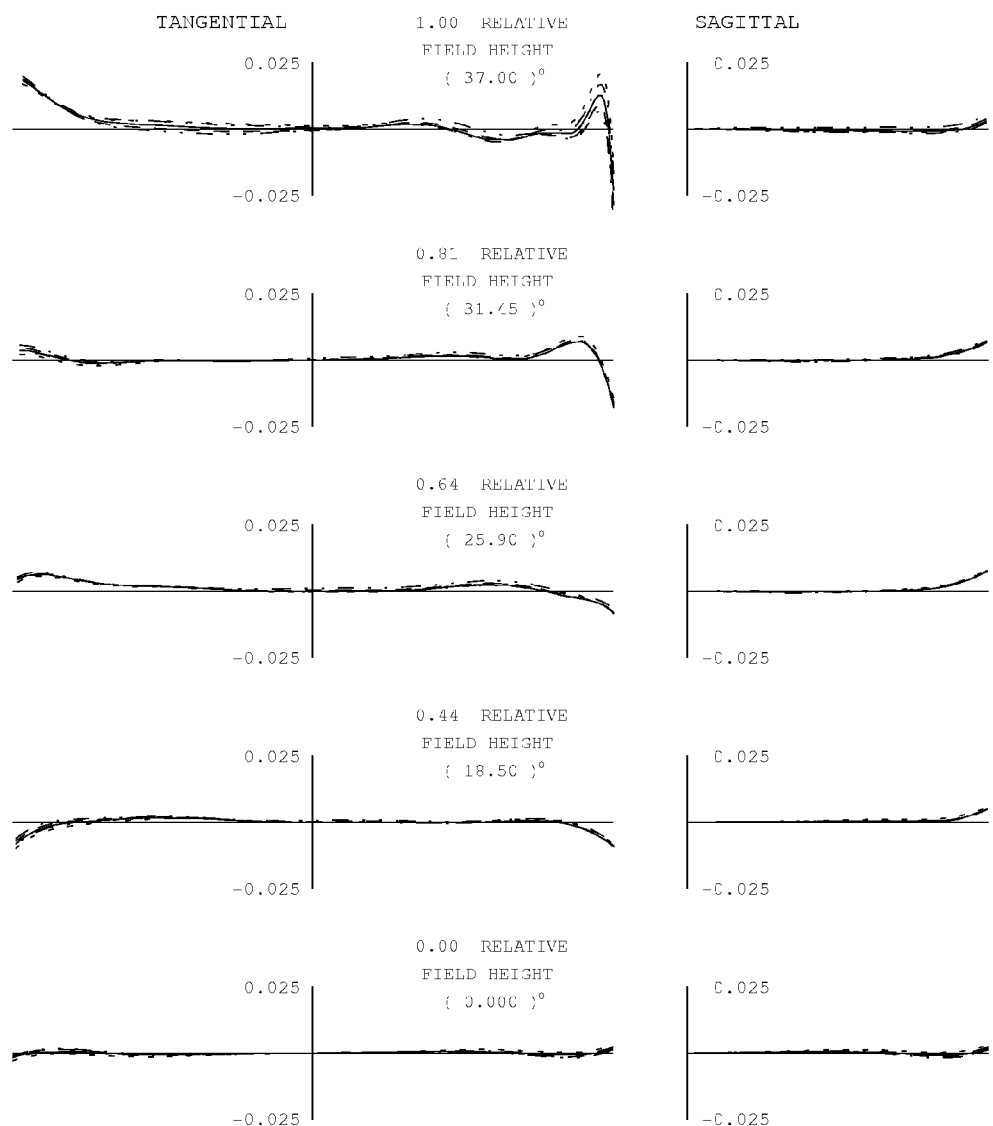
FIG. 17 shows the polychromatic ray aberration curves over the half field of view and over the visible spectral band ranging 470 nm to 650 nm for the lens system illustrated in FIG. 16.

FIG. 17 shows the polychromatic ray aberration curves over the half field of view (HFOV=37.0 degrees) over the visible spectral band ranging from 470 nm to 650 nm for a lens system 610 as illustrated in FIG. 16 and described in Tables 6A and 6B.

Figure 18:
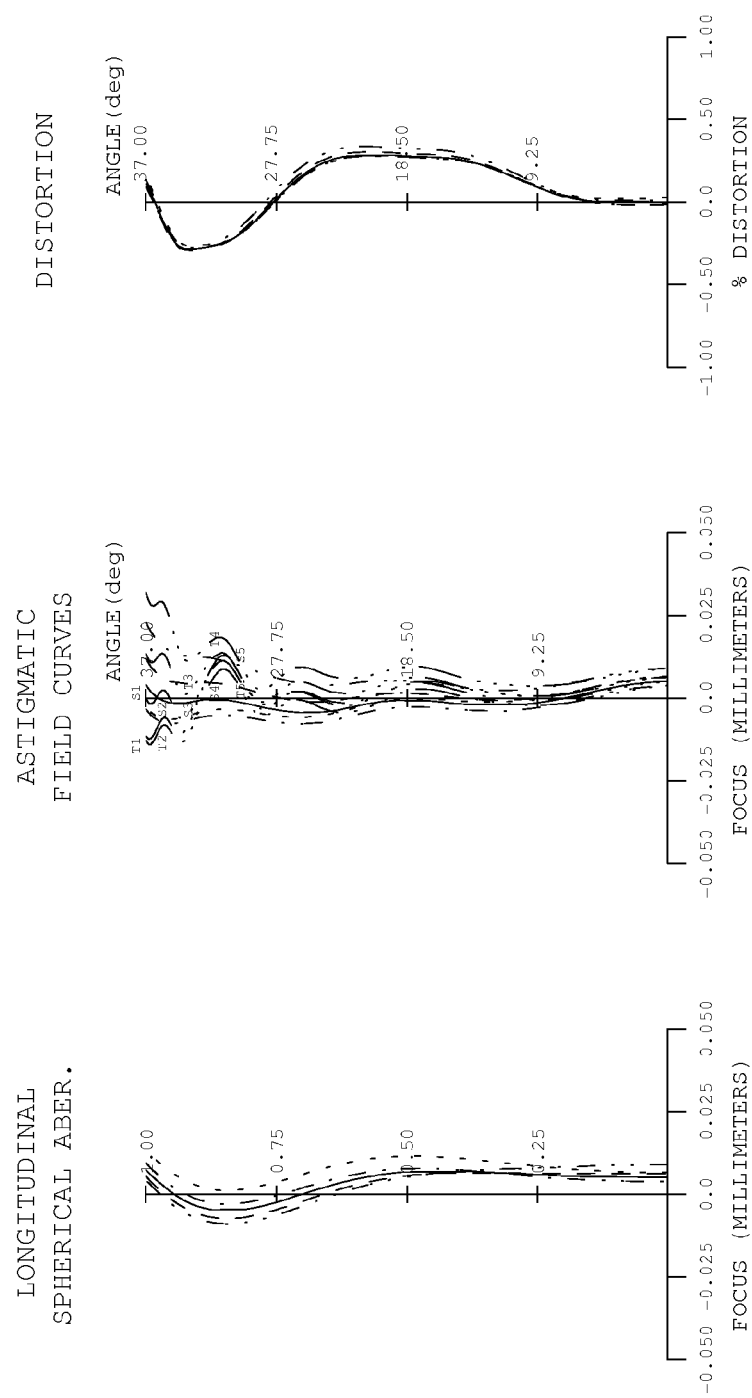
FIG. 18 shows the polychromatic curves of spherical aberration, astigmatism, and distortion over the visible band ranging 470 nm to 650 nm for the lens system illustrated in FIG. 16.

FIG. 18 shows the polychromatic curves for the chromatic variations of spherical aberration, astigmatic field curves, and distortion for the lens system 610 as illustrated in FIG. 16 and described in Tables 6A and 6B.

FIG. 19 is a cross-sectional illustration of an example embodiment of a compact lens system 710. The lens system 710 includes a wafer lens group component $L_1$ 701, comprising a first wafer lens component 720 and a second wafer lens component 730, each with refractive power, and four additional lens components 702-705 with refractive power. The parts of the lens system 710 are arranged along an optical axis AX of the lens system from the first object side lens component $L_1$ 701 to the fifth image side lens component $L_5$ 705 (from left to right in the drawing). The lens system 710 forms an image at the surface of a photosensor 718. In some embodiments, an infrared (IR) filter 716 may be located between the fifth lens component $L_5$ 705 and the photosensor 718.

The wafer lens group component 701 may be equipped with an electrochromic layer 714 located between the planar image side surface of the substrate 722 of the first wafer lens component 720 and the planar object side surface of the substrate of the second wafer lens component 730. The electrochromic layer 714 comprises a transparent layer of conductive organic polymer or inorganic material having variable light transmittance in response to an applied electrical voltage. The electrochromic layer 714 of this embodiment has different optical characteristics than the electrochromic layer 614 of the embodiment illustrated in FIG. 16 and described in Tables 6A and 6B. The lens system 710 may also be equipped and used with a standard iris type aperture stop (not shown).

The fourth lens component $L_4$ 704 of the lens system 710 has positive refractive power, positive focal length $f_4$, and a concave object side surface. In addition, lens component $L_4$ of lens system 710 is positive meniscus in shape and has positive vertex radii of curvature $R_7$ and $R_8$, where is the radius of the object side surface and where is the radius of the image side surface, the values for both radii being at the optical axis 712. Further, $R_8 > R_7 - D_7$, where $D_7$ is the thickness of the lens at the optical axis 712.

Figure 20:
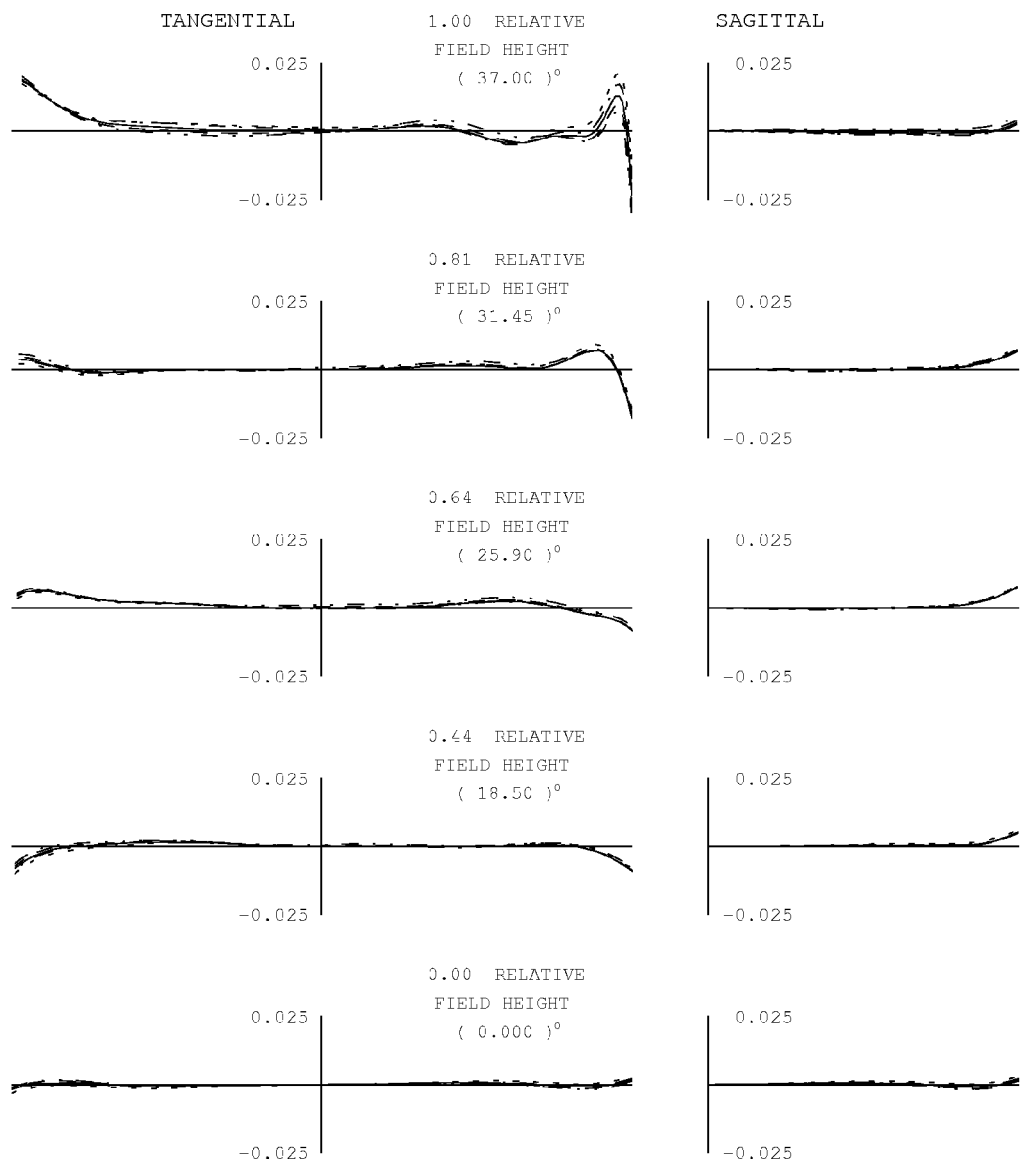
FIG. 20 shows the polychromatic ray aberration curves over the half field of view and over the visible spectral band ranging 470 nm to 650 nm for the lens system illustrated in FIG. 19.

FIG. 20 shows the polychromatic ray aberration curves over the half field of view (HFOV=37.0 degrees) over the visible spectral band ranging from 470 nm to 750 nm for a lens system 710 as illustrated in FIG. 19 and described in Tables 7A and 7B.

Figure 21:
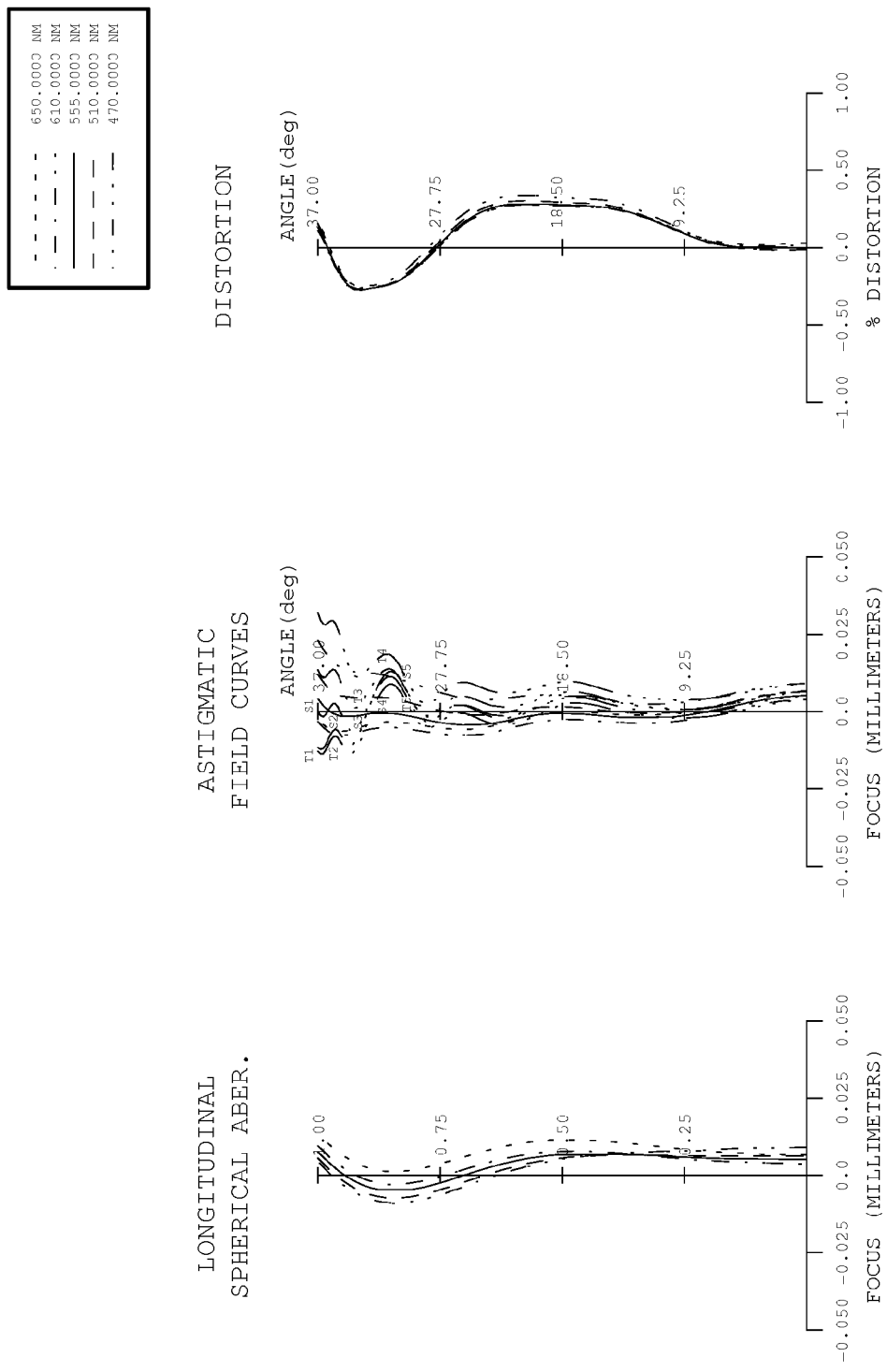
FIG. 21 shows the polychromatic curves of spherical aberration, astigmatism, and distortion over the visible band ranging 470 nm to 650 nm for the lens system illustrated in FIG. 19.

FIG. 21 shows the polychromatic curves for the chromatic variations of spherical aberration, astigmatic field curves, and distortion for the lens system 710 as illustrated in FIG. 19 and described in Tables 7A and 7B.

FIG. 22 is a cross-sectional illustration of an example embodiment of a compact lens system 810 having a first lens component $L_1$ 801 that is a single lens element. An aperture stop AS 814 is located on the object side of the first lens component L₁ 801. The lens system 810 includes five lens components 801-805 with refractive power. The fourth lens component L₄ 804 of the lens system 810 has positive refractive power, positive focal length $f_4$, and a concave object side surface. The parts of the lens system 810 are arranged along an optical axis AX of the lens system from the first object side lens component L₁ 801 to the fifth image side lens component L₅ 805 (from left to right in the drawing). The lens system 810 forms an image at the surface of a photosensor 818. In some embodiments, an infrared (IR) filter 816 may be located between the fifth lens component L₅ 805 and the photosensor 818.

Figure 23:
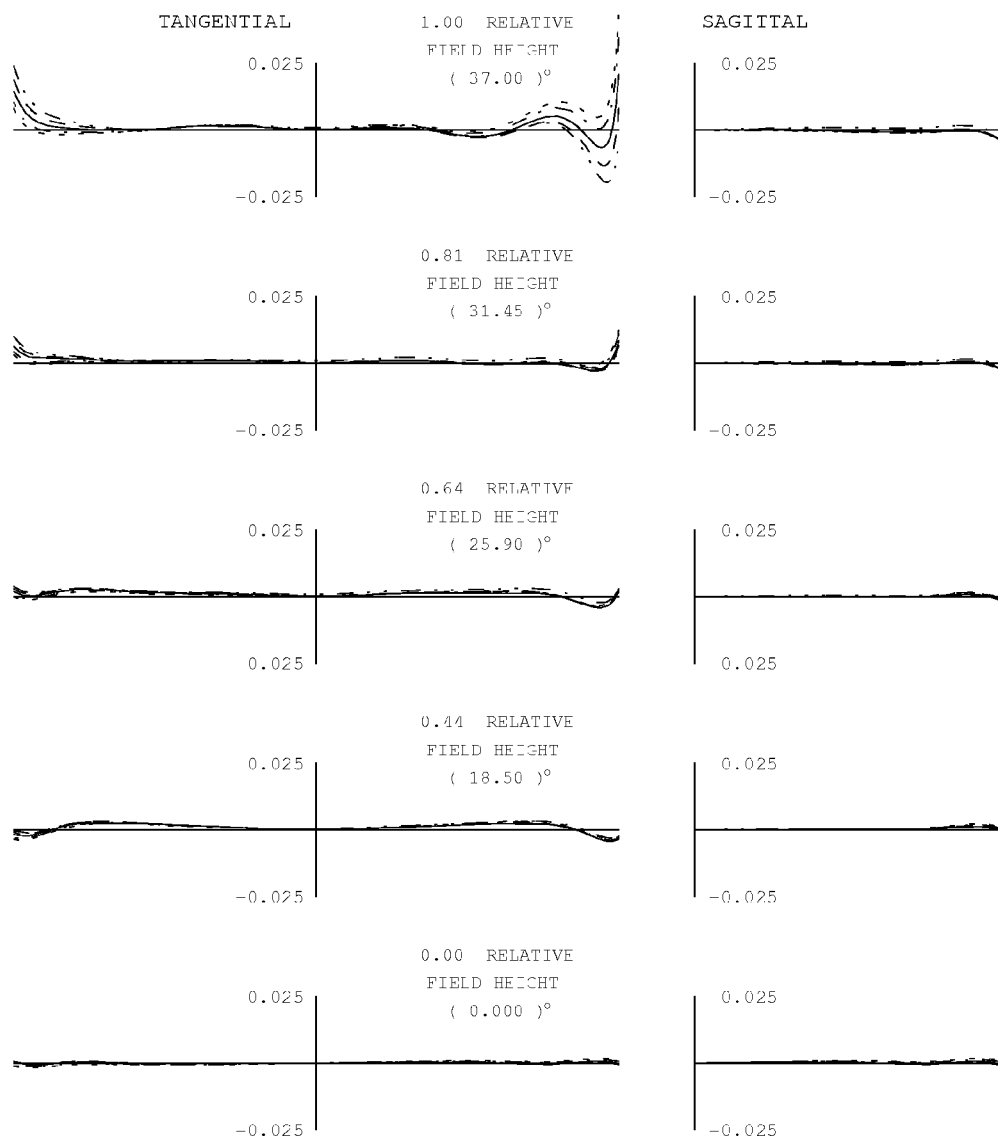
FIG. 23 shows the polychromatic ray aberration curves over the half field of view and over the visible spectral band ranging 470 nm to 650 nm for the lens system illustrated in FIG. 22.

FIG. 23 shows the polychromatic ray aberration curves over the half field of view (HFOV=37.0 degrees) over the visible spectral band ranging from 470 nm to 650 nm for a lens system 810 as illustrated in FIG. 22 and described in Tables 8A and 8B.

Figure 24:
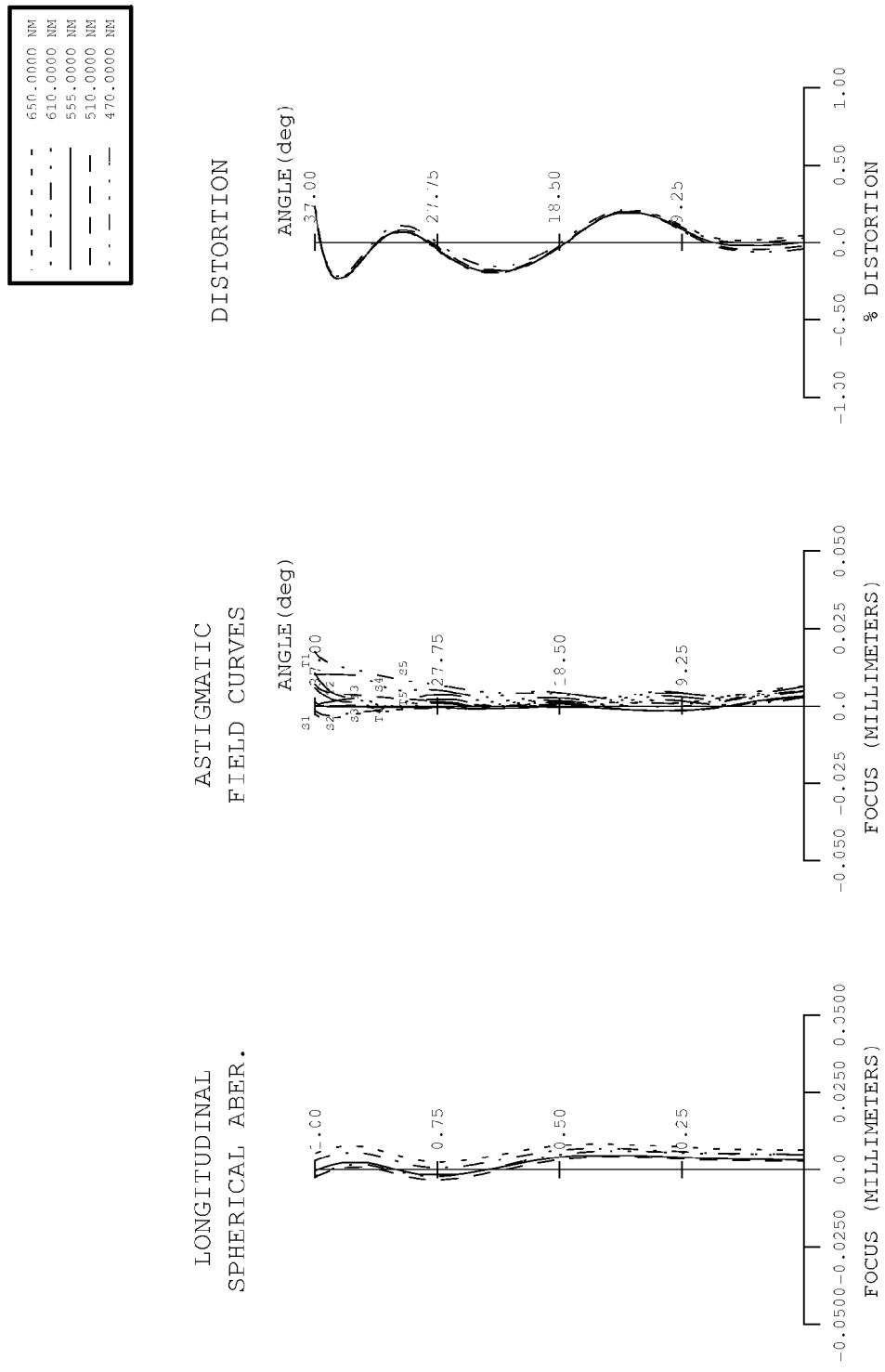
FIG. 24 shows the polychromatic curves of spherical aberration, astigmatism, and distortion over the visible band ranging 470 nm to 650 nm for the lens system illustrated in FIG. 22.

FIG. 24 shows the polychromatic curves for the chromatic variations of spherical aberration, astigmatic field curves, and distortion for the lens system 810 as illustrated in FIG. 22 and described in Tables 8A and 8B.

Table 9 shows data for various characteristics of the eight embodiments of lens systems described above. These characteristics and combinations of the characteristics may be used to characterize lens systems of the type described herein.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

TABLE 1A

Optical data for embodiment 1 shown in FIGS. 1-3
f = 4.10 mm, Fno = 2.20, HFOV = 37.0 deg, TTL = 5.50 mm

| $S_i$ | Component | $R_i$ | Shape | $D_i$ | Material | $N_d$ | $V_d$ | $f_i$ |
|---|---|---|---|---|---|---|---|---|
| 0 | Object plane | INF | FLT | INF | | | | |
| 1 | | INF | FLT | 0.0800 | | | | |
| 2 | Aperture stop | INF | FLT | −0.0800 | | | | |
| 3 | | INF | FLT | 0.0000 | | | | |
| 4 | L1 | 4.047 | ASP | 0.5816 | Plastic | 1.535 | 56.3 | 4.79 |
| 5 | | −6.684 | ASP | 0.1848 | | | | |
| 6 | L2 | 3.023 | ASP | 0.3341 | Plastic | 1.651 | 21.5 | −5.46 |
| 7 | | 1.567 | ASP | 0.2442 | | | | |
| 8 | L3 | 4.100 | ASP | 0.9292 | Plastic | 1.545 | 55.9 | 4.87 |
| 9 | | −6.989 | ASP | 0.6684 | | | | |
| 10 | L4 | 3.079 | ASP | 0.4704 | Plastic | 1.545 | 55.9 | 117.71 |
| 11 | | 3.059 | ASP | 0.3986 | | | | |
| 12 | L5 | 2.409 | ASP | 0.7890 | Plastic | 1.545 | 55.9 | −8.03 |
| 13 | | 1.375 | ASP | 0.3500 | | | | |
| 14 | IR filter | INF | FLT | 0.2000 | Glass | 1.516 | 64.1 | |
| 15 | | INF | FLT | 0.3500 | | | | |
| 16 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_i$: focal length of lens component
Design wavelengths: 650 nm, 610 nm, 555 nm, 510 nm, 470 nm

TABLE 1B

Aspheric coefficients for embodiment 1

| $S_i$ | c | K | A | B | C |
|---|---|---|---|---|---|
| 4 | 0.24710230 | 0 | −1.66202E−02 | −4.93428E−03 | −7.49514E−03 |
| 5 | −0.14961219 | 0 | −1.49612E−01 | −2.51462E−02 | 3.80967E−04 |
| 6 | 0.33083168 | 0 | −5.87245E−02 | 4.03854E−02 | −6.40387E−02 |
| 7 | 0.63809130 | 0 | −1.35933E−01 | 9.79904E−02 | −1.21103E−01 |
| 8 | 0.24392602 | 0 | −2.09114E−02 | 3.57964E−02 | −1.43136E−02 |
| 9 | −0.14308126 | 0 | −3.23375E−02 | −1.69196E−02 | 2.65290E−02 |
| 10 | 0.32482333 | 0 | 3.01265E−02 | −8.33714E−02 | 3.82411E−02 |
| 11 | 0.32694039 | 0 | 4.38168E−02 | −5.84478E−02 | 1.90221E−02 |
| 12 | 0.41512401 | 0 | −1.79764E−01 | 5.09968E−02 | −5.76923E−03 |
| 13 | 0.72714666 | −4.42004043 | −6.93730E−02 | 2.04998E−02 | −4.15811E−03 |

| $S_i$ | D | E | F |
|---|---|---|---|
| 4 | 4.09086E−03 | −3.16287E−08 | |
| 5 | 5.68587E−03 | 3.42202E−08 | |
| 6 | 4.07865E−02 | −4.98468E−03 | −1.94088E−03 |
| 7 | 7.10982E−02 | −1.81782E−02 | 6.44858E−04 |
| 8 | −4.24069E−03 | 6.47181E−03 | −1.54163E−03 |

TABLE 1B-continued

Aspheric coefficients for embodiment 1

| | | | |
|---|---|---|---|
| 9 | −1.04489E−02 | 3.60144E−04 | 9.00338E−04 |
| 10 | −1.54008E−02 | 3.56984E−03 | −4.54469E−04 |
| 11 | −2.90284E−03 | 1.66952E−04 | −5.22616E−06 |
| 12 | 3.16643E−05 | −2.36233E−05 | 3.62411E−06 |
| 13 | 4.35170E−04 | −1.78683E−05 | |

TABLE 2A

Optical data for embodiment 2 shown in FIGS. 4-6
f = 4.10 mm, Fno = 2.20, HFOV = 37.0 deg, TTL = 5.50 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.0800 | | | | |
| 2 | Aperture stop | INF | FLT | −0.0800 | | | | |
| 3 | | INF | FLT | 0.0000 | | | | |
| 4 | L1a wafer lens | 3.879 | ASP | 0.2000 | Polymer | 1.514 | 54.6 | 4.89 |
| 5 | L1 substrate | INF | FLT | 0.2000 | Glass | 1.523 | 54.6 | |
| | | | | 0.0000 | | | | |
| 6 | L1b wafer lens | INF | FLT | 0.1800 | Polymer | 1.514 | 54.6 | |
| 7 | | −6.817 | ASP | 0.1669 | | | | |
| 8 | L2 | 3.049 | ASP | 0.3542 | Plastic | 1.651 | 21.5 | −5.48 |
| 9 | | 1.574 | ASP | 0.2375 | | | | |
| 10 | L3 | 4.102 | ASP | 0.9210 | Plastic | 1.545 | 55.9 | 4.74 |
| 11 | | −6.493 | ASP | 0.6717 | | | | |
| 12 | L4 | 3.069 | ASP | 0.4737 | Plastic | 1.545 | 55.9 | 142.54 |
| 13 | | 3.021 | ASP | 0.4010 | | | | |
| 14 | L5 | 2.420 | ASP | 0.7940 | Plastic | 1.545 | 55.9 | −7.88 |
| 15 | | 1.370 | ASP | 0.3500 | | | | |
| 16 | IR filter | INF | FLT | 0.2000 | Glass | 1.516 | 64.1 | |
| 17 | | INF | FLT | 0.3500 | | | | |
| 18 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 2B

Aspheric coefficients for embodiment 2

| $S_i$ | c | K | A | B | C |
|---|---|---|---|---|---|
| 4 | 0.25780526 | 0 | −1.40156E−02 | −3.96684E−03 | −7.95965E−03 |
| 7 | −0.14669976 | 0 | 2.32951E−02 | −2.34737E−02 | −3.70981E−03 |
| 8 | 0.32797135 | 0 | −5.80245E−02 | 3.96896E−02 | −6.47800E−02 |
| 9 | 0.63528006 | 0 | −1.36119E−01 | 9.80298E−02 | −1.20760E−01 |
| 10 | 0.24376817 | 0 | −2.09868E−02 | 3.59550E−02 | −1.46435E−02 |
| 11 | −0.15401447 | 0 | −3.21566E−02 | −1.74453E−02 | 2.65040E−02 |
| 12 | 0.32581984 | 0 | 3.03597E−02 | −8.34540E−02 | 3.82387E−02 |
| 13 | 0.33104800 | 0 | 4.48797E−02 | −5.89049E−02 | 1.90292E−02 |
| 14 | 0.41319567 | 0 | −1.79442E−01 | 5.09256E−02 | −5.79947E−03 |
| 15 | 0.72984222 | −4.42049853 | −6.93136E−02 | 2.04722E−02 | −4.18912E−03 |

| $S_i$ | D | E | F |
|---|---|---|---|
| 4 | 4.55083E−03 | | |
| 7 | 8.46486E−03 | | |
| 8 | 4.10981E−02 | −4.62939E−03 | −2.08050E−03 |
| 9 | 7.09393E−02 | −1.83481E−02 | 7.38381E−04 |
| 10 | −4.17867E−03 | 6.53324E−03 | −1.56401E−03 |
| 11 | −1.04147E−02 | 3.74728E−04 | 9.14154E−04 |
| 12 | −1.54774E−02 | 3.53876E−03 | −4.35290E−04 |
| 13 | −2.89914E−03 | 1.69304E−04 | −4.90915E−06 |

TABLE 2B-continued

Aspheric coefficients for embodiment 2

| | | | |
|---|---|---|---|
| 14 | 3.10968E−05 | −2.36211E−05 | 3.77122E−06 |
| 15 | 4.37089E−04 | −1.77677E−05 | |

TABLE 3A

Optical data for embodiment 3 shown in FIGS. 7-9
f = 4.10 mm, Fno = 2.20, HFOV = 37.0 deg, TTL = 5.50 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.0000 | | | | |
| 2 | | INF | FLT | 0.0000 | | | | |
| 3 | | INF | FLT | 0.0000 | | | | |
| 4 | L1a wafer lens | 3.886 | ASP | 0.2000 | Polymer | 1.514 | 54.6 | 4.80 |
| 5 | Aperture stop | INF | FLT | 0.0000 | | | | |
| | L1 substrate | INF | FLT | 0.2000 | Glass | 1.523 | 54.5 | |
| 6 | L1b wafer lens | INF | FLT | 0.1800 | Polymer | 1.514 | 54.6 | |
| 7 | | −6.469 | ASP | 0.1826 | | | | |
| 8 | L2 | 3.085 | ASP | 0.3555 | Plastic | 1.651 | 21.5 | −5.41 |
| 9 | | 1.576 | ASP | 0.2483 | | | | |
| 10 | L3 | 4.113 | ASP | 0.9037 | Plastic | 1.545 | 55.9 | 4.79 |
| 11 | | −6.664 | ASP | 0.6734 | | | | |
| 12 | L4 | 3.173 | ASP | 0.4799 | Plastic | 1.545 | 55.9 | 142.55 |
| 13 | | 3.131 | ASP | 0.3798 | | | | |
| 14 | L5 | 2.412 | ASP | 0.7966 | Plastic | 1.545 | 55.9 | −8.02 |
| 15 | | 1.374 | ASP | 0.3500 | | | | |
| 16 | IR filter | INF | FLT | 0.2000 | Glass | 1.516 | 64.1 | |
| 17 | | INF | FLT | 0.3502 | | | | |
| 18 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 3B

Aspheric coefficients for embodiment 3

| $S_i$ | c | K | A | B | C |
|---|---|---|---|---|---|
| 4 | 0.25731787 | 0 | −1.34140E−02 | −5.94650E−03 | −4.68259E−03 |
| 7 | −0.15459381 | 0 | 2.33585E−02 | −2.25302E−02 | −3.79458E−03 |
| 8 | 0.32418758 | 0 | −5.78908E−02 | 4.13684E−02 | −6.58229E−02 |
| 9 | 0.63458180 | 0 | −1.35589E−01 | 9.67128E−02 | −1.19929E−01 |
| 10 | 0.24314303 | 0 | −2.11046E−02 | 3.55140E−02 | −1.45071E−02 |
| 11 | −0.15005778 | 0 | −3.26111E−02 | −1.68375E−02 | 2.66210E−02 |
| 12 | 0.31512895 | 0 | 3.11363E−02 | −8.40417E−02 | 3.85298E−02 |
| 13 | 0.31937014 | 0 | 4.53022E−02 | −5.85188E−02 | 1.91298E−02 |
| 14 | 0.41456564 | 0 | −1.79405E−01 | 5.13694E−02 | −5.78506E−03 |
| 15 | 0.72755310 | −4.42941997 | −6.91535E−02 | 2.04863E−02 | −4.19231E−03 |

| $S_i$ | D | E | F |
|---|---|---|---|
| 4 | 2.69606E−03 | | |
| 7 | 8.07791E−03 | | |
| 8 | 4.10599E−02 | −3.86186E−03 | −2.46419E−03 |
| 9 | 7.10945E−02 | −1.85067E−02 | 7.42469E−04 |
| 10 | −4.17634E−03 | 6.53052E−03 | −1.55385E−03 |
| 11 | −1.05166E−02 | 3.22564E−04 | 9.45179E−04 |
| 12 | −1.54318E−02 | 3.49099E−03 | −4.39686E−04 |
| 13 | −2.92061E−03 | 1.67110E−04 | −4.98947E−06 |
| 14 | 1.99150E−05 | −2.42064E−05 | 3.85540E−06 |
| 15 | 4.37956E−04 | −1.77682E−05 | |

TABLE 4A

Optical data for embodiment 4 shown in FIGS. 10-12
f = 4.10 mm, Fno = 2.20, HFOV = 37.0 deg, TTL = 5.50 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.0000 | | | | |
| 2 | | INF | FLT | 0.0000 | | | | |
| 3 | | INF | FLT | 0.0000 | | | | |
| 4 | L1a wafer lens | 4.259 | ASP | 0.2000 | Polymer | 1.514 | 54.6 | 4.64 |
| 5 | L1 substrate | INF | FLT | 0.2000 | Glass | 1.523 | 54.5 | |
| 6 | Aperture stop | INF | FLT | 0.0000 | | | | |
| 7 | L1b wafer lens | INF | FLT | 0.1800 | Polymer | 1.514 | 54.6 | |
| 8 | | −5.193 | ASP | 0.1938 | | | | |
| 9 | L2 | 2.807 | ASP | 0.3047 | Plastic | 1.651 | 21.5 | −5.39 |
| 10 | | 1.498 | ASP | 0.2445 | | | | |
| 11 | L3 | 4.549 | ASP | 1.0028 | Plastic | 1.545 | 55.9 | 4.86 |
| 12 | | −5.892 | ASP | 0.6251 | | | | |
| 13 | L4 | 2.730 | ASP | 0.4443 | Plastic | 1.545 | 55.9 | 324.59 |
| 14 | | 2.613 | ASP | 0.4392 | | | | |
| 15 | L5 | 2.451 | ASP | 0.7657 | Plastic | 1.545 | 55.9 | −7.63 |
| 16 | | 1.373 | ASP | 0.3500 | | | | |
| 17 | IR filter | INF | FLT | 0.2000 | Glass | 1.516 | 64.1 | |
| 18 | | INF | FLT | 0.3500 | | | | |
| 19 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 4B

Aspheric coefficients for embodiment 4

| $S_i$ | c | K | A | B | C |
|---|---|---|---|---|---|
| 4 | 0.23482127 | 0 | −1.08195E−02 | −1.52664E−02 | 7.14506E−03 |
| 8 | −0.19256895 | 0 | 4.17191E−02 | −5.34971E−02 | 2.32673E−02 |
| 9 | 0.35627123 | 0 | −6.42165E−02 | 2.21781E−02 | −5.20384E−02 |
| 10 | 0.66753694 | 0 | −1.55811E−01 | 8.33153E−02 | −1.10102E−01 |
| 11 | 0.21980573 | 0 | −1.28086E−02 | 2.72027E−02 | −1.22277E−02 |
| 12 | −0.16972238 | 0 | −3.31994E−02 | −1.81329E−02 | 2.65346E−02 |
| 13 | 0.36635945 | 0 | 1.51953E−02 | −8.30209E−02 | 3.64393E−02 |
| 14 | 0.38274715 | 0 | 2.69786E−02 | −5.74968E−02 | 1.91998E−02 |
| 15 | 0.40806378 | 0 | −1.94554E−01 | 5.78616E−02 | −6.35517E−03 |
| 16 | 0.72819797 | −4.73913172 | −7.22225E−02 | 2.10198E−02 | −4.34618E−03 |

| $S_i$ | D | E | F |
|---|---|---|---|
| 4 | −3.87215E−03 | | |
| 8 | −4.59094E−03 | | |
| 9 | 2.59309E−02 | 8.75880E−03 | −8.01724E−03 |
| 10 | 6.37765E−02 | −1.43030E−02 | −1.25378E−03 |
| 11 | −2.23379E−03 | 6.93344E−03 | −2.14036E−03 |
| 12 | −8.46776E−03 | −1.69670E−03 | 1.81604E−03 |
| 13 | −1.35475E−02 | 2.28746E−03 | −1.74507E−04 |
| 14 | −2.78751E−03 | 7.02512E−05 | 6.74681E−06 |
| 15 | −1.09159E−04 | −4.91444E−05 | 1.15186E−05 |
| 16 | 4.63762E−04 | −1.95830E−05 | |

TABLE 5A

Optical data for embodiment 5 shown in FIGS. 13-15
f = 4.10 mm, Fno = 2.20, HFOV = 37.0 deg, TTL = 5.50 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.0000 | | | | |
| 2 | | INF | FLT | 0.0000 | | | | |
| 3 | | INF | FLT | 0.0000 | | | | |
| 4 | L1a wafer lens | 4.370 | ASP | 0.2000 | Polymer | 1.514 | 54.6 | 4.18 |
| 5 | L1a substrate | INF | FLT | 0.2000 | Glass | 1.523 | 54.5 | |
| 6 | Aperture stop | INF | FLT | 0.0300 | | | | |
| 7 | L1b substrate | INF | FLT | 0.2000 | Glass | 1.523 | 54.5 | |
| 8 | L1b wafer lens | INF | FLT | 0.1800 | Polymer | 1.514 | 54.6 | |
| 9 | | −3.974 | ASP | 0.1001 | | | | |
| 10 | L2 | 2.835 | ASP | 0.3352 | Plastic | 1.651 | 21.5 | −5.25 |
| 11 | | 1.482 | ASP | 0.2819 | | | | |
| 12 | L3 | 5.787 | ASP | 0.8423 | Plastic | 1.552 | 55.9 | 5.82 |
| 13 | | −6.705 | ASP | 0.5388 | | | | |
| 14 | L4 | 2.345 | ASP | 0.3665 | Plastic | 1.552 | 55.9 | 60.40 |
| 15 | | 2.385 | ASP | 0.5000 | | | | |
| 16 | L5 | 2.254 | ASP | 0.7471 | Plastic | 1.552 | 55.9 | −8.50 |
| 17 | | 1.340 | ASP | 0.4060 | | | | |
| 18 | IR filter | INF | FLT | 0.2000 | Glass | 1.516 | 64.1 | |
| 19 | | INF | FLT | 0.3723 | | | | |
| 20 | Image plane | INF | FLT | | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 5B

Aspheric coefficients for embodiment 5

| $S_i$ | c | K | A | B | C |
|---|---|---|---|---|---|
| 4 | 0.22881223 | 0 | −1.29183E−02 | −1.46598E−02 | 9.90776E−03 |
| 9 | −0.25163513 | 0 | 6.67795E−02 | −8.89692E−02 | 5.29581E−02 |
| 10 | 0.35270581 | 0 | −3.95633E−02 | −1.27582E−02 | −1.15278E−02 |
| 11 | 0.67467886 | 0 | −1.50778E−01 | 8.61935E−02 | −1.06071E−01 |
| 12 | 0.17280050 | 0 | −1.59288E−02 | 3.84852E−02 | −2.39926E−02 |
| 13 | −0.14913826 | 0 | −5.48953E−02 | −9.66864E−03 | 2.70263E−02 |
| 14 | 0.42638610 | 0 | −6.92428E−03 | −8.58120E−02 | 4.09605E−02 |
| 15 | 0.41925714 | 0 | 1.95055E−03 | −5.44427E−02 | 1.93690E−02 |
| 16 | 0.44373943 | 0 | −2.15765E−01 | 6.23904E−02 | −7.02756E−03 |
| 17 | 0.74628184 | −4.61950078 | −7.72980E−02 | 2.23379E−02 | −4.34627E−03 |

| $S_i$ | D | E | F |
|---|---|---|---|
| 4 | −3.79060E−03 | | |
| 9 | −8.86912E−03 | | |
| 10 | 1.24407E−02 | 5.80944E−03 | −4.68999E−03 |
| 11 | 5.82787E−02 | −1.00104E−02 | −2.23247E−03 |
| 12 | 4.65231E−03 | 5.43480E−03 | −2.01855E−03 |
| 13 | −1.06006E−02 | −2.02932E−03 | 2.33604E−03 |
| 14 | −1.63067E−02 | 3.06007E−03 | −3.20741E−04 |
| 15 | −2.95380E−03 | −2.38530E−05 | 2.53975E−05 |
| 16 | −1.34746E−04 | −9.97802E−05 | 1.94679E−05 |
| 17 | 4.33654E−04 | −1.80018E−05 | |

TABLE 6A

Optical data for embodiment 6 shown in FIGS. 16-18
f = 4.10 mm, Fno = 2.30, HFOV = 37.0 deg, TTL = 5.50 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.0000 | | | | |
| 2 | | INF | FLT | 0.0000 | | | | |
| 3 | | INF | FLT | 0.0000 | | | | |
| 4 | L1a wafer lens | 4.341 | ASP | 0.2000 | Polymer | 1.514 | 54.6 | 4.06 |
| 5 | L1a substrate | INF | FLT | 0.2000 | Glass | 1.523 | 54.5 | |
| 6 | Aperture stop | INF | FLT | 0.0300 | EC * | 1.537 | 39.5 | |
| 7 | L1b substrate | INF | FLT | 0.2000 | Glass | 1.523 | 54.5 | |
| 8 | L1b wafer lens | INF | FLT | 0.1800 | Polymer | 1.514 | 54.6 | |
| 9 | | −3.767 | ASP | 0.1001 | | | | |
| 10 | L2 | 3.176 | ASP | 0.3502 | Plastic | 1.651 | 21.5 | −4.78 |
| 11 | | 1.509 | ASP | 0.2676 | | | | |
| 12 | L3 | 5.018 | ASP | 0.8497 | Plastic | 1.552 | 55.9 | 5.60 |
| 13 | | −7.392 | ASP | 0.5579 | | | | |
| 14 | L4 | 2.755 | ASP | 0.3786 | Plastic | 1.552 | 55.9 | 20.45 |
| 15 | | 3.478 | ASP | 0.5000 | | | | |
| 16 | L5 | 2.323 | ASP | 0.6780 | Plastic | 1.552 | 55.9 | −6.25 |
| 17 | | 1.240 | ASP | 0.4188 | | | | |
| 18 | IR filter | INF | FLT | 0.2000 | Glass | 1.516 | 64.1 | 0.00 |
| 19 | | INF | FLT | 0.3691 | | | | |
| 20 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 6B

Aspheric coefficients for embodiment 6

| $S_i$ | c | K | A | B | C | D |
|---|---|---|---|---|---|---|
| 4 | 0.23038413 | 0 | −1.17248E−02 | −8.02948E−03 | 4.36565E−03 | −1.76975E−03 |
| 9 | −0.26546779 | 0 | 9.43366E−02 | −1.25970E−01 | 9.22850E−02 | 2.61580E−02 |
| 10 | 0.31482600 | 0 | −2.42553E−02 | −2.78946E−02 | −4.73548E−03 | 1.88885E−02 |
| 11 | 0.66267510 | 0 | −1.62083E−01 | 1.09420E−01 | −1.33942E−01 | 7.86368E−02 |
| 12 | 0.19928140 | 0 | −2.16653E−02 | 3.80276E−02 | −1.86329E−02 | −3.24100E−03 |
| 13 | −0.13528274 | 0 | −4.71429E−02 | −2.15842E−02 | 2.96384E−02 | −7.85979E−03 |
| 14 | 0.36296431 | 0 | 6.90925E−02 | −1.45490E−01 | 9.26708E−02 | −5.04979E−02 |
| 15 | 0.28750006 | 0 | 8.98765E−02 | −8.72709E−02 | 1.86251E−02 | 2.30521E−04 |
| 16 | 0.43041769 | 0 | −2.41386E−01 | 7.52538E−02 | −1.14803E−02 | 4.68406E−04 |
| 17 | 0.80633174 | −4.09083685 | −1.08342E−01 | 3.90250E−02 | −9.73815E−03 | 1.27762E−03 |

| Si | E | F | G |
|---|---|---|---|
| 4 | | | |
| 9 | | | |
| 10 | −3.67546E−03 | −2.47405E−03 | |
| 11 | −1.87941E−02 | −5.23986E−04 | −8.08124E−05 |
| 12 | 8.57571E−03 | −1.63897E−03 | −2.93314E−04 |
| 13 | −1.99743E−03 | 2.56863E−04 | 7.60446E−04 |
| 14 | 1.13713E−02 | 1.34422E−03 | −8.86870E−04 |
| 15 | −3.59058E−04 | −9.08210E−06 | |
| 16 | 1.86225E−04 | −4.02440E−05 | |
| 17 | −6.66413E−05 | | |

TABLE 7A

Optical data for embodiment 7 shown in FIGS. 19-21
f = 4.10 mm, Fno = 2.30, HFOV = 37.0 deg, TTL = 5.50 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.0000 | | | | |
| 2 | | INF | FLT | 0.0000 | | | | |
| 3 | | INF | FLT | 0.0000 | | | | |
| 4 | L1a wafer lens | 4.341 | ASP | 0.2000 | Polymer | 1.514 | 54.6 | 4.06 |
| 5 | L1a substrate | INF | FLT | 0.2000 | Glass | 1.523 | 54.5 | |
| 6 | Aperture stop | INF | FLT | 0.0300 | EC* | 1.52 | 48.6 | |
| 7 | L1b substrate | INF | FLT | 0.2000 | Glass | 1.523 | 54.5 | |
| 8 | L1b wafer lens | INF | FLT | 0.2000 | Polymer | 1.514 | 54.6 | |
| 9 | | −3.767 | ASP | 0.1001 | | | | |
| 10 | L2 | 3.176 | ASP | 0.3502 | Plastic | 1.651 | 21.5 | −4.78 |
| 11 | | 1.509 | ASP | 0.2677 | | | | |
| 12 | L3 | 5.018 | ASP | 0.8498 | Plastic | 1.552 | 55.9 | 5.60 |
| 13 | | −7.392 | ASP | 0.5578 | | | | |
| 14 | L4 | 2.755 | ASP | 0.3786 | Plastic | 1.552 | 55.9 | 20.45 |
| 15 | | 3.478 | ASP | 0.5000 | | | | |
| 16 | L5 | 2.323 | ASP | 0.6781 | Plastic | 1.552 | 55.9 | −6.25 |
| 17 | | 1.240 | ASP | 0.4188 | | | | |
| 18 | IR filter | INF | FLT | 0.2000 | Glass | 1.516 | 64.1 | |
| 19 | | INF | FLT | 0.3690 | | | | |
| 20 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 7B

Aspheric coefficients for embodiment 7

| $S_i$ | c | K | A | B | C | D |
|---|---|---|---|---|---|---|
| 4 | 0.23038413 | 0 | −1.17235E−02 | −8.02612E−03 | 4.36924E−03 | −1.77120E−03 |
| 9 | −0.26546779 | 0 | 9.43355E−02 | −1.25969E−01 | 9.22854E−02 | −2.61538E−02 |
| 10 | 0.31482600 | 0 | −2.42583E−02 | −2.78977E−02 | −4.73884E−03 | 1.88860E−02 |
| 11 | 0.66267510 | 0 | −1.62081E−01 | 1.09421E−01 | −1.33941E−01 | 7.86369E−02 |
| 12 | 0.19928140 | 0 | −2.16632E−02 | 3.80292E−02 | −1.86321E−02 | −3.24081E−03 |
| 13 | −0.13528274 | 0 | −4.71441E−02 | −2.15848E−02 | 2.96381E−02 | −7.86011E−03 |
| 14 | 0.36296431 | 0 | 6.91026E−02 | −1.45489E−01 | 9.26709E−02 | −5.04971E−02 |
| 15 | 0.28750006 | 0 | 8.98751E−02 | −8.72709E−02 | 1.86251E−02 | 2.30503E−04 |
| 16 | 0.43041769 | 0 | −2.41386E−01 | 7.52539E−02 | −1.14803E−02 | 4.68404E−04 |
| 17 | 0.80633174 | −4.09104575 | −1.08356E−01 | 3.90293E−02 | −9.73706E−03 | 1.27753E−03 |

| $S_i$ | E | F | G |
|---|---|---|---|
| 4 | | | |
| 9 | | | |
| 10 | −3.67653E−03 | −2.47405E−03 | |
| 11 | −1.87942E−02 | −5.24355E−04 | −8.09836E−05 |
| 12 | 8.57574E−03 | −1.63899E−03 | −2.93341E−04 |
| 13 | −1.99765E−03 | 2.56747E−04 | 7.60420E−04 |
| 14 | 1.13717E−02 | 1.34438E−03 | −8.86804E−04 |
| 15 | −3.59080E−04 | −9.08991E−06 | |
| 16 | 1.86226E−04 | −4.02421E−05 | |
| 17 | −6.66413E−05 | | |

TABLE 8A

Optical data for embodiment 8 shown in FIGS. 22-24
f = 4.10 mm, Fno = 2.20, HFOV = 37.0 deg, TTL = 5.25 mm

| $S_i$ | Component | $R_i$ | Shape | $D_i$ | Material | $N_d$ | $V_d$ | $f_l$ |
|---|---|---|---|---|---|---|---|---|
| 0 | Object plane | INF | FLT | INF | | | | |
| 1 | | INF | FLT | 0.1561 | | | | |
| 2 | Aperture stop | INF | FLT | −0.1561 | | | | |
| 3 | | INF | FLT | 0.0000 | | | | |
| 4 | L1 | 2.443 | ASP | 0.7202 | Plastic | 1.545 | 55.9 | 3.16 |
| 5 | | −5.252 | ASP | 0.1000 | | | | |
| 6 | L2 | 5.551 | ASP | 0.3000 | Plastic | 1.651 | 21.5 | −5.19 |
| 7 | | 2.066 | ASP | 0.5687 | | | | |
| 8 | L3 | 21.159 | ASP | 0.5658 | Plastic | 1.545 | 55.9 | 54.30 |
| 9 | | 72.974 | ASP | 0.4573 | | | | |
| 10 | L4 | 3.152 | ASP | 0.8372 | Plastic | 1.545 | 55.9 | 5.05 |
| 11 | | −20.127 | ASP | 0.2061 | | | | |
| 12 | L5 | 3.738 | ASP | 0.5948 | Plastic | 1.545 | 55.9 | −3.62 |
| 13 | | 1.221 | ASP | 0.3500 | | | | |
| 14 | IR filter | INF | FLT | 0.2000 | Glass | 1.516 | 64.1 | |
| 15 | | INF | FLT | 0.3500 | | | | |
| 16 | Image plane | INF | FLT | 0.0000 | | | | |

$S_i$: surface i
$R_i$: radius of surface i
$D_i$: distance between surface i and surface i + 1 along optical axis
$N_d$: index of refraction for material relative to d-line
$V_d$: Abbe number for material relative to d-line
$f_l$: focal length of lens component
Design wavelengths: 650 nm, 610 nm, 555 nm, 510 nm, 470 nm

TABLE 8B

Aspheric coefficients for embodiment 8

| $S_i$ | c | K | A | B | C |
|---|---|---|---|---|---|
| 4 | 0.40925951 | 0 | −1.51536E−02 | −2.81580E−02 | 2.75096E−02 |
| 5 | −0.19041454 | 0 | −4.28647E−03 | −2.62596E−02 | 6.70339E−03 |
| 6 | 0.18016188 | 0 | −5.96496E−02 | 8.67309E−02 | −9.32045E−02 |
| 7 | 0.48406108 | −1.14824577 | −7.53636E−02 | 1.18541E−01 | −1.08734E−01 |
| 8 | 0.04726216 | 0 | −9.58936E−02 | 5.70426E−02 | −4.47992E−02 |
| 9 | 0.01370358 | 0 | −1.45278E−01 | 3.07319E−02 | 1.96038E−03 |
| 10 | 0.31729642 | 1.01629464 | −1.94827E−02 | −6.86526E−02 | 4.01638E−02 |
| 11 | −0.04968348 | 0 | 8.56228E−02 | −9.03435E−02 | 2.76571E−02 |
| 12 | 0.26752565 | 0.99550012 | −2.24179E−01 | 6.49529E−02 | −6.33360E−03 |
| 13 | 0.81870660 | −4.88919898 | −9.86446E−02 | 3.28190E−02 | −5.69645E−03 |

| $S_i$ | D | E | F |
|---|---|---|---|
| 4 | −4.09194E−02 | 1.29751E−02 | |
| 5 | −2.26698E−02 | 1.27470E−02 | |
| 6 | 3.40450E−02 | 1.70125E−02 | −9.00539E−03 |
| 7 | 5.66445E−02 | −8.13484E−03 | −8.92261E−04 |
| 8 | 2.82689E−02 | −1.62141E−03 | −1.37906E−03 |
| 9 | −6.02594E−03 | 4.39483E−03 | −1.81663E−03 |
| 10 | −2.34857E−02 | 8.51947E−03 | −1.29090E−03 |
| 11 | −3.81016E−03 | 2.24265E−04 | −2.17078E−05 |
| 12 | −2.00780E−04 | −6.38487E−05 | 1.73147E−05 |
| 13 | 4.85369E−04 | −1.78040E−05 | |

TABLE 9

Data for various embodiments

| | 1 | 2 | 3 | 4 | 5 | 6 | 7 | 8 |
|---|---|---|---|---|---|---|---|---|
| f, mm | 4.10 | 4.10 | 4.10 | 4.10 | 4.10 | 4.10 | 4.10 | 4.10 |
| F − no | 2.20 | 2.20 | 2.20 | 2.20 | 2.20 | 2.30 | 2.30 | 2.20 |
| HFOV, deg | 37.00 | 37.00 | 37.00 | 37.00 | 37.00 | 37.00 | 37.00 | 37.00 |
| TTL, mm | 5.50 | 5.50 | 5.50 | 5.50 | 5.50 | 5.50 | 5.50 | 5.25 |
| TTL/f | 1.34 | 1.34 | 1.34 | 1.34 | 1.34 | 1.34 | 1.34 | 1.28 |

TABLE 9-continued

| | Data for various embodiments | | | | | | | |
|---|---|---|---|---|---|---|---|---|
| | 1 | 2 | 3 | 4 | 5 | 6 | 7 | 8 |
| $(R_1 + R_2)/(R_1 - R_2)$ | −0.25 | −0.27 | −0.25 | −0.10 | 0.05 | 0.07 | 0.07 | −0.37 |
| $(R_3 + R_4)/(R_3 - R_4)$ | 3.15 | 3.13 | 3.09 | 3.29 | 3.19 | 2.81 | 2.81 | 2.19 |
| $(R_5 + R_6)/(R_5 - R_6)$ | −0.26 | −0.23 | −0.24 | −0.13 | −0.07 | −0.19 | −0.19 | −1.82 |
| $(R_7 + R_8)/(R_7 - R_8)$ | 306.90 | 126.88 | 150.10 | 45.67 | −118.25 | −8.62 | −8.62 | −0.73 |
| $(R_9 + R_{10})/(R_9 - R_{10})$ | 3.66 | 3.61 | 3.65 | 3.55 | 3.93 | 3.29 | 3.29 | 1.97 |
| $|f_1/f|$ | 1.1671 | 1.1924 | 1.1717 | 1.1312 | 1.0195 | 0.9902 | 0.9902 | 0.7695 |
| $|f_2/f|$ | 1.3305 | 1.3363 | 1.3205 | 1.3151 | 1.2805 | 1.1659 | 1.1659 | 1.2661 |
| $|f_3/f|$ | 1.1880 | 1.1571 | 1.1693 | 1.1856 | 1.4195 | 1.3659 | 1.3659 | 13.2432 |
| $|f_4/f|$ | 28.7090 | 34.7661 | 34.7676 | 79.1671 | 14.7317 | 4.9878 | 4.9878 | 1.2315 |
| $|f_5/f|$ | 1.9580 | 1.9229 | 1.9563 | 1.8612 | 2.0732 | 1.5244 | 1.5244 | 0.8832 |
| $R_1/R_2$ | −0.605 | −0.569 | −0.601 | −0.820 | −1.100 | −1.152 | −1.152 | −0.465 |
| $R_3/R_4$ | 1.929 | 1.937 | 1.957 | 1.874 | 1.913 | 2.105 | 2.105 | 2.687 |
| $R_5/R_6$ | −0.587 | −0.632 | −0.617 | −0.772 | −0.863 | −0.679 | −0.679 | 0.290 |
| $R_7/R_8$ | 1.007 | 1.016 | 1.013 | 1.045 | 0.983 | 0.792 | 0.792 | −0.157 |
| $R_9/R_{10}$ | 1.752 | 1.766 | 1.755 | 1.785 | 1.682 | 1.873 | 1.873 | 3.061 |
| $R_7$ | 3.0790 | 3.0690 | 3.1730 | 2.7300 | 2.3450 | 2.7550 | 2.7550 | 3.1520 |
| $R_8$ | 3.0590 | 3.0210 | 3.1310 | 2.6130 | 2.3850 | 3.4780 | 3.4780 | −20.1270 |
| $R_7 - D_7$ | 2.6086 | 2.5953 | 2.6931 | 2.2857 | 1.9785 | 2.3764 | 2.3764 | 2.3148 |

What is claimed is:

1. An optical imaging lens assembly with lens components consisting of, in order from an object side to an image side:
 a first lens component with positive refractive power, a convex object-side refractive surface, and a convex image-side refractive surface;
 a second lens component with negative refractive power, a convex object-side refractive surface, and a concave image-side refractive surface;
 a third lens component with positive refractive power and a convex object-side refractive surface;
 a fourth lens component with positive refractive power and a convex object-side refractive surface; and
 a fifth lens component with negative refractive power, a convex object-side refractive surface, and a concave image-side refractive surface;
 wherein $f_4$ is a focal length of the fourth lens component, $f_1$ is a focal length of the first lens component, and the following relation is satisfied:

$$f_4/f_1 \geq 1.6.$$

2. The optical imaging lens assembly of claim 1 wherein the third lens component has a convex image-side refractive surface and the fourth lens component has a concave image-side refractive surface.

3. The optical imaging lens assembly of claim 1 wherein the third lens component has a concave image-side refractive surface and the fourth lens component has a convex image-side refractive surface.

4. The optical imaging lens assembly of claim 1 wherein the fourth lens component has a positive meniscus shape.

5. The optical imaging lens assembly of claim 1 wherein the first lens component includes a wafer lens having a lens element molded on a surface of a planar substrate.

6. The optical imaging lens assembly of claim 5 wherein the first lens component further includes an electrochromic surface on one surface of the planar substrate.

7. The optical imaging lens assembly of claim 1 wherein the first lens component includes two wafer lenses, each of the two wafer lenses having a lens element molded on only one surface of a planar substrate.

8. The optical imaging lens assembly of claim 7 wherein the first lens component further includes an electrochromic surface on one surface of the planar substrate of one of the two wafer lenses.

9. The optical imaging lens assembly of claim 1 wherein at least one of the object-side refracting surface or the image-side refracting surface of each of the five lens components is aspheric.

10. The optical imaging lens assembly of claim 1 wherein the object-side refracting surface and the image-side refracting surface of each of the five lens components are both aspheric.

11. An optical imaging lens assembly with lens components consisting of, in order from an object side to an image side:
 a first lens component with positive refractive power;
 a second lens component with negative refractive power;
 a third lens component with positive refractive power and a convex object-side refractive surface;
 a fourth lens component with positive refractive power and a convex object-side refractive surface; and
 a fifth lens component with negative refractive power;
 wherein $f_4$ is a focal length of the fourth lens component, $f_1$ is a focal length of the first lens component, and the following relation is satisfied:

$$f_4/f_1 \geq 1.6.$$

12. The optical imaging lens assembly of claim 11 wherein the first lens component has a convex object-side refractive surface and a convex image-side refractive surface.

13. The optical imaging lens assembly of claim 11 wherein the second lens component has a convex object-side refractive surface and a concave image-side refractive surface.

14. The optical imaging lens assembly of claim 11 wherein the third lens component has a convex image-side refractive surface.

15. The optical imaging lens assembly of claim 11 wherein the fourth lens component has a concave image-side refractive surface.

16. The optical imaging lens assembly of claim 11 wherein the fifth lens component has a convex object-side refractive surface and a concave image-side refractive surface.

17. The optical imaging lens assembly of claim 11 wherein the first lens component includes a wafer lens having a lens element molded on a surface of a planar substrate.

18. The optical imaging lens assembly of claim 17 wherein the first lens component further includes an electrochromic surface on one surface of the planar substrate.

19. The optical imaging lens assembly of claim 11 wherein the first lens component includes two wafer lenses, each of the two wafer lenses having a lens element molded on only one surface of a planar substrate.

20. The optical imaging lens assembly of claim 19 wherein the first lens component further includes an electrochromic surface on one surface of the planar substrate of one of the two wafer lenses.

21. The optical imaging lens assembly of claim 11 wherein at least one of the object-side refracting surface or the image-side refracting surface of each of the five lens components is aspheric.

22. The optical imaging lens assembly of claim 11 wherein the object-side refracting surface and the image-side refracting surface of each of the five lens components are both aspheric.

23. A portable wireless communications device comprising:
    an outer housing; and
    a digital camera integrated inside the outer housing, the digital camera having an optical imaging lens assembly with lens components consisting of, in order from an object side to an image side:
    a first lens component with positive refractive power;
    a second lens component with negative refractive power;
    a third lens component with positive refractive power and a convex object-side refractive surface;
    a fourth lens component with positive refractive power and a convex object-side refractive surface; and
    a fifth lens component with negative refractive power;
    wherein $f_4$ is a focal length of the fourth lens component, $f_1$ is a focal length of the first lens component, and the following relation is satisfied:

$$f_4/f_1 \geq 1.6.$$

24. The portable wireless communications device of claim 23 wherein the third lens component has a convex image-side refractive surface and the fourth lens component has a concave image-side refractive surface.

25. The portable wireless communications device of claim 23 wherein the optical imaging lens assembly has a total track length of less than 6 millimeters.

* * * * *